United States Patent [19]

Ogi

[11] Patent Number: 5,724,600
[45] Date of Patent: Mar. 3, 1998

[54] PARALLEL PROCESSOR SYSTEM

[75] Inventor: Yoshifumi Ogi, Kawasaki, Japan

[73] Assignee: Fujitsu Limited, Kawasaki, Japan

[21] Appl. No.: 525,171

[22] Filed: Sep. 8, 1995

[30] Foreign Application Priority Data

Dec. 6, 1994 [JP] Japan .................................. 6-302499

[51] Int. Cl.⁶ .................................................. G06F 13/00
[52] U.S. Cl. .................. 395/800; 395/674; 364/228.7; 364/230.3; 364/281.6; 364/DIG. 1
[58] Field of Search ........................... 395/800, 200.01, 395/200.15, 840–841, 853–855, 880–881, 706, 601, 616, 505, 670, 674; 364/131–134

[56] References Cited

U.S. PATENT DOCUMENTS

| 4,530,051 | 7/1985 | Johnson et al. ............... 395/200.03 |
| 5,088,034 | 2/1992 | Ihara et al. ............................ 395/706 |
| 5,146,590 | 9/1992 | Lorie et al. ............................ 395/607 |
| 5,168,572 | 12/1992 | Perkins .................................. 395/800 |
| 5,241,677 | 8/1993 | Naganuma et al. ................. 395/675 |
| 5,390,336 | 2/1995 | Hillis .................................... 395/800 |
| 5,432,909 | 7/1995 | Cok ................................ 395/200.03 |
| 5,438,680 | 8/1995 | Sullivan ............................... 395/670 |
| 5,572,680 | 11/1996 | Ikeda et al. ..................... 395/200.15 |
| 5,623,688 | 4/1997 | Ikeda et al. ......................... 395/800 |

Primary Examiner—Alpesh M. Shah
Attorney, Agent, or Firm—Staas & Halsey

[57] ABSTRACT

The present invention relates to a parallel processor system that can reduce the hardware circuit amount of the portions except a memory capacity. In the parallel processor system, each S-DPr (Source Data Processor) executes a local leveling process to level equally all loads to T-DPrs (Target Data Processor) related to data sent from itself so that the leveling is performed to all the T-DPrs and the chunks as a whole. The parallel processor system is applicable to super-database computers that perform the MIMD-type process.

7 Claims, 46 Drawing Sheets

| 2100 | 2101 | 2102 | 2103 | 2104 |
|------|------|------|------|------|
| 2111 | 2112 | \multicolumn{3}{c}{2113} |

2110
2120

⋮

2130

ONE ROW CORRESPONDS TO ONE BUCKET REPORTED BY PROCESSORS 300A~300C.

COLUMN 3: SPECIFY THAT THE ID OF THE PROCESSOR (IN PROCESSORS 40A~40C) TO WHICH THIS BUCKET HAS BEEN ALLOCATED.

COLUMN 2: SPECIFY IN WHICH PROCESSOR IN PROCESSORS 300A~300C THE BUCKET EXISTS.

COLUMN 1: THE ID OF BUCKETS. THIS ID WILL BE USED BY ALL OF PROCESSORS TO SPECIFY THE BUCKETS.

RELALAD ART

PARALLEL PROCESSOR SYSTEM

BACKGROUND OF THE INVENTION

1) Field of the Invention

The present invention relates to a parallel processor system including plural processors which implement parallel operations.

Particularly, the present invention relates to a technology regarding inter-processor communications between parallel processors and process execution algorithm in the so-called MIMD (Multiple Instruction Multiple Data) type system in which plural processors implement simultaneously and concurrently plural tasks and a processor group being a subset of plural processors participates in one task.

2) Description of the Related Art

Generally, in parallel processor system including a considerable large number of processors, it has been difficult that all the processors share directly an input and output unit (hereinafter, referred to as an I/O unit) such as a magnetic disk storage unit. It is required that data is exchanged between processors via another communication mechanism other than the I/O unit, e.g. a bus construction or communication network mechanism, without sharing the I/O unit among the processors. The present invention relates to a technology assuming an aspect in which a single I/O unit is not dynamically shared among plural processors. (however, the system and processor of the present invention (to be described later) can be used in the mode that a single I/O unit is shared among plural processors).

In the parallel processor system including a considerable large number of processors, a series of data group to be processed in a task, e.g. a table (relation) in a RDB (Relational DataBase) system are not under only a specific processor, but in most cases, plural processors read out data in the table in parallel and then the data are divisionally stored into the units under the plural processors to improve the performance.

In such an environment, for example, a selection in a RDB process (relational algebra) (selection: a row of a table matching a condition=tuple (a synonym of entity or record)) completes by executing a tuple selection while the processor group split-storing the object table (hereinafter, in this invention, referred to as a processor belonging to the processor group is referred to as a S-DPr (Source Data Processor)) are reading data respectively.

Relating to the relational algebra, the equivalent join which is a join between plural tables (because this is obvious to persons skilled in the art, the detail explanation is omitted) does not complete only on the S-DPr side. It is not always true that all the S-DPr sets of two tables to be joined agrees. That is because it is not assured that all tuple pairs to be joined are stored into the S-DPr, even if the sets agree.

Where the join such as the equivalent join which wants the data to data (tuple to tuple in RDB) matching process is realized with many processors, there is a method of actually executing all data mutually matching operation (the so-called Cartesian product process) to select a combination meeting a condition. However, since this method increases the process amount proportionally to the square of the amount of data as well as the communication frequency between the processors, it is not suitable for the parallel processor system. The processor operation performance increases proportionally to the number of processors, but the communication frequency increases, whereby the improved performance is not expected.

As the alternative method, there is the equivalent join processing method called the Hash join. This method includes the steps of previously sorting tuple groups on the S-DPr side by the join key value of the equivalent join, transferring respectively tuple sets (hereinafter, called chunk or bucket) prepared by the classification to a single processor, and then matching each tuple set in each processor. The equivalent join is a process that joins tuples with the same join key values together. Hence there is no probability that the tuples classified by different buckets are joined with the join key value.

In such a way, the amount of data transferred between processors is proportional to only to the first power of data so that the process amount can be reduced drastically. The concept of the Hash join processing method also is well known in public.

However, even in the equivalent joining method by the Hash join, there is a factor by which the potential capability of the parallel processor system cannot be well extracted.

The factor is known as the following five sorts of skews (the slant of a load to each processor). These skews localize a load relative to a specific processor. This bottleneck prolongs the process completion time of the entire system.

(A1) Skew of Initial Distribution:

This means the phenomenon by which the tuple reading time alone varies between source data processors (S-DPrs) because the source data processors (S-DPrs), after all, split-store the different amount of data, respectively.

(A2) Skew of Selection Rate:

The equivalent join is usually executed over limiting a tuple to be joined by selection. This selection is performed at the same time with the tuple reading/sorting. The number of tuples passing the selection corresponds to the transfer process frequency. Hence a variation in load process between the source data processors (S-DPrs) occurs.

(A3) Skew of Relocation:

The sorting by a join key is made in concrete by usually applying on evaluation function such as the Hash function to the join key and then using the output as a transfer destination processor number. This evaluation function cannot divide perfectly the actual world's data in equal amount among the transfer destination processors. For that reason, a variation occurs in the number of the tuples transferred to transfer destination processors, thus causing a difference in the amount processed by each of the transfer destination processors.

(A4) Skew of Generation Rate:

Even if the tuples are equally transferred to each of the transfer destination processors, it is not clear how many tuple pairs in the tuple group satisfy the join requirement. The slant caused by the relation between the classification and the data quality due to the evaluation function may cause a large difference in the join formation rate or resultant tuple generation rate. Since the degree of the generation rate of the resultant tuple depends on that of the frequency of the storage process, a difference in process amount occurs between transfer destination processors.

(A5) Skew of MIMD:

There is possibility that any processor is executing plural independent tasks simultaneously and in parallel, the tasks being respectively different in quality and quantity. That is, in view of a task, the processors of the same sorts may be largely different in the operation performance, transfer performance, and the I/O performance each which can consume for the task. Naturally, imposing the same amount of loads on the processor which is in the busiest state but can undertake only the task with its small performance results in a prolonged process time.

Generally, the following answers are listed as means for removing the above-mentioned skews.

(B1) Initial Distribution Skew Removing Means:

The amount of the storage data of the S-DPr is controlled so as to be equally distributed to every table at the relation initial storage time by, for example, performing the inter-S-DPr distribution in tuple unit using the round robin method.

(B2) Selection Rate Skew Removing Means:

This is in substance an unavoidable skew. Today, the countermeasure has not been proposed.

(B3) Relocation Skew Removing Means:

The buckets are directly distributed equally once to a predetermined processor set (hereinafter, the processor belonging to the processor set is referred to as a T-DPr (Target Data Processor)), rather than to the "matching processor". Now, the subset of a bucket is called a subbucket (subchunk). That is, if belonging to the same buckets, the subbuckets sent to Target Data Processors (T-DPrs) are distributed equally among the Target Data Processors (T-DPrs).

Thereafter, when the previous data has been distributed to the T-DPr group, the size of each bucket is examined. Some buckets are combined to reconfigure a bucket group having nearly the same size as some "matching processors". This is called a "bucket size tuning" process. For that reason, the number of buckets formed at the time of an application of the evaluation fiction in the S-DPr is several times the number of the "matching processors".

The bucket data subjected to a size adjustment are collected to each "matching processor". Like the normal equivalent joining process, the matching is made inside the processor. In the transfer process in this step, since the tuple group with nearly the same capacity exists with nearly equal distribution in each T-DPr, no skews of initial distribution/ selection rate (no selection process)/relocation exist.

As described above, the art of performing additionally a transfer process by one step looks at a glance like increasing extra transfer and I/O process, thus sacrificing the performance. However, it is known that the skew of the relocation in the actual world varies the inter-processor load in the order of several times, thus causing more adverse effect. This technology is described in detail as a well-known art by "Nakamura, Kituregawa, et al., 'Evaluation of Leveled Hash Join on Super-Database Computer (SDC)', Parallel Symposium JSPP' 92", and others.

Hereinafter, this method is abbreviated as "bucket leveling method". The term "bucket leveling process" is used to the process including the step of split-storing equally all buckets to the T-DPr after reading data from the S-DPr (or the process prior to collecting information regarding the capacity of the subbucket and then performing actually the bucket size tuning).

(B4) Generation Rate Skew Removing Means:

The existing technology cannot cope effectively with the skew of a generation rate. However, the technology according to the present invention (to be described later) can cope with the skew of a generation rate.

(B5) MIMD Skew Removing Means:

The skew of MIMD of the S-DPr is in substance an unavoidable skew, like the skew of the selection rate. Now, any systematic countermeasure has not been proposed. However, this problem is not important since performing preferentially the resource allocation as the S-DPr, compared with the resource allocation to the other operation, and reducing in concrete the skew of the MIMD of the S-DPr can be realized within the existing technology.

There is no existing technology that can deal effectively with the skew of MIMD relating to the operation other than that of the S-DPr. However, the technology according to the present invention (to be described later) can reduce the skew of MIMD regarding the operation of the T-DPr.

The existing technology will be described below with reference to FIGS. 36 to 49.

FIG. 36 is a block diagram showing the existing technology that executes the equivalent join in a parallel processor system by means of the Hash join using "bucket leveling method".

The existing technologies to be explained below are based on the basic arts cited from the following theses:

M. Kitsuregawa, S. Hirano, M. Harada, M. Nakamura, and M. Takagi, "The Super Database Computer (SDC): System Architecture, Algorithm and Preliminary Evaluation", In Proc. of the 25th Hawaii International Conference on System Sciences, pp. 308–319 (HICSS-25), 1992. 1.

Tamura, Nakamura, Kitsuregawa, and Takagi, "Degeneracy Operation Assist Algorithm on Bucket Leveling Network of Super-Database Computer (SDC) and the Evaluation", SWOPP 92, Hyuganada Summer Work Shop, Information Processing Society of Japan, Society of the Study of Computer Architecture, Vol. 195, No. 16 119–126, 1992.

The following operation is not one of the entire equivalent join but relates to only a part of "bucket leveling process" being a difference between the general art and the present invention.

Referring to FIG. 36, numeral 100 represents a processor group formed of plural processors 100A, 100B, . . . , 100C. Each of the processors 100A to 100C belonging to the processor group 100 reads data out of the I/O unit, executes a necessary selection process and sorting process, adds the sorting result (bucket ID) and the task's identifier to a tuple, and then sends the resultant to the network mechanism 200. That is, this processor is the S-DPr described before.

The network mechanism 200 is an intelligent mechanism that has the function for deciding autonomously the transfer designation for each tuple sent from the S-DPr group 100. For example, this network mechanism is constituted as described later with FIGS. 37 and 38.

Numeral 300 represents a processor group formed of plural processors 300A, 300B, . . . , 300C. Each of the processors 300A to 300C belonging to the processor group 300 accepts tuple data and the bucket ID added to the tuple data, and the task identifier from the network mechanism 200, counts the number of received tuples every bucket ID, and then sorts (classifies) and stores the resultant to each self I/O unit (to be described later) every bucket ID. This is, this processor corresponds to the T-DPr described before.

Physically, the T-DPrs 100A to 100C and the S-DPrs 300A to 300C may belong to the same processors. Here explanation will be made using illustrations as if the transmit and receive processors are different processors.

FIG. 37 is a block diagram showing the internal structure of the network mechanism 200. In the network mechanism 200, shown in FIG. 37, 2-input and 2-output switching units 201 to 212 are mutually connected by joint topology called a Ω network. The network mechanism 200 is a 8-input and 8-output switching mechanism that enables mutual communications by combining 8 S-DPrs with 8 T-DPrs.

FIG. 38 is a block diagram showing the internal structure of each of the switching units 201 to 212. Referring to FIG. 38, numerals 260 and 261 represent input lines to each of the switching omits 201 to 212. Numerals 262 and 263 represent output lines derived from each of the switching units 201 to 212. Numeral 220 represents an input register for holding a tuple input via the input line 260. Numeral 221 represents an input register for holding a tuple input via the input line 261. Numeral 224 is an output register for holding a tuple output via the output line 262. Numeral 225 is an output register for holding a tuple output via the output line 263. Numeral 222 represents a selector circuit that selects either one of data stored in the input registers 220 and 221 and sends to the output register 224. Numeral 223 represents a selector circuit that selects either one of data stored in the input registers 220 and 221 and sends to the output register 225.

Numeral 230 represents an operation circuit that decides the operation of each of the switching units 201 to 212. Numeral 240 represents a memory that holds information needed for the operation of the operation circuit 230. The memory 240 stores work tables 250 to 252 corresponding to possible tasks subjected to tuple transfer via the switching units 201 to 212, respectively. In the example shown in FIG. 38, it is assumed that there are three possible tasks to be tuple-transferred via the switching units 201 to 212.

Numeral 264 represents An input line extending from the control processors (not shown) to each of the switching units 201 to 212. Prior to beginning a task, the control processor enters the number of T-DPrs for each task which can reach from the input line 264 via the output lines 262 and 263 in each of the switching units 201 to 212, onto the fields 280 and 282 of each of the tables 250 to 252, as shown in FIG. 39.

FIG. 39 is a diagram showing the content of each of the work tables 250 to 252 stored into the memory 240. In FIG. 39, numerals 270 to 279 are fields each that holds a count value with sign (±) added correspondingly to the bucket ID used in each task. The values of the fields 270 to 279 are reset to "0", preceding the beginning of a task. As described before, the number of the T-DPrs which can reach from the output lines 262 and 263 for each task is held to the fields 280 and 281 corresponding respectively to two output lines 262 and 263.

FIG. 40 is a diagram showing a logical format of input output data (transfer data) of each of the switching units 201 to 212. Referring to FIG. 40, the control information field 290 showing the transfer mode of the transfer data holds at least the following information (1) and (2).

(1) Transfer mode: For "bucket leveling" subjected in the present explanation, it is designated whether either one of the mode (bucket leveling mode) in which each of the switching units 201 to 212 itself decides the transfer direction of a tuple and the mode (normal mode) in which transmission and reception are performed for communications between specific processors when the operational designation information is sent or the task is not a sort of task of interest must be applied to the transfer data.

(2) Format information: The field such as bucket ID (to be described later) is needed just in the bucket leveling process, but may not be needed in general other message transmission. As described above, it is imagined that there are several kinds of transfer data formats. Of the formats, what mode (format) is used is described to the field.

In FIG. 40, numeral 291 represents a field which holds the processor identifier of the S-DPr being the transfer data originating source. The field 291 is used to decide the switching direction of each of the switching units 201 to 212 when the transfer mode is a normal mode. However, since the detail operation of the normal mode is obvious to persons skilled in art, the explanation will be omitted here.

Numeral 292 represents a field which holds the processor identifier of the T-DPr being the transfer destination of the transfer data. The field 292 is valid only when the transfer mode is a normal mode. Hence the explanation will be omitted here.

Numeral 293 represents a field which holds the task identifier showing for which task the transfer data is to be transferred. The field 293 is used to perform an error recovery at a fault occurrence time in a normal mode. In the bucket leveling mode to be explained here, the switching units 201 to 12 are used to set whether any one of the internal work tables 250 to 252 is used to decide the switching direction.

Numeral 294 represents a field holding the bucket ID. The field 294 is used only in the bucket leveling mode.

Numeral 295 represents a tuple data holding field.

FIG. 41 is a block diagram showing the internal hardware configuration of each of the S-DPrs 100A to 100C. As described later, the hardware configuration of each of the T-DPrs 300A to 300C is exactly the same as that shown in FIG. 41. Physically, the same processor may work as the S-DPr and T-DPr simultaneously for the same task or different task.

Referring to FIG. 41, numeral 101 represents a microprocessor that summarizes and executes the S-DPr process inside each of the S-DPrs 100A to 100C. Numeral 102 represents a main storage unit that stores a software code to drive process data and the microprocessor 101.

Numeral 103 represents an input port circuit that accepts data transferred from the network mechanism 200 via the input line 114. The input port circuit 103 has the function of reporting the presence of at least data input to the microprocessor 101, and the function of storing data input according to the designation of the microprocessor 101 to the address in the main storage unit 102 designated by the microprocessor 101. In the range of the explanation on the general art, the input port circuit 103 does not operate during the operation of each of the S-DPrs 100A to 100C.

Numeral 104 represents an output port circuit that sends data to the network mechanism 200 via the output line 115. The output port circuit 104 reads data shaped as shown in FIG. 40 by the microprocessor 101 out of the address designated by the microprocessor 101 according to the designation Of the microprocessor 101 and then sends it to the network mechanism 200.

Numerals 105 to 107 are I/O bus driver circuits, respectively. The I/O bus driver circuit 105 drives the I/O unit 108 via the I/O bus 111. The I/O bus driver circuit 106 drives the I/O unit 109 via the I/O bus 112. The I/O bus driver circuit 107 drives the I/O unit 110 via the I/O bus 113. When reporting an I/O interruption to report an I/O process completion via the I/O bus 111, the I/O unit 108 generates interruption to the microprocessor 101 and executes the data exchange between the region in the main storage unit 102 designated by the microprocessor 101 and the I/O unit 108. When reporting an I/O interruption to report an I/O process completion via the I/O bus 112, the I/O unit 109 generates interruption to the microprocessor 101 and executes the data exchange between the region in the main storage unit 102 designated by the microprocessor 101 and the I/O unit 109. When reporting an I/O interruption to report an I/O process completion via the I/O bus 113, the I/O unit 110 generates interruption to the microprocessor 101 and executes the data exchange between the region in the main storage unit 102 designated by the microprocessor 101 and the I/O unit 110.

Numeral 116 represents an input line extended from the control processor (not shown). The input line 116 is formed of the interrupt signal line to the microprocessor 101 and the data bus exchanging bus. The input line 116 is used to monitor externally the state of the microprocessor 101, to provide data needed for task execution to the microprocessor 101 (e.g. information entering conditions for tuple selection described later), and to designate the beginning of the task execution.

FIG. 42 is a block diagram showing the internal hardware structure of each of the T-DPrs 300A to 300C. At a glance, the T-DPrs 300A to 300C have nearly the same structure as the S-DPrs 100A to 100C. The constituent elements attached with numerals 301 to 316 in FIG. 42 correspond nearly to the constituent elements attached with numerals 101 to 116 in FIG. 41. In the range of the explanation on the input port circuit 303 and the output port circuit 304 and the case where they operate as each of the T-DPrs 300A to 300C, the sole difference is that only the input port circuit 303 is used, but the output port circuit 304 is not used.

By using the above-mentioned constituent elements, processing is performed according to the following algorithm in the general technology. First, the operational algorithm of each of the S-DPrs 100A to 100C will be explained with reference to FIG. 43.

(C1) The microprocessor 101 of each of the S-DPrs 100A to 100C refers to the fie directory 102A of each of the I/O units 108 to 110 joined respectively to the S-DPrs 100A to 100C, captures the storage location of a table to be processed in a task, and designates a suitable one of the I/O bus drive units 105 to 107 to read data out of the region (step 101A; "Issue Read Request"). This designation includes the identifier of a target one among the I/O units 108 to 110, a storage address in the unit, and a storage address in the main storage unit 102 for reading data (the address of the I/O buffer 102B in FIG. 43).

(C2) On completing the I/O process, the microprocessor 101 executes a field selection and extraction (or restriction and projection in the relational algebra) needed for the post process in a tuple to data stored in the I/O buffer region 102B, the field selection and extraction being described under the selection condition (condition for SELECT) previously transferred from the control processor (not shown) via the input line 116 (step 101B). The selection condition 102C may be described with a descriptive language such as SQL or lower level language, or a program itself running in the microprocessor 101. Since the detail is not related to the substance of this technology, the explanation will be omitted here.

(C3) In response to respective tuples extracted by the above-mentioned processes, the microprocessor 101 next executes the Hash process (step 101C; "Hash") to decide the ID of the bucket belonging to the tuple.

(C4) The microprocessor 101 creates the output data with the format shown in FIG. 40, based on bucket ID, task ID, and the physical identifiers of the S-DPrs 100A to 100C (step 101D; "Form Send Data"). At this time, "bucket leveling mode" is set to the control information field 290 which designates the transfer mode of transfer data. As a result, because of the absence of the normal mode, the identifier of the designation (the receiving side) processor becomes invalid.

(C5) The microprocessor 101 issues and transfers the address as an output request of the created output data (Send Data) to the output port circuit 104 to designate outputting to network mechanism 200 for it (step 101E; "Issue Send Request").

(C6) The above-mentioned operation is repeated till all tuples in the process target tables stored in the I/O units 108 to 110 joined to the S-DPrs 100A to 100C are completely read out and then the process completion is reported to the control processor (not shown).

Next, the operation of each of the switching units 201 to 212 within the network mechanism 200 shown in FIGS. 36 to 38 will be explained below.

(D1) For example, when the transfer data comes from the front stage S-DPrs 100A to 100C to the input register 220 in the switching unit 201, this event is reported to the operation circuit 230. The front stage of each of the switching units 201 to 204 is the S-DPr 100. The front stage of each of the switching units 205 to 212 is another switching unit. Even if the front stage is each of the S-DPrs 100A to 100C or another switching unit, the event is reported to the operation circuit 230 when transfer data reaches each of the switching units 201 to 212.

(D2) The operation circuit 230 reads part of the transfer data (the fields 290 to 294 in FIG. 40) out of the input register 220.

(D3) The operation circuit 230 recognizes that the transfer data must be transferred in the "bucket leveling mode" from the value designating transfer data of the field 290.

(D4) The operation circuit 230 specifies a specific one from the internal work tables 250 to 252 to be used, according to the value of the field 293. Here, it is assumed that the work table 250, for example, is specified.

(D5) Of the fields 270 to 279 holding count values with signs in the work table 250, the operation circuit 230 specifies one counter field accessed as a counter identifier, or the value of the field 294 of the transfer data. Hence it is assumed that the field 270, for example, is specified.

(D6) The counter field 270 stores a count value with a sign. The operation circuit 230 judges whether the absolute value of the count value plus the number held in the field 280 is smaller than the absolute value of the count value minus the number held in the field counter 281, and vice versa.

(D7) if the absolute value obtained by adding the number of the counter 280 is smaller, the transfer data must be output on the side of the output line 263. The operation circuit 230 adds the number of the field 280 to the content of the field 270 and then stores the resultant into the field 270. Then the operation circuit 230 instructs the selector circuit 223 to store the content of the input register 220 into the output register 225 and then sends out data to the next stage switching unit or the T-DPrs 300A to 300C via the output line 263.

(D8) If the absolute value obtained by subtracting the number of the counter 281 is smaller, the transfer data must be output on the side of the output line 262. The operation circuit 230 subtracts the number of the counter 281 from the content of the field 270 and then stores the resultant into the field 270. Then the operation circuit 230 instructs the selector circuit 222 to store the content of the register 220 into the output register 224 and then sends out data to the next stage switching unit or the T-DPrs 300A to 300C via the output line 262.

(D9) If the absolute value obtained by adding the number of the counter 280 is equal to the absolute value obtained by subtracting number of the counter 281, the operation circuit 230 may select the output line 262 or 263.

(D10) However, in all cases, the operation circuit 230 must obey the rule: "if the value of the field 280 is "0", transfer data must not be output to the output line 262" and "if the value of the field 281 is "0", transfer data must not be output to the output line 263".

(D11) Because there are two input lines 260 and 261, when the output line 262 is busy for one input, the other input may not be used with the output line 262 by following the above-mentioned logic. Of course, the cited thesis discloses means for solving the problem. For the brief explanation, in such a case, it is assumed that either of the inputting processes is queued till the output line 262 becomes usable. This simplification does not relate to the difference between the general art and the present invention.

(D12) As understood easily, local leveling by the switching units 201 to 212 is performed with the above-mentioned algorithm. The bucket leveling distribution is established between the T-DPrs 300A to 300C as the entire network.

Next, the operational algorithm of each of the T-DPrs 300A to 300C will be explained by referring to FIG. 44.

(E1) When the transfer data (Receive Data) corresponding to one tuple reaches from the network mechanism 200 to the input port circuit 303 of each of the T-DPrs 300A to 300C, the input port circuit 303 stores the transfer data into a specific address within the main storage unit 302 and then reports the arrival of the transfer data to the microprocessor 301.

(E2) The microprocessor 301 accesses the fields 290, 293, and 294 of the transfer data and then recognizes that the tuple of what bucket ID in what task has come for the bucket leveling process. The microprocessor 301 counts how many tuples have reached each bucket ID of each task participating as the T-DPr 300 in the bucket leveling process and holds the count value in the fields 302A to 302C (step 301A; "Count Bucket Size"). The information (count value) is used at the time of "bucket size tuning" after the "bucket leveling process" subjected to this explanation.

(E3) The microprocessor 301 recognizes that the tuples in the transfer data from the fields 293 and 294 of the transfer data belong to a specific bucket of a specific task, and then stores tuples with the same bucket ID and belonging to the some task into the same memory block (e.g. the I/O buffers 302D to 302F in FIG. 44) to prepare for an I/O process (step 301B; "Blocking Tuples").

Such a storage is carried out because of the following reason. Usually the unit of the I/O process (a unit called a sector as to a magnetic disk with a fixed block architecture) has a fixed length. Performing an I/O process in a unit smaller than the above-mentioned unit leads to a large overhead because of the sequence including "selector unit reading, partial change of data in the sector, and sector unit writing". Hence it is desirable to perform an input and output process in a remarkably large block unit formed of a fixed number of sectors to reduce relatively the sector with a size of exceeding the Sector unit (in addition I/O process overhead). As described above, thereafter, the bucket size tuning as well as the process of transferring a tuple group belonging to one changed bucket to the same "matching processor". Hence it is desirable to store tuple groups belonging to the same bucket into the same location (each of the I/O buffers 302D to 302F) physically as much as possible.

(E4) When the number of tuples with at least a capacity used as an I/O process unit in the above-mentioned storage process is stored into the block (each of the I/O buffers 302D to 302F) to a bucket ID in a task, the microprocessor 301 refers to the file directory 302G to decide a specific one used among the I/O units 308 to 310 (step 301C; "Form I/O Request"). Then the microprocessor 301 creates an I/O write request regarding the block (step 301D; "Issue Write Request"), issues the block to a suitable one Among the I/O bus driver circuits 305 to 307, and then writes it to any one of the I/O units 308 to 310 decided in the step 301C.

Next, the existing art regarding the "matching process" will be summarized with reference to FIGS. 45 to 49.

FIG. 45 is a block diagram showing the existing art of performing "the matching process". Referring now to FIG. 45, numeral 200 represents the network mechanism constituted similarly to those in FIGS. 36 to 38. This network mechanism 200 enables simultaneous mutual communications between all processors.

Numeral 300 represents the processor group described with FIG. 36. The processor group 300 includes plural processors 300A to 300C (three processors in FIG. 45).

The processors 300A to 300C include respectively secondary storage units (I/O units) 320A to 320C respectively storing the subbuckets 1000 to 1002, 1010 to 1012, and 1020 to 1023 divided in group by the Hash function, according to the procedure described with FIGS. 43 and 44.

In the sign showing each subbucket, the first digit represents a bucket identifier and the tenth digit represents identifiers of the processors 300A to 300C being constitute elements of the processor group 300 storing subbuckets. That is, four kinds of identifiers "0" to "3" exist as the kind of the subbucket. The identifiers of the processors 300A to 300C are "0" to "2", respectively.

In the example shown in FIG. 45, as described above, there are four kinds of buckets. The subbuckets of the identifiers "0" to "2" exist in the processors 300A to 300C, respectively. However, the bucket of the identifier "3" exists in only the processor 300C.

In FIG. 45, numeral 40 represents a processor group formed of plural processors 40A, 40B, and 40C (three processors in FIG. 45). Each of the processors 40A to 40C belonging to the processor group 40 is the "matching procesor". The processors 40A to 40C include secondary storage units (I/O unit) 42A to 42C.

Numeral 50 represents An arbitrary processor that decides and manages the bucket transfer allocation from the processor group 300 to the processor group 40, based on the bucket allocation table (refer to FIG. 46) on the main storage unit, according to the procedure (to be described later with FIG. 46).

The processors 300A to 300C, 40A to 40C, and 50 as well as the processors 100A to 100C shown in FIG. 36 may be the same processors. Here explanation and illustration will be made as if each processor is always a different processor.

In the "matching process" in the general technology, each of the processors 300A to 300C forming the processor group 300 first transfers the bucket identifier of a subbucket existing inside itself to the processor 50 via the network mechanism 200. The processor 50 which has received the identifier recognizes how many kinds of subbuckets exist in the entire processor group 300 or the subbucket of what bucket identifier exists, based on the information.

Immediately after this process, the processor 50 decides "what bucket must be processed by which one of the processors 40A to 40C, or the constitute elements of processor group 40", and broadcasts the decision result to the processor groups 300 and 400 and all the processors 300A to 300C, and 40A to 40C via the network mechanism 200.

Thereafter each of the processors 40A to 40C of the processor group 40 instructs the entire processor group 300 to transmit bucket data allocated to itself. When all data of a bucket are transmitted to a specific one of the processors 40A to 40C being the constitute element of the corresponding processor group 40, the join operation begins within the processor corresponding to the bucket. The detail of the join operation executed in the processor does not relate directly to this explanation and is obvious to persons skilled in the art. Hence the explanation will be omitted here.

Next, after a rough explanation on the example of the format of a bucket allocation table with reference to FIG. 46, the operation of each of the processors 50, 300A to 300C, and 40A to 40C will be explained in more detail according to the flowcharts shown in FIG. 47 to 49.

FIG. 46 illustrates roughly an example of the format of a bucket allocation table held by the processor 50. The table shown in FIG. 46 has the structure in which one row is used for one bucket reported on its existence from the processors 300A to 300C.

In the table shown in FIG. 46, the bucket identifier of a bucket corresponding to each row is stored into first column of the row. The bucket identifier is used in all the processors 300A to 300C, 40A to 40C, and 50 to specify each bucket.

In which of the processors 300A to 300C the subbucket being the subset of the bucket exists is written onto the second column of each row. The processor group which has reported the existence of the bucket is covered. The bitmap on which one bit, for example, is allocated to each of the processors 300A to 300C is used as the second column.

Furthermore, the value showing "no allocation to any one of the processors" immediately after the initialization must be described to the third column of each row. After the allocation process, the processor identifier of any one of the processors 40A to 40C to which the bucket is allocated is described.

FIG. 47 is the flowchart (steps S500 to S505) used for explaining roughly the operation of the processor 500.

As shown in FIG. 47, when beginning the operation, the processor 500 first initializes the content of the bucket allocation table shown in FIG. 46 (step S500). The initialization process ensures the table region in which the predicted number of buckets can be sufficiently described, and invalidates all the rows (corresponding to each bucket).

The processor 500 waits for the report on what kind of bucket is created from each of the processors 300A to 300C (step S501), and then stores the content into the bucket allocation table in response to the report (step S502).

The process operations in the steps S501 and S502 are repeated till the processor 500 has received the reports from all the processors 300A to 300C (step S503).

When the report on the created bucket is reported from the processors 300A to 300C, the processor 500 allocates collectively the corresponding relationships between the buckets and the processors 40A to 40C (step S504). For example, the allocation of the buckets is decided so that the number of buckets are equally allocated to the processors 40A to 40C.

The processor 50 broadcasts the content of the allocation decided in the step S504 to the processors 300A to 300C and 40A to 40B (step S505).

Thereafter, the processor 50 does not have a duty to participate in the data transmission between the processors 300A to 300B and 40A to 40C. Hence the work as the processor 50 is completed in the above step.

FIG. 48 is a flowchart (steps S510 to S513) used for explaining roughly the operation of the processors 300A to 300C.

As shown in FIG. 48, when beginning the operation, the processors 300A to 300C first recognize the existence of the subbucket in the secondary storage units 320A to 320C to perform a bucket creating process (step S510).

In the bucket creating process, when it is confirmed what bucket exists on the inside of itself, the processors 300A to 300C report the confirmation information to the processor 50 (step S511).

Thereafter, the processors 300A to 300C wait for the report (step S505 in FIG. 47) on the allocation result of the corresponding relationships between the bucket from the processor 50 and the processors 40A to 40C (step S512).

When the processor 50 reports the allocation result, a suitable synchronization is established via the network mechanism 200 among the processors 40A to 40C. Then the bucket data internally stored is transferred to the processors 40A to 40C (step S513). At this time, what bucket data is transferred to what processors 40A to 40C obeys the allocation information reported from the processor 50 in the step S512.

FIG. 49 is a flowchart used for explaining roughly the operation of each of the processors 40A to 40C (steps S520 to S522).

As shown in FIG. 49, when each of the processors 40A to 40C begins its operation, the report (the process in the step S505 shown in FIG. 47) regarding the allocation result of the corresponding relationships between the bucket from the processor 50 and the processors 40A to 40C is waited first (step S520). In the step S520, it is assumed that the identifiers of all the buckets allocated at least to itself are received.

Thereafter, the processors 40A to 40C designate the processors 300A to 300C to transfer the bucket allocated to itself, and then receive all the bucket data (step S521). The processors 40A to 40C subject the DBMS process (e.g. the join process) to data received in the step S521 (step S522).

However, the general technology explained with FIGS. 36 to 44 has the following problems such as items (F1) to (F3):

(F1) The network portion (the network mechanism 200) with a large amount of hardware:

(1) The network amount increases in the order of n log n with respect to the number n of processors (or the capacity of the register region increases in the order of $n^2$ log n).

(2) Of the network amount, the problem arises from the regions other than the register region (no problem because the register can be realized merely by using a memory). It is difficult to prepare in this order the switching units 201 to 212 by which variable length tuples can be treated. Currently, it is possible, of course, to prepare the units in the order, in wired logic configuration using VLSIs. However, since the processor side also is prepared on the microprocessor basis, the amount of the network mechanism 200 may exceed the amount of the processor side.

(F2) No measures for dealing with the generation rate skew and MIMD skew:

(1) In the above-mentioned existing technology, weighting to the distribution among the switching units 201 to 212 (or entering to the fields 280 and 281) is performed only at the beginning of a task and by counting only the number of the T-DPrs. That is, only "equaling the input data amount of all the T-DPrs" is intended.

(2) On the contrary, each of the generation rate skew the MIMD skew relates to "the load slant created even if the input data is equally distributed to the T-DPrs". The existing technologies are impotent to the skews.

(3) In the MIMD environment, since the beginning and ending of other tasks occur dynamically, "correction of the load slant" must be performed in a dynamic way in response to the dynamic occurrence. So it is insufficient to decide the load adjustment value (such as a weighted value described in each of the fields 280 and 281) only at the beginning of a task.

(F3) Large overhead of the tuple data transfer between processors:

(1) The above-mentioned existing technology requires that since the object (or tuple) to be subjected to the logical leveling process agrees with the object to be subjected to the routing control in the physical network, the physical transfer unit between processors must be one tuple.

(2) Generally, since the process amount needed for one transfer process on the processor side is considerably large, this method that cannot make plural tuple groups collectively in a transfer unit leads to a large amount of transfer process overhead on the processor side.

On the other hand, in the general technologies described with FIGS. 45 to 49, the following problem occurs since the decision of the corresponding relationships between the bucket and the processor by the processor 50 is statically performed at the beginning of the "matching" process.

The degree of the skew of the generation rate cannot be predicted before the "matching" process. Hence in the method according to the existing technology, it is impossible to reduce the generation rate skew.

The MIMD skew regarding the "matching" process means that the relationships between the operation speed and the load regarding the task of the processors 40A to 40C belonging to the processor group 40 collapse because of the drastic change of the task executing speed. It is a reason for the occurrence of the drastic change that a part of the processors 40A to 40C belonging to the processor group 40 performs another task, or a new task is committed or completed while the part of the processors is executing the above task.

The ideal relationships of the load versus operation performance means the ratio of the load and the operation performance is nearly constant to any processors. However, in the general technologies, information regarding "operation speed" of each processor is not collected and even if it is collected at the beginning of the "matching" process, the information regarding the operation speed of the processor changes dynamically, without any limitation, due to the beginning or ending of another task. Also, it is impossible to predict perfectly the beginning of and ending of a task.

For that reason, the general technologies, shown in FIGS. 45 to 49, cannot reduce the skew of generation rate and the MIMD skew of the processor group 40, whereby the system operation performance is greatly reduced, compared with the ideal one.

SUMMARY OF THE INVENTION

The present invention is made to overcome the above mentioned problems and to achieve the following objects.

The problem in the existing technology is the hardware amount of logic operation circuits except memories. Today's technology allows memories with a considerably large amount of memory capacity to be easily mounted so that the memory capacity causes less problem. The first object of the present invention is to provide a parallel processor system that intends to reduce the amount of hardware circuits (hardware amount) of the portions except memories.

As described above, to begin with, the bucket leveling process has been proposed to reduce the skew of relocation. In addition to that reduction method, the second object of the present invention is to provide a parallel processor system that can deal with the skew of generation rate and the skew of MIMD on the T-DPr side.

Moreover, the third object of the present invention is to provide a parallel processor system that can reduce relatively the overhead of the inter-processor data transferring process by making plural tuples at once subjected to the inter-processor transferring process transferable and receivable by one operation.

Still furthermore, the fourth object of the present invention is to provide a parallel processor system that can surely deal with the skew of MIMD and the skew of generation rate in a process such as "matching".

In order to achieve the above objects, the parallel processor system according to the present invention (claims 1 to 6) is characterized as follows:

1. First, according to the first aspect of the invention, the parallel processor system, or a parallel processor system that includes plural processors that operate in parallel, has the following feature:

(a) The cluster of data (hereinafter referred to as a "chunk") to be subjected to a single process (hereinafter referred to as "process unit") is divided into subsets (hereinafter referred to as "subchunks") grid then stored into plural processors (actually an I/O unit group connected to each processor).

(b) The subchunk is formed of plural data items (hereinafter referred to as "entities") each which can be subjected further to a different process.

(c) Where "the entity group is classified by the application result (output value) of an evaluation function and then the entity set is obtained corresponding to the respect output", the following algorithms (1) to (5) are adopted.

(1) The processor set having the subchunk, or the subset of a chunk to be processed, in an I/O unit is tentatively called a S-DPr (Source Data Processor) set. The processor belonging to the set is tentatively called a S-DPr.

(2) The processor set whose constituents (processors) may not necessarily coincide with those of a S-DPr set is tentatively called a T-DPr (Target Data Processor) set. The processor belonging to the set is tentatively called a T-DPr.

(3) Each S-DPr reads independently a subchunk out of the I/O unit and applies the evaluation function to each entity included in the subchunk, so that an output value corresponding to the entity is obtained.

(4) Each S-DPr selects a single T-DPr and then transfers the entity to it. At this time, the entity to which the output value of the evaluation function is added is transferred.

(5) The T-DPr stores the accepted entity into the following I/O unit. At this time, the entity groups having the same output value of an evaluation function are sorted and stored in such a way that they can be taken out collectively later.

(d) Plural tasks satisfying respectively the conditions (a) to (c) each using the S-DPr set and the T-DPr set are running. It is not always guaranteed that the processor set used by the different tasks is contrary to the processor acting as a factor.

(e) The following items (1) to (3) are adopted as algorithms that decide the transfer destination T-DPr shown by the condition (c)(4).

(1) Each S-DPs has as a transfer destination processor decision table a two-dimensional array being accessible as two subscript letters: "the identifier of the T-DPr (first designation factor)" and "evaluation function output value (second designation factor)". A count value showing how many entities having "the corresponding evaluation function output value" are transferred to the T-DPr with "the corresponding identifier" is held as a two-dimensional array factor in the table.

(2) When the output value of the evaluation function is found to an entity, each S-DPr extracts all array factors (count values) included in the other axis direction (Y-axis coordinate) by using the evaluation function output value as one axis coordinate (X-axis coordinate) of the transfer destination processor decision table; compares mutually all the values; and specifies and transfers the transfer destination T-DPr from the Y-axis coordinate (corresponding to the T-DPr identifier) of an array factor with the smallest count value.

(3) When the transfer destination T-DPr is decided, the S-DPr increments the content (count value) of an array factor corresponding to "the T-DPr and the evaluation function output value" by one.

2. According to the second aspect of the present invention, the parallel processor system which has substantially the same configuration as that in the item 1 has the following structural features:

(a) The storage amount of the subchunk data belonging to the same chunk are distributed nearly equally among the S-DPrs.

(b) When An entity is transferred from a S-DPr to a T-DPr during a certain task, the following items (1) to (4) are adopted as algorithm:

(1) A queue mechanism which corresponds one to one to all the T-DPrs to the task and includes the entity acting as the constitute factor is prepared in each S-DPr. In this queue mechanism, only the number of tasks by which the communication relationship to a pair of communication relationships of S-DPr: T-DPr is used is prepared within the S-DPr.

(2) When reception regarding the task from a certain S-DPr becomes possible, each T-DPr is formed so as to issue a transmission start designation to the S-DPr.

(3) The event in which a T-DPr issues a transmission start designation to an arbitrary S-DPr group regarding a task" is performed with the frequency which is proportional to the progress state of the task processed in the T-DPr.

(4) The T-DPr transfers with an equal frequency the transmission start designation regarding a task to all processors participating as the S-DPr in the task.

(c) Each S-DPr has storage number detecting means that recognizes how many entities to be transferred to an arbitrary T-DPr in the T-DPr set regarding the task is currently in storage state in the queue mechanism to be prepared inside itself.

(d) The following items (1) to (3) are adopted as algorithm for the S-DPr which decides the T-DPr to which an entity is to be transferred.

(1) Each S-DPr includes as a transfer destination processor decision table the two-dimensional array accessible as two subscript letters: "T-DPr identifier (first designation factor)" and "evaluation function output value (second designation factor)". In this table, a count value showing how many entities each having "the corresponding evaluation function output value" have been transferred to the T-DPr having "the corresponding identifier", is held as a two-dimensional array factor.

(2) When the output value of the evaluation function is found to an entity, each S-DPr extracts all array factors (count values) included in the other axis direction (Y-axis coordinate) by using the evaluation function output value as one axis coordinate (X-axis coordinate) of the transfer destination processor decision table; compares mutually all the values; and specifies and transfers the transfer destination T-DPr from the Y-axis coordinate (corresponding to the T-DPr identifier) of an array factor with the smallest count value.

(3) When the transfer destination T-DPr is decided, the S-DPr increments the content (count value) of an array factor corresponding to "the T-DPr and the evaluation function output value" by the sum of (the number of entities (detection number of the storage number detecting means) to be transferred stored in the queue mechanism to the task and the T-DPr at that time+1) or a value of (the sum multiplied by a constant other than 0).

3. In the parallel processor system of the items 1 and 2, the unit transferred from the S-DPr to the T-DPr may be the aggregate of plural entities. The transfer unit is the aggregate of plural entities in which the output values being application results of the evaluation function are allowed to have different values respectively.

As described above, in each S-DPr, the output value of the evaluation function is added to respective entities included in the same transfer unit at a transfer time. When accepting the transfer unit, each T-DPr separates grid sorts respective entities by the evaluation function output value by referring to the evaluation function output value added to respective entities.

4. Moreover, in the parallel processors system having the functions shown in the items (2) and (3) according to the third aspect of the present invention, the following items (1) to (4) are adopted as the algorithm for the S-DPr determining the T-DPr to which a certain entity is to be transferred.

(1) Instead of the storage number detecting means described in the item 2, each S-DPr includes storage data amount detecting means for recognizing that how many data amount of entities to be transferred are currently stored in the queue mechanism prepared inside itself to an arbitrary T-DPr in the T-DPr set regarding the task.

(2) Each S-DPr includes as a transfer destination processor decision table the two-dimensional array accessible as two sub script letters: "T-DPr identifier (first designation factor)" and "evaluation function output value (second designation factor)". In this table, a data amount showing how many entities each having "the corresponding evaluation function output value" have been transferred to the T-DPr having "the corresponding identifier" is held as a two-dimensional array factor.

(3) When the output value of the evaluation function is found to an entity, each S-DPr extracts all array factors (data amount) included in the other axis direction (Y-axis coordinate) by using the evaluation function output value as one axis coordinate (X-axis coordinate) of the transfer destination processor decision table; compares mutually all the values; and specifies and transfers the transfer destination T-DPr from the Y-axis coordinate (corresponding to the T-DPr identifier) of an array factor with the smallest count value.

(4) When the transfer destination T-DPr is decided, the S-DPr increments the content (data amount) of an array factor corresponding to "the T-DPr and the evaluation function output value" by the sum of (the data amount of entities (detection result of by the storage data amount detecting means) to be transferred stored in the queue mechanism to the task and the T-DPr at that time+the data amount of entities currently processed) or a value of (the sum multiplied by a constant other than 0).

5. According to the fourth aspect of the present invention, the parallel processor system includes plural processors that operate in parallel. In order to participate in a sole task and execute the task as a whole using the plural processors, data to be processed in the task are dispersively stored into the first processor group included in plural processors and data stored in the first processor group are transferred to the second processor group included in plural processors so that the second processor group processes the data.

Where data can be grouped according to a predetermined regulation and all data groups are transferred to a processor belonging to the second processor group after the grouping, the processor is not needed to communicate with another processor to process the data group.

The fourth aspect of the present invention is characterized in that the parallel processor system satisfies the following requirements (1) to (7).

(1) Each processor belonging to the first processor group subjects previously only data stored in the serf processor to the grouping process.

(2) Each processor belonging to the first processor group reports the kind of a created group to An arbitrary processor included in plural processors (hereinafter referred to as a management processor A; may belong to the first processor group or the second processor group or may not belong to group).

(3) The management processor A stores what kind of group is stored in the first processor group.

(4) When "the situation in which it is possible to start a new process to the data group" comes, each processor belonging to the second processor group asks the management processor A for allocating a data group.

(5) After allocating a data group to a processor (hereinafter referred to as a processor B) belonging to the second processor group and requesting allocation, the management processor A does not allocate the data group to another processor.

(6) Each processor belonging to the first processor group follows the allocation by the management processor A and then sends all data included in the corresponding data groups among data stored in itself to the processor B.

(7) The processor B begins the process to the data group in response to all the corresponding data. After the process completion, the processor B becomes again "the situation able to start a new process to the data group".

6. The parallel processor system according to the fifth aspect of the present invention, which has nearly the same configuration as the parallel processor system described in the item 5, is characterized by the following items (1) to (3).

(1) In the item 5(2), each processor belonging to the first processor group reports the identifier and capacity of each data group as a grouping result to the management processor (2) In the item 5(3), the management processor A adds up the capacity sent from each processor belonging to the first processor group every data group and then stores the size (capacity) of each data group in the entire first processor group, together with the identifier of each data group.

(3) In the item 5(5), when receiving the data group allocation request from each processor belonging to the second process group, the management processor A allocates the stored data groups to the processor requesting the allocation in the decreasing order of the capacity thereof.

The basic concept of the existing technology described above is that "the network itself has a leveling and distributing function" and "respective switching units constructing a multi-stage network perform local leveling work so that a comprehensive leveling is performed to all the T-DPrs and chunks (buckets)". However, the parallel processing system according to the present invention does not adopt the above-mentioned concept. The basic concept is that "a special function is not expected to the network" and "a comprehensive leveling is performed to all the T-DPrs and buckets by performing a local leveling to equalize all the loads (entities) to the T-DPrs regarding data sent from each S-DPr".

Since "a special function is not expected to the network", the network function of the present invention is sufficiently established by providing, for example, only a communication function "in normal mode", already described on the network mechanism (refer to the numeral 200 in FIG. 36). Therefore, in the parallel processor system according to the present invention, the inter-processor data exchanging mechanism can work only as the so-called "all-point to all-points communications" between processors. A special mechanism or topology is not expected to the network mechanism itself even if it is the multi-stage network or bus connection.

Instead, according to the present invention, the chunk leveling work is carried out with each processor in all the S-DRPrs and T-DPrs. As described above, the basic concept is that "the load between nil the T-DPrs equalized to data sent from a S-DPr is guaranteed within the S-DPr". In this case, the definition of "load of T-DPr" determines whether or not it corresponds to the MIMD skew or the generation rate skew.

According to the parallel processor system of the first aspect of the present invention, in "the method of leveling buckets with a small amount of necessary hardware (except a memory)", only "the total amount of input data to the T-DPr" regarding the load of the T-DPr is noticed, like the existing technology, and the total amount is equalized using the transfer destination processor decision table.

In the parallel processor system according to the second aspect of the present invention, "the T-DPr process time needed for a work" can be equalized by considering generation rate skew and MIMD skew to the load of the T-DPr and adjusting dynamically the input amount of the T-DPr using the transfer destination processor decision table.

Moreover, in the parallel processor system according to the first and second aspects of the present invention, the transfer unit between processors is not needed to be respective entities (tuples). Hence if the T-DPrs on the receiving side are the same, the entity group (tuple group) with a different evaluation function output value (bucket ID) are collected as a transfer unit in the S-DPr on the transmitting side. Thus the overhead for the data transmission between processors can be reduced.

In this case, in order to adjust the load of the T-DPr, it is considered to adopt the method "of increasing or decreasing the number of tuples input into each T-DPr", or the method "of increasing or decreasing the sum of the amount of data (tuple length) of each entity input into each T-DPr" in the transfer destination processor decision table.

According to the existing technology, the number of tuples is increased or decreased. However, as described above, where the transfer unit between the processors becomes an entity group, it is predicted that the transfer unit at a time is set to fix the total sum of the data amount of the entity group to be transferred to a suitable value.

In the parallel processor system according to the second aspect of the present invention, the main point is that "data reception is tried from each T-DPr to the S-DPr group at an equal frequency". If the unit transferred at a transmission and reception work at a time is set to fix the total sum of the data amount to a value rather than a fixed entity number (fixed tuple number), defining the transfer unit between processors as an entity group as described above corresponds justly to employing the method "of increasing or decreasing the sum of data Amount of and entity input into each T-DPr".

This should be reflected to the method, described in the second aspect of the invention, of judging "how the load of the T-DPr is when an entity of interest is sent to a T-DPr", using the transfer destination processor decision table on the S-DPr side. However, not reflecting to the method does not mean that the operation is impossible.

In other words, if a very large number of tuples are used, it is predicted that the average amount of data (tuple length) of entities is nearly the some in any one of chunks and T-DPrs. It is possible to expect that the load adjustment on the entity member basis results in the same result as the load adjustment on the entity data amount sum basis. That is, it can be predicted that the reflection is not needed too much in the above-mentioned case.

On the other hand, if the number of tuples is not too large, practicing the above-mentioned reflection allows the load to be surely leveled. Hence in the parallel processor system according to the third aspect of the present invention, the transfer unit between processors is an entity group. Moreover, "the method of predicting the load of a T-DPr" according to the second aspect of the present invention is corrected along the above discussion to adjust the load of an entity on the data amount sum basis.

In the parallel processor system according to the fourth aspect of the invention, data group stored in each processor belonging to the first processor group is stored and managed by the management processor A. When the situation in which the processor B belonging to the second processor group can begin a new process to the data group stored in the first processor group comes, the processor B requests that the management processor A executes the data group allocation.

The management processor A accepting the allocation request allocates non-allocated data groups to the processor B. According to the data allocation, all the data included in the corresponding data group are transferred from each processor belonging to the first processor group to the processor B. Thereafter, the processor B begins a process to the corresponding data group.

In the parallel processor system according to the fifth aspect of the present invention, the management processor A accumulates the capacity of the data group stored into each processor belonging to the first processor group every data group, and stores and manages the capacity of each data group, together with the identifier of each data group for the entire first processor group. When the situation in which the processor B belonging to the second processor group begins a new process to the data group stored in the first processor group comes, the data group allocation is requested from the processor B to the management processor A.

The management processor A which receives the allocation request allocates the stored data group to the processor B in the decreasing order of the capacity thereof. After all the data of the corresponding data group have been transmitted from each processor belonging to the first processor group to the processor B according to the data Allocation, the processor B begins the process applied to the data group.

As described above in detail, the parallel processor system according to the first aspect of the present invention does not need a special mechanism and function regarding the network mechanism even if it is a multi-stage network or common bus. Hence, the hardware circuit amount except the memory capacity can be significantly reduced so that the manufacturing cost needed for the device configuration can be greatly reduced.

According to the parallel processor system of the second aspect of the present invention, an automatic and dynamic adjustment is performed in the direction in which the difference in performance between the T-DPrs caused by an arbitrary reason is canceled. Thus "the generation rate skew" and "the MIMD skew on the T-DPr operation" which the existing technology cannot deal with are remarkably reduced.

At this time, while the chunk leveling process is performed by using the transfer unit between processors as an entity group, the operational overhead of a processor associated with the data transfer between processors can be certainly reduced.

Moreover, according to the parallel processor system of the third aspect of the invention, where the load of the T-DPr is proportional to the data amount of the entities mainly input, leveling the load of the T-DPr can be realized more.

Because of "the generation rate skew" and "the MIMD skew regarding the operation of the T-DPr", the loads between processors become uneven easily with deviations of the order of several times. As a result, it is known that the effective performance drops to a fraction (the process of the entire system is not completed until the process completion of the slowest processor), in view of the ideal system performance. However, according to the parallel processor system of the present invention, as a result of the simulation, it is clear that the effective performance is improved several times and the nearly ideal performance can be established in considerably broad cases. According to the parallel processor system of the present invention, the chunks (buckets) can be leveled at a very low price and effectively.

According to the parallel processor system of the fourth aspect of the present invention, where a processor belonging to the second processor group completes very quickly a process for a certain data group (bucket, chunk) due to the MIMD skew and the generation rate skew, the operation performance of the processor is immediately used for other data group process. Hence the operation performance allocated for the task of the entire system is not wasted.

On the contrary, where a processor belonging to the second processor group consumes an extremely longer process time than a predicted time due to the MIMD skew and the generation rate skew, another processor undertakes the extended process. The influence on the system performance con be suppressed low.

Hence the MIMD skew and the generation skew can be certainly dealt with in the process such as matching.

The parallel processor system of the fifth aspect of the invention can provide the same effect as the fourth aspect of the invention. However, particularly, the present system allocates data groups in the decreasing order of the data amount thereof. If a large skew should occur in the data group allocated lastly, the data group in small size reduces sufficiently the influence on the system performance. Hence this feature can certainly deal with the MIMD skew and the generation rate skew.

BRIEF DESCRIPTION OF THE DRAWINGS

FIG. 20 is a diagram used for explaining an example of the transfer data format according to the third embodiment;

DESCRIPTION OF THE PREFERRED EMBODIMENTS

Referring to the attached drawings, explanation will be made as for embodiments of the present invention.

(a) Explanation of the First Embodiment:

(a1) Constituent Requirements Needed in First Embodiment:

The first embodiment relates to a technology regarding the parallel processor system according to the first aspect of the present invention. The structural requirements needed in the first embodiment are shown in the following items (1) to (3).

(1) "A two-dimensional table used to realize a local leveling in a S-DPr" (or a transfer destination processor decision table) in which "how many tuples (entities) belonging to which bucket (chunk) have been transmitted to which T-DPr" is described or filled out is arranged in each S-DP.

(2) When the bucket ID of a tuple (the output value where a predetermined evaluation function is applied to the tuple)

is established, each S-DPr extracts the factors (count values) of the transfer destination processor decision tables each having the bucket ID and then decides the T-DPr corresponding to the factor with the smallest value among the factors, as the tuple transfer destination.

(3) Thereafter, the S-DPr which has transferred the tuple adds one to the bucket ID on the transfer destination processor decision table and adds one to the factor (count value) corresponding to the transfer destination T-DPr.

(a2) Explanation of the Legitimacy of the First Embodiment:

In the first embodiment having the above mentioned constitute elements, it is obvious why the number of tuples sent from a S-DPr is nearly equalized to all T-DPrs every bucket ID. Hence the detail explanation will be omitted here.

Paying attention to each S-DPr, the number of tuples transferred to the T-DPr side is different to the same bucket ID by 1 at most. Hence in the entire system, the number of tuples received between T-DPrs is different by only the number of S-DPrs at most. Generally this number is sufficiently small, compared with the total number of tuples or the bucket size. As far as the load of the T-DPr is measured using the number of the input tuples of the T-DPr, the load leveling can be sufficiently established.

Figure 1:
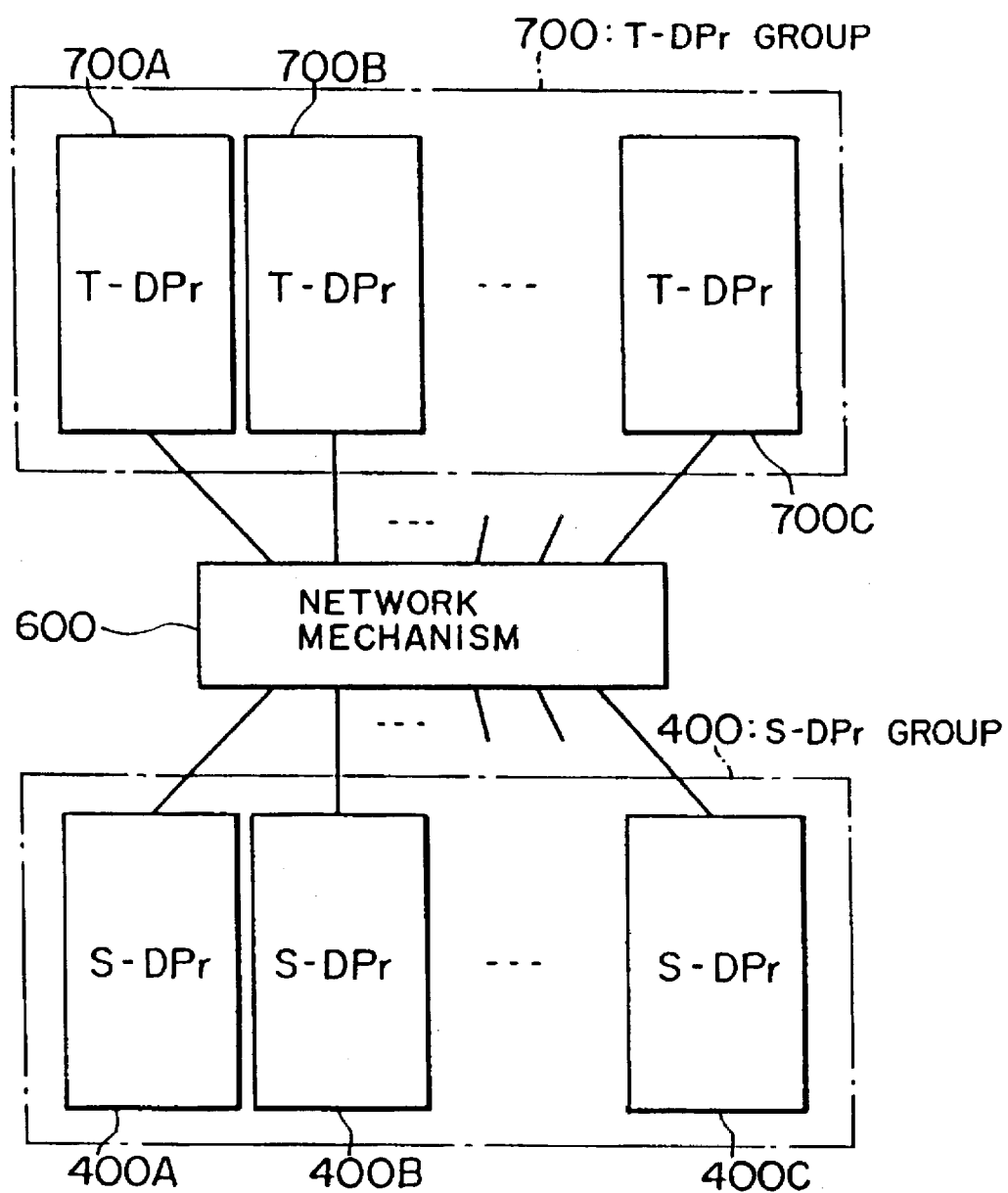
FIG. 1 is a block diagram showing the entire configuration of a parallel processing system according to the first embodiment of the present invention.

(a3) Explanation of Assembling Mode of the First Embodiment:

FIG. 1 is a block diagram showing the entire configuration of the parallel processor system according to the first embodiment of the present invention. Referring to FIG. 1, numeral 400 represents a S-DPr group formed of plural S-DPrs 400A, 400B, . . . , 400C, 600 represents a network mechanism that transfers data from any one of S-DPrs 400A to 400C belonging to the S-DPr group 400 to any one of the T-DPrs (to be described later), and 700 represents a T-DPr group formed of plural T-DPrs 700A, 700B, . . . , 700C.

Figure 2:
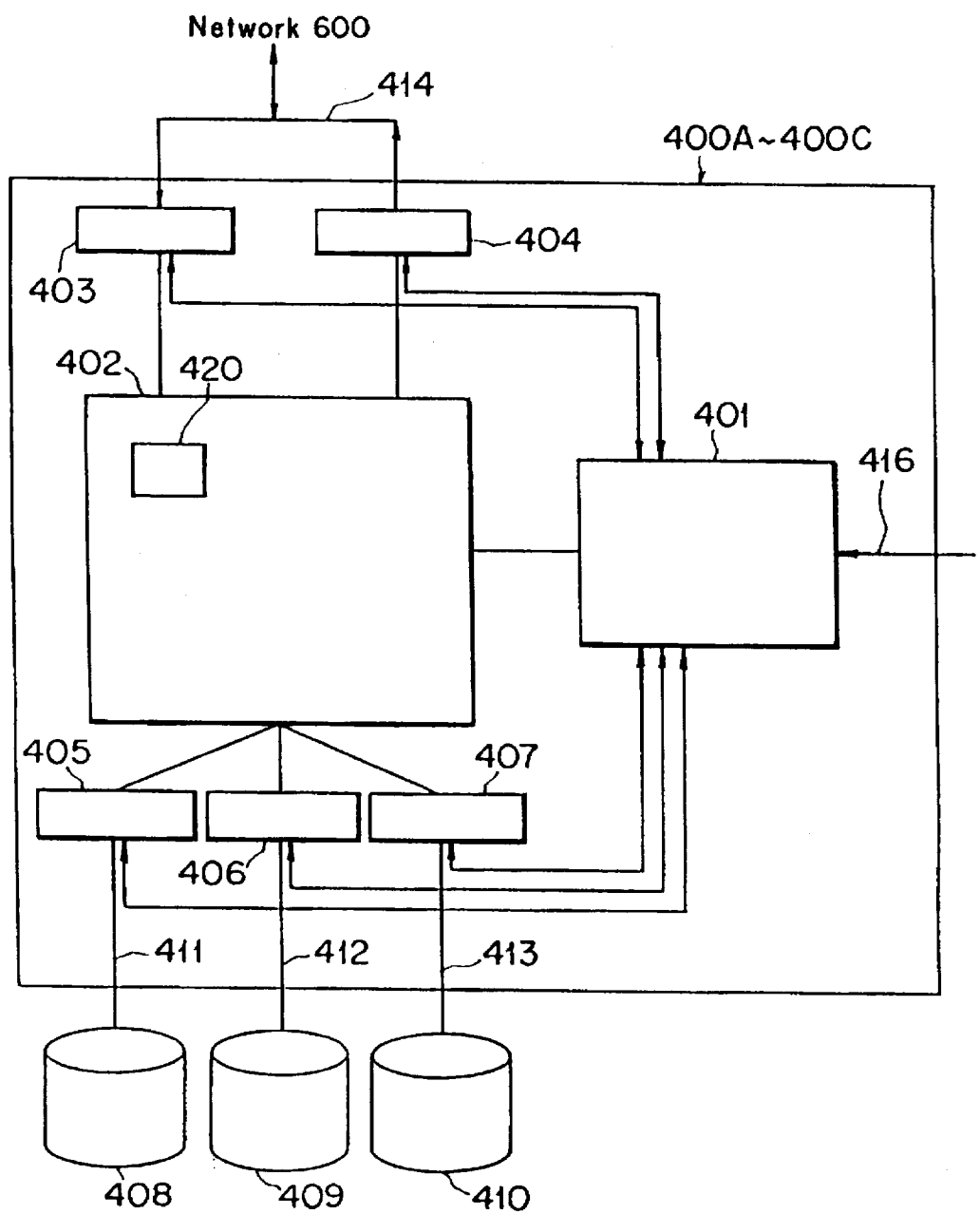
FIG. 2 is a block diagram schematically showing the internal hardware configuration of a S-DPr according to the first embodiment.
Figure 41:
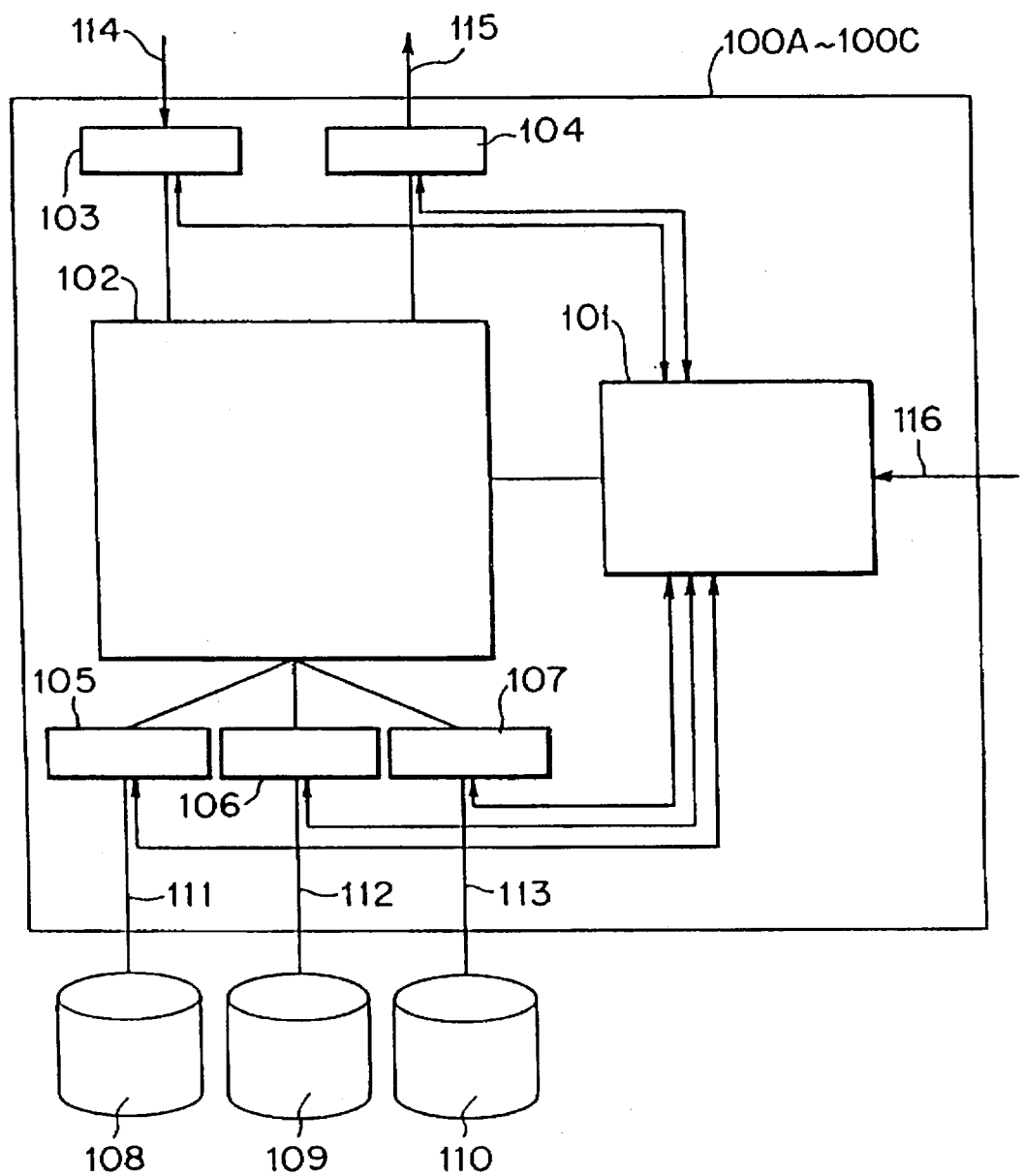
FIG. 41 is a block diagram showing the internal hardware configuration of a S-DPr in a general parallel processor unit.
Figure 42:
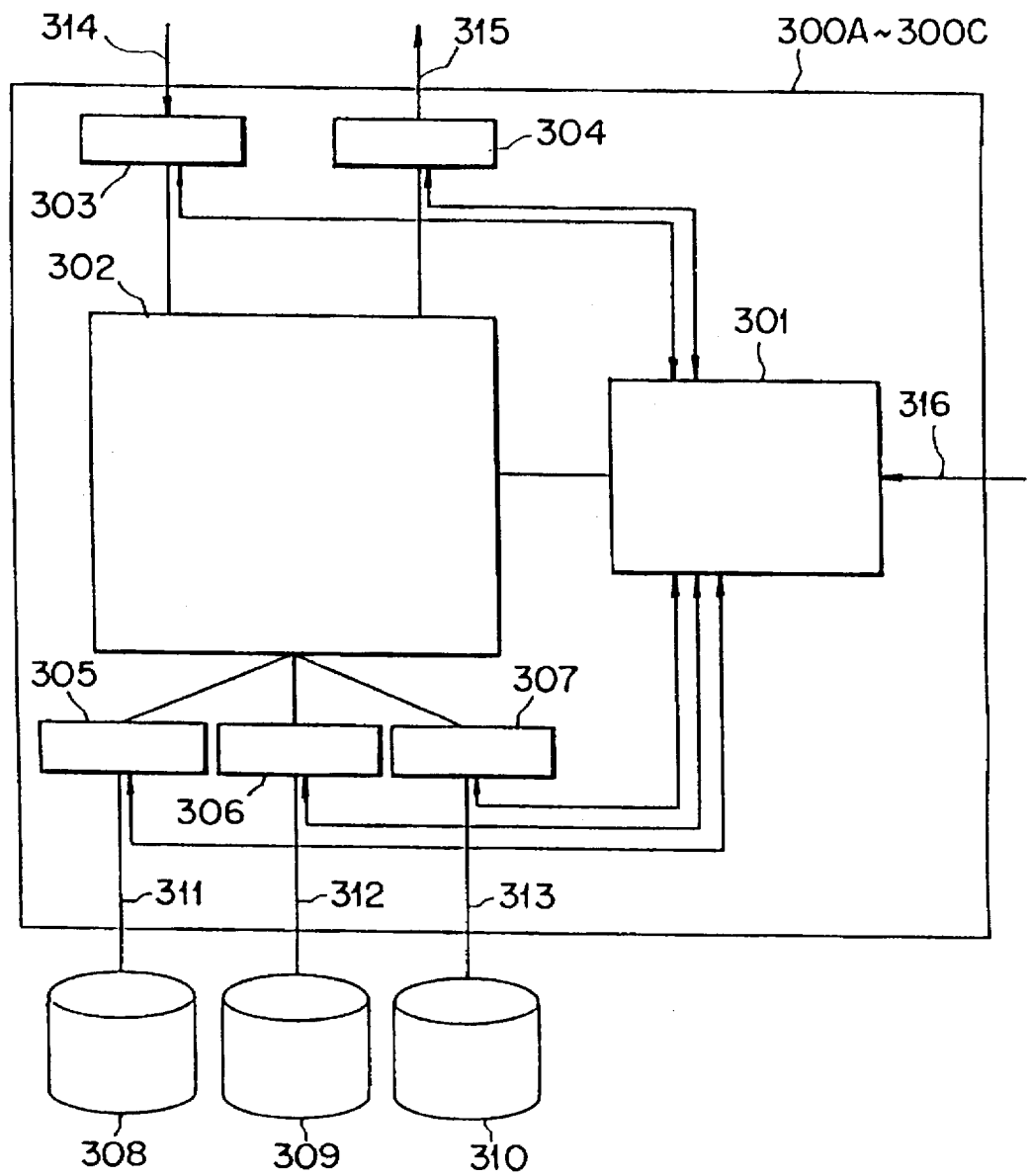
FIG. 42 is a block diagram showing the internal hardware configuration of a T-DPr in a general parallel processor unit.

FIG. 2 is a block diagram schematically showing the internal hardware configuration of a S-DPr according to the first embodiment. As obvious from FIG. 2 at a glance, the hardware configuration of each of the S-DPrs 400A to 400C is nearly similar to that of the existing technology shown in FIG. 41.

The major difference between the S-DPrs 400A to 400C in the present embodiment and the S-DPrs 100A to 100C in the existing technology is that the transfer destination processor decision table 420 is arranged in the main storage unit 402 to realize the present invention.

As describe later with FIG. 6, the hardware configuration of each of the T-DPrs 700A to 700C is the same as that of each of S-DPrs 400A to 400C but the transfer destination processor decision table 420 exists only on the side of the each of the S-DPrs 400A to 400C. The same processor may be physically the S-DPr and T-DPr at a time and in the same or different task.

Referring to FIG. 2, numeral 401 represents a microprocessor that unifies and executes a S-DPr process inside each of the S-DPrs 400A to 400C, and 402 represents a main storage unit that stores process data and software codes for driving the microprocessor 401.

Numeral 403 represents an input port circuit that accepts data transferred from the network mechanism 600. The input port circuit 403 is connected to the network mechanism 600 via the input/output line 414. The input port circuit 403 has the function which reports the existence of at least message or data input for the self processor to the microprocessor 401 and the function which stores data input according to the instruction from the microprocessor 401 into the address in the main storage unit 402 designated by the microprocessor 401.

In the scope of the present invention regarding the first embodiment, the input port circuit 403 in each of the S-DPrs 400A to 400C does not operate in the state viewed from the microprocessor 401. However, as described later, since it is assumed that the network mechanism 600 has a common bus structure (to be described in FIG. 4) in the first embodiment, the message or data which is not sent to the self S-DPr is transferred to the input port circuit 403.

Hence the input port circuit 403 according to the present embodiment has the function that self-accesses the destination processor identifier field in the transmission data, judges whether the data has been forwarded to the self S-DPr, and discards the data if the data is not sent to the self S-DPr. The identifier of the serf S-DPr is reported from the control processor (not shown) to input port circuit 403 via the input line 416 (to be described later) and the microprocessor, for example, at the system set-up time.

Numeral 404 represents an output port circuit that sends data to the network mechanism 600 via the input/output line 414. The output port circuit 404 has the function that reads data shaped in a form (to be described later) by the microprocessor 401 from the address designated by the microprocessor 401 and transfers it to the network mechanism 600, according to the instruction from the microprocessor 401.

Numerals 405 to 407 represent I/O bus driver circuits. The I/O bus driver circuit 405 drives the I/O unit 408 via the I/O bus 411. The I/O bus driver circuit 406 drives the I/O unit 409 via the I/O bus 412. The I/O dbus river circuit 407 drives the I/O unit 410 via the I/O bus 413. The I/O bus driver circuit 405 has the function that produces an I/O interrupt to the microprocessor 401 when the I/O unit 408 reports an I/O interrupt to report the I/O process completion via the I/O bus 411, the function that sends the I/O command issued from the microprocessor 401 to the I/O unit 408, and the function that executes the data exchange between a region in the main storage unit 402 designated by the microprocessor 401 and the I/O unit 408. The I/O bus driver circuit 406 has the function that produces an I/O interrupt to the microprocessor 401 when the I/O unit 409 reports an I/O interrupt to report the I/O process completion via the I/O bus 412, the function than sends the I/O command issued from the microprocessor 401 to the I/O unit 409, and the function that executes the data exchange between a region in the main storage unit 402 designated by the microprocessor 401 and the I/O unit 409. The I/O bus driver circuit 407 has the function that produces an I/O interrupt to the microprocessor 401 when the I/O unit 410 reports an I/O interrupt to report the I/O process completion via the I/O bus 413, the function that sends the I/O command issued from the microprocessor 401 to the I/O unit 410, and the function that executes the data exchange between a region in the main storage unit 402 designated by the microprocessor 401 and the I/O unit 410.

Numeral 416 represents an input line extended from the control processor (not shown). The input line 416 is formed of the interrupt signal line and the data exchange bus to the microprocessor 401. As described above, the input line 416 is used to report the identifier of each of the S-DPrs 400A to 400C, to monitor externally the state of the microprocessor 401, to provide data (e.g. information to which the requirement for the tuple selection to be described later is described) needed to perform a task to the microprocessor 401, and to designate the beginning of the task execution.

Numeral 420 represents a transfer destination processor decision table being the constitute element needed for the present embodiment. The concrete structural example is shown in FIG. 3.

Figure 3:
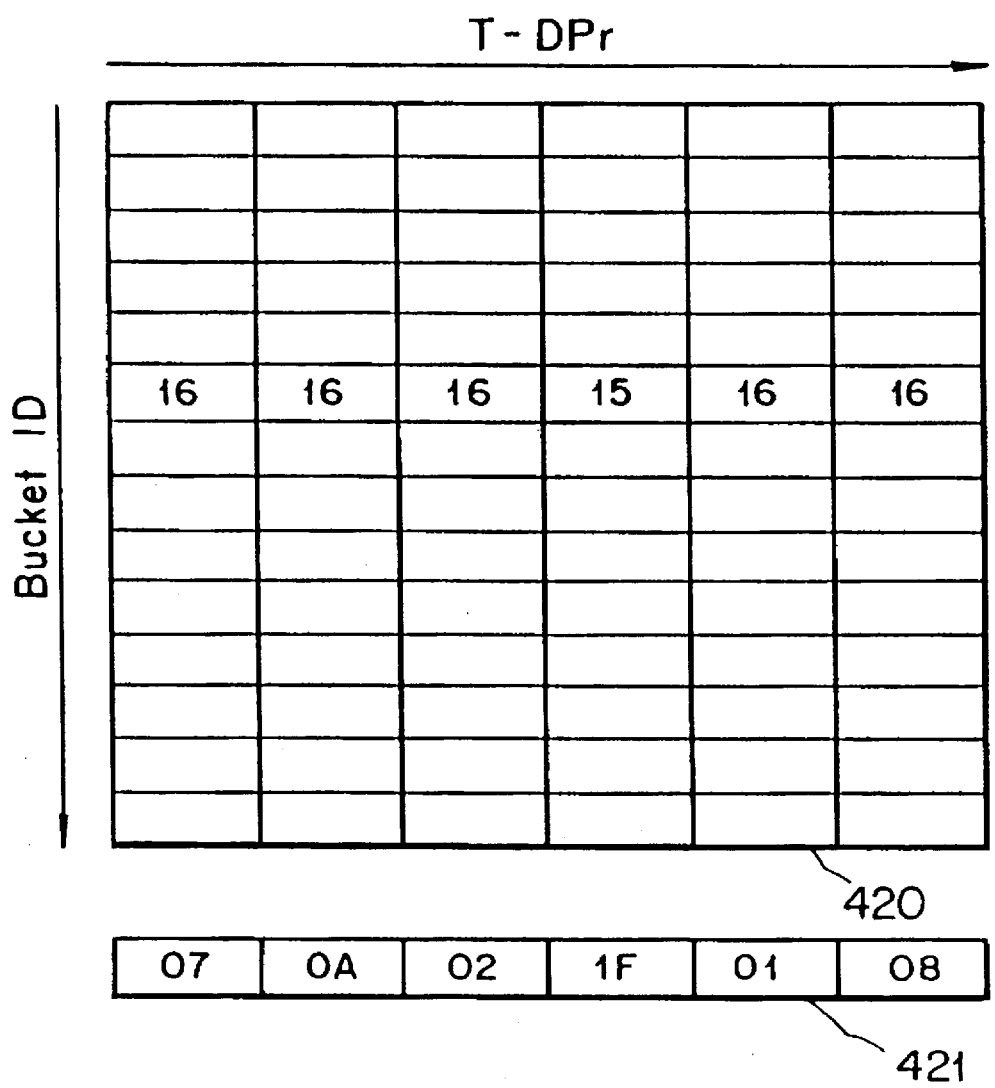
FIG. 3 is a diagram showing an example of the concrete configuration of a transfer destination processor decision table according to the first embodiment.

In the transfer destination processor decision table 420, shown in FIG. 3, each column corresponds to the identifier (first designation factor) of each of the T-DPrs 700A to 700C regarding the task and each row corresponds to the bucket ID (the output value of a predetermined evaluation function such as Hash function; the second designation factor) regarding the task.

One transfer destination processor decision table 420 per task exists in each of the S-DPrs 400A to 400C. The table 420 is used to subject data to be transferred from each of the S-DPrs 400A to 400C in a task to an input adjustment to each of the T-DPrs 700A to 700C. Hence, if a processor executes as a S-DPr plural tasks each of which is "a bucket leveling process", plural transfer destination processor decision tables 420 exist in a sole S-DPr.

In the transfer destination processor decision table 420, as shown in FIG. 3, the 0-th column (column 0) corresponds to the T-DPr with the identifier "07" participating in the task. Similarly, the first column corresponds to the T-DPr with the identifier "0A" and the second column corresponds to the T-DPr with the identifier "02" (hereinafter omitted). The relationships between the columns and processor identifiers are prepared as the one-dimensional list 421 converted in the main storage unit 402.

In the scope of the present embodiment, the number of columns in the transfer destination processor decision table 420 corresponds to each of the T-DPrs 700A, 700B, . . . , 700C. However, the arranging order is not particularly required. According to the present invention, there is no request particularly to the method of performing the mutual conversion between the column identifier and the processor identifier of a T-DPr. The existence of the list 421 is not the essential constitute requirement in the present invention. The list 421 is accessed by the column identifier of the table 420 to provide the corresponding processor identifier.

Figure 4:
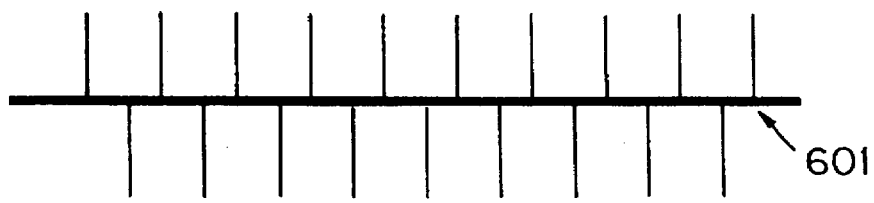
FIG. 4 is a diagram showing an example of the configuration of an inter-processor communication mechanism according to the first embodiment.

FIG. 4 is a diagram showing the configuration example of the inter-processor communication network (network mechanism 600). In the first embodiment, as shown in FIG. 4, to make clear the difference between the present invention and the existing technology, the network mechanism 600 is formed merely by connecting processors with the common bus 601.

In the first embodiment, the intelligence for the bucket leveling is prepared on the side of all the processors (S-DPrs 400A to 400C, T-DPrs 700A to 700C). Thus, the network mechanism 600 acting as an inter-processor connecting mechanism can adopt a suitable hardware configuration, in response to a request regarding, for example, the amount of resources, without expecting a particular topology and function such as a multi-stage network.

The common bus 601 broadcasts data content sent from each of the processors 400A to 400C and 700A to 700C to all the processors 400A to 400C and 700A to 700C. As described above, each of the processors 400A to 400C and 700A to 700C (input port circuits 403 and 703) refers to the destination processor identifier field in the broadcast data and discards data not sent to the self processor. The inter-processor connecting mechanism on the common bus basis is obvious to persons skilled in the art. Hence the detail explanation will be omitted here.

Figure 5:
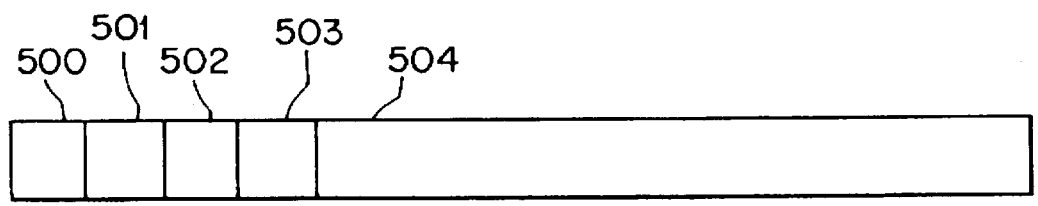
FIG. 5 is a diagram showing the data format transmitted and received between processors according to the first embodiment.

FIG. 5 is a diagram showing a data format exchanged between processors in the first embodiment. Referring to FIG. 5, numeral 500 represents a control information field. Unlike the existing technology, the control information field 500 does not include information which instructs a special operation for the leveling process to the network mechanism 600.

Numeral 501 represents a field which stores a destination processor identifier. The input port circuit 403 or 703 in each of the processors 400A to 400C or 700A to 700C refers to the destination processor identifier stored in the field 501 and then judges whether the transmission data for the self processor is identified.

Numeral 502 represents a field which stores the processor identifier of an originating processor. The processor identifier stored in the field 502 is used only at a fault occurrence time.

Numeral 503 represents a field which stores information showing that the data has been transmitted for which one of tasks, 504 represents a field which stores the bucket ID, and 505 represents a field which stores tuple data.

Figure 6:
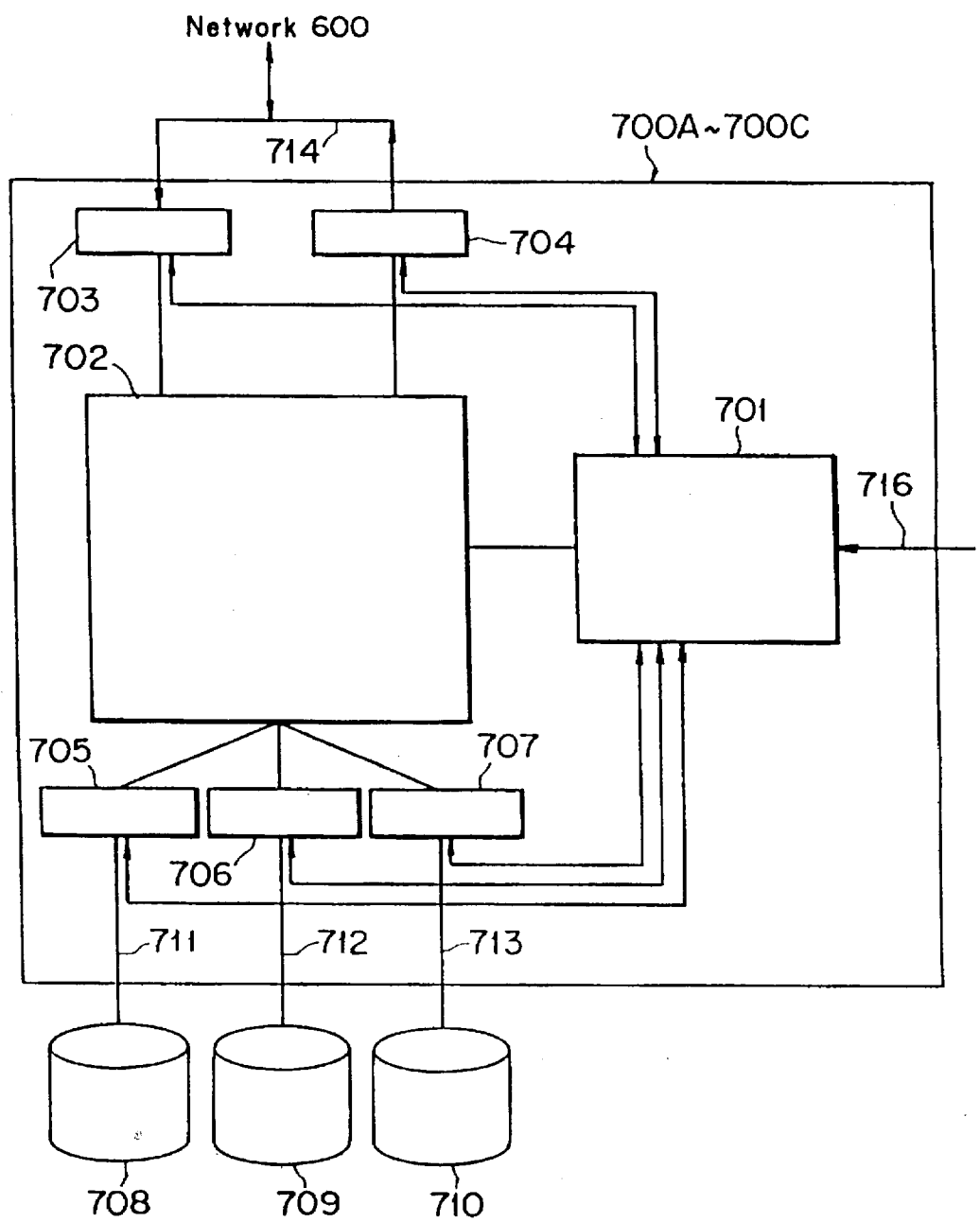
FIG. 6 is a block diagram schematically showing the internal hardware configuration of a T-DPr according to the first embodiment.

FIG. 6 is a block diagram schematically showing the internal hardware configuration of the T-DPr according to the first embodiment. As described above, each of the T-DPrs 700A to 700C of the first embodiment shown in FIG. 6 is constituted like each of the S-DPrs 400A to 400C shown in FIG. 2. Thus a sole processor can have the functions of the S-DPr and the T-DPr.

In FIG. 6, the constituent elements shown with numerals 701 to 714 and 716 are nearly similar to the constituent elements shown with numerals 401 to 414 and 416 in FIG. 2, respectively.

However, each of the T-DPrs 700A to 700C differs from each of the S-DPrs 400A to 400C in the following two respects. The transfer destination processor decision table 420 is not arranged on the main storage unit 702. Moreover, the input port circuit 703 operates, viewed from the microprocessor 701, but the output port circuit 704 is not used.

Figure 7:
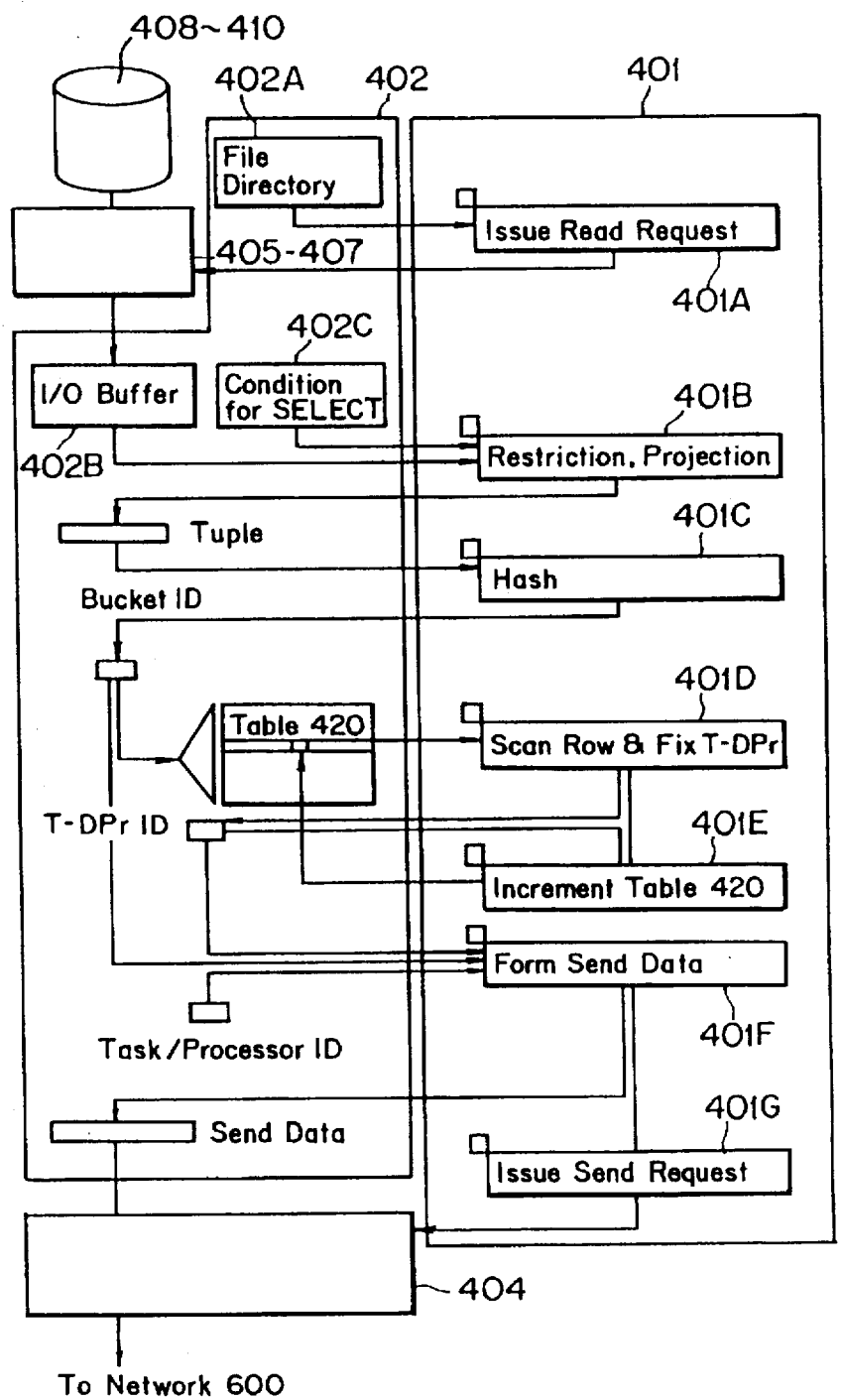
FIG. 7 is a diagram used for explaining the operational algorithm for a S-DPr according to the first embodiment.

Next, the operational algorithm of each of the S-DPrs 400A to 400C in the system according to the first embodiment constituted as described above will be described below by referring to FIG. 7.

(1) The microprocessor 401 in each of the S-DPrs 400A to 400C designates a suitable one among the I/O bus driver circuits 405 to 407 to consult the file directory 402A in the I/O units 408 to 410 connected to each of the S-DPrs 400A to 400C, to obtain a storage location on the table to be processed in the task, and then to read data out of the region (step 401A; "Issue Read Request"). This designation includes the identifier of a target one of the I/O units 408 to 410, a storage address of the unit, and the storage address for readout data within the main storage unit 402 (the address of the I/O buffer 402B in FIG. 7).

(2) After the completion of the I/O process, the microprocessor 401 subjects the data stored in the I/O buffer region 402B to the selection and extraction (that is, restriction and projection treated in the relational algebra) of the field necessary for the post process in a tuple, the field being described under the selection condition (condition for SELECT) 402C previously sent from the control processor (not shown) via the input line 416 (step 401B). The selection condition 402C may be written or described with a descriptive language such as SQL, a lower level language, or the program itself running in the microprocessor 401. Since these are not related to the substance of the present technology, the detail explanation will be omitted here.

(3) The microprocessor 401 next performs the Hash process to the respective tuples extracted in the above-mentioned process (step 401C; Hash) and then decides the ID (the output value of a predetermined evaluation function) of the bucket to which the tuple belongs.

Figure 43:
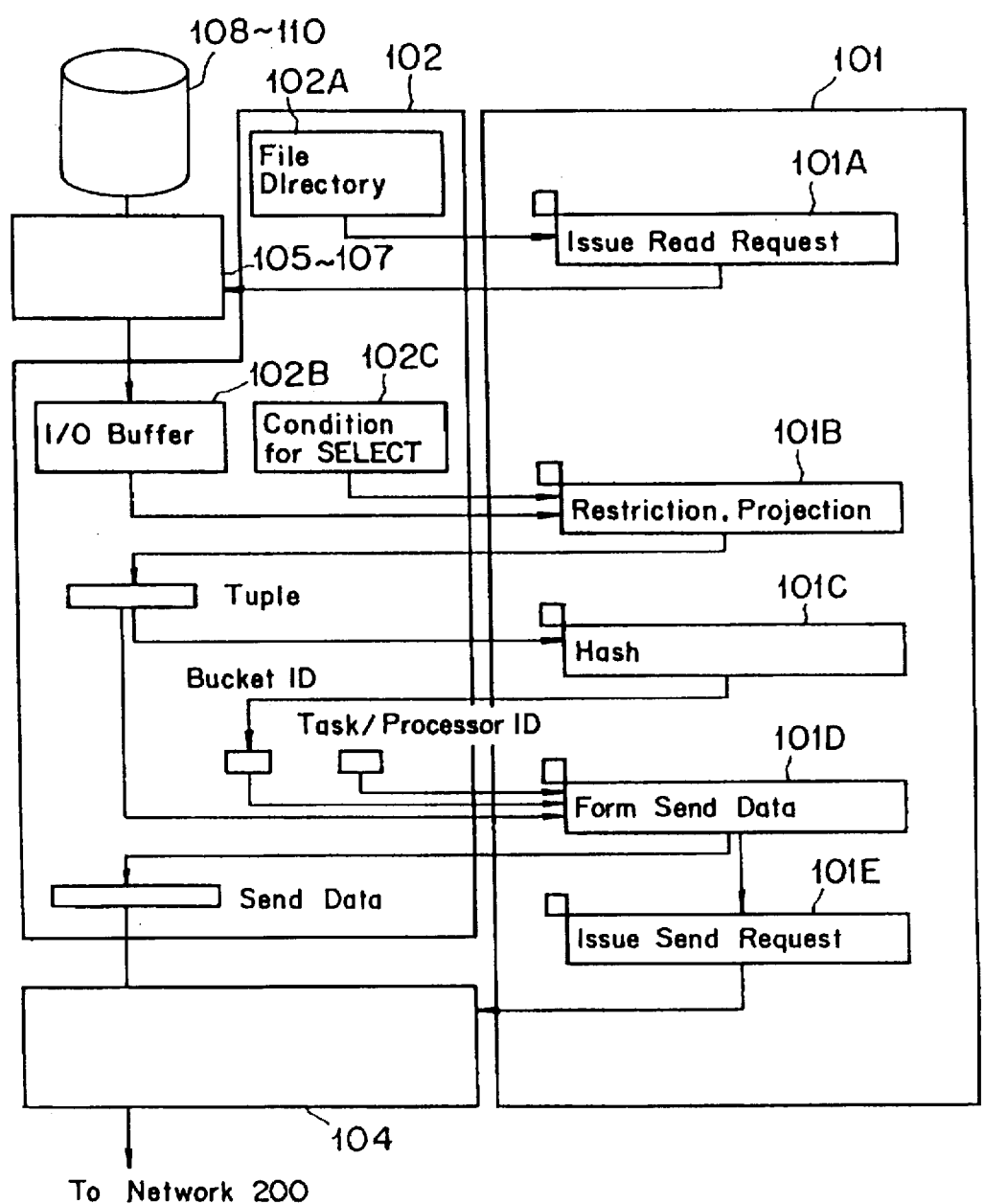
FIG. 43 is a block diagram showing the operational algorithm of a S-DPr in a general parallel processor unit.

The above-mentioned operations (1) to (3) are totally the some as those of the existing technology described with FIG. 43.

(4) After deciding the bucket ID, the microprocessor 401 decides the row to be referred with the transfer destination processor decision table 420 using the bucket ID and then obtains the smallest column in the row (the column in which the smallest count value is described). In explanation of the example shown in FIG. 3, when the bucket ID is "5", the row to be referred is the fifth row (the leading row is the 0-th row corresponding to the bucket ID "0"). When the content is identified with one shown in FIG. 3, the third column (similarly, the leading row corresponds to the 0-th column) with the smallest value "15" is selected. Then the column number is converted into the processor ID by consulting the conversion one-dimensional list 421 so that the identifier "1F" (in hexadecimal notation) of the destination processor (T-DPr) can be obtained (step 401D; "Scan Row & Fix T-DPr").

(5) The microprocessor 401 changes the content from "15" to "16" by incrementing the content of (the fifth row, the third column) in the table 420 by 1 (step 401E; "Increment Table 420"), the table 420 being specified by the above-mentioned process. That is, the content of the table 420 represents that how many tuple data each with the bucket ID corresponding to each row are transferred to the T-DPrs (700A to 700C) each corresponding to each column. In the processes, as to data transferred from the S-DPrs 400A to 400C, tuples with bucket IDs are transferred nearly equally in number (within an error of±1) to each of the T-DPs 700A to 700C belonging to the T-DPr group 700.

(6) Next, the microprocessor 401 prepares transfer data in the format (shown in FIG. 5) to be transferred into the main storage unit 402, the transfer data being selected from the processor identifier of the S-DPrs 400A to 400C, the task identifier (task ID), the bucket ID, and the processor identifier example shown in FIG. 3, when the bucket ID is "5", the row to be referred is the fifth row (the leading row is the 0-th row corresponding to the bucket ID "0"). When the content is identified with one shown in FIG. 3, the third column (similarly, the leading row corresponds to the 0-th column) with the smallest value "15" is selected. Then the column number is converted into the processor ID by consulting the conversion one-dimensional list 421 so that the identifier "1F" (in hexadecimal notation) of the destination processor (T-DPr) can be obtained (step 401D; "Scan Row & Fix T-DPr").

(5) The microprocessor 401 changes the content from "15" to "16" by incrementing the content of (the fifth row, the third column) in the table 420 by 1 (step 401E; "Increment Table 420"), the table 420 being specified by the above-mentioned process. That is, the content of the table 420 represents that how many tuple data each with the bucket ID corresponding to each row are transferred to the T-DPrs (700A to 700C) each corresponding to each column. In the processes, as to data transferred from the S-DPrs 400A to 400C, tuples with bucket IDs are transferred nearly equally in number (within an error of ±1) to each of the T-DPs 700A to 700C belonging to the T-DPr group 700.

(6) Next, the microprocessor 401 prepares transfer data in the format (shown in FIG. 5) to be transferred into the main storage unit 402, the transfer data being selected from the processor identifier of the S-DPrs 400A to 400C, the task identifier (task ID), the bucket ID, and the processor identifier and the tuple data of the destination T-DPr (step 401F; "Form Send Data").

(7) The microprocessor 401 indicates the leading address of the transfer data in the main storage unit 402 and then designates the output port circuit 404 to perform an output process (step 401G; "Issue Send Request").

(8) The microprocessor 401 repeats the above operation till all the tuples in a table to be processed which is stored in the I/O units 408 to 410 connected to the S-DPrs 400A to 400C have been completely read grid then reports the process completion to the control processor (not shown).

Figure 8:
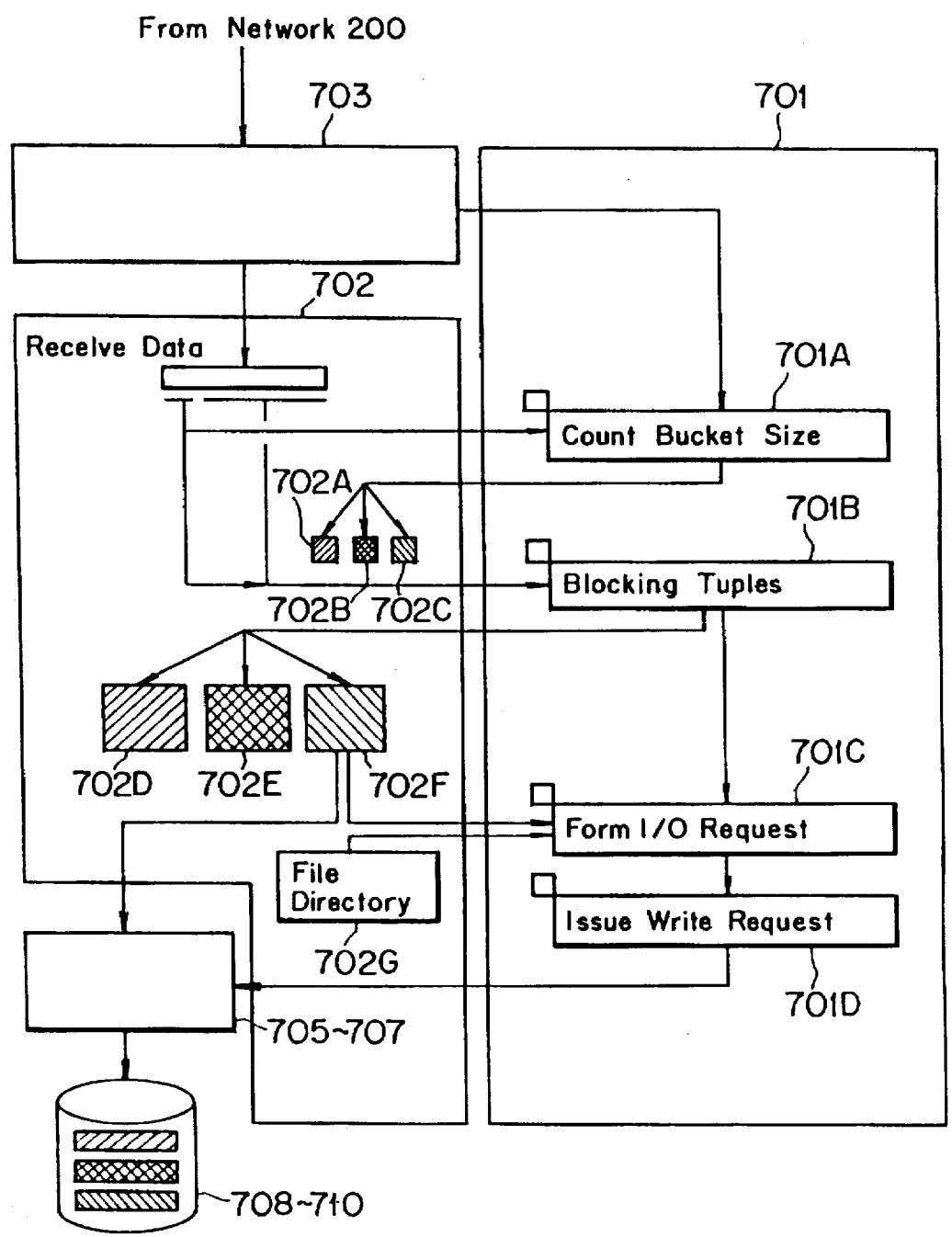
FIG. 8 is a diagram used for explaining the operational algorithm for a T-DPr according to the first embodiment.

Next, the operational algorithm of each of the T-DPrs 700A to 700C in the system according to the first embodiment constituted above is shown in FIG. 8. As shown in FIG. 8, the operational algorithm of each of the T-DPrs 700A to 700C according to the present embodiment is the same as the operational algorithm of the T-DPr side in the existing technology shown in FIG. 44.

The only difference is that the input port circuit 703 must have intelligence that ascertains the arrival of transfer data to the serf processor and reports it to the microprocessor 701.

In other words, after the input port circuit 703 has made sure the arrival of the transfer data to the serf processor, each of the T-DPrs 700A to 700C operates using the operational algorithm being exactly the same as that in the existing technology. Hence the detail explanation will be omitted (for the details, refer to the explanation with FIG. 44 and the items (E1) to (E4)).

Figure 44:
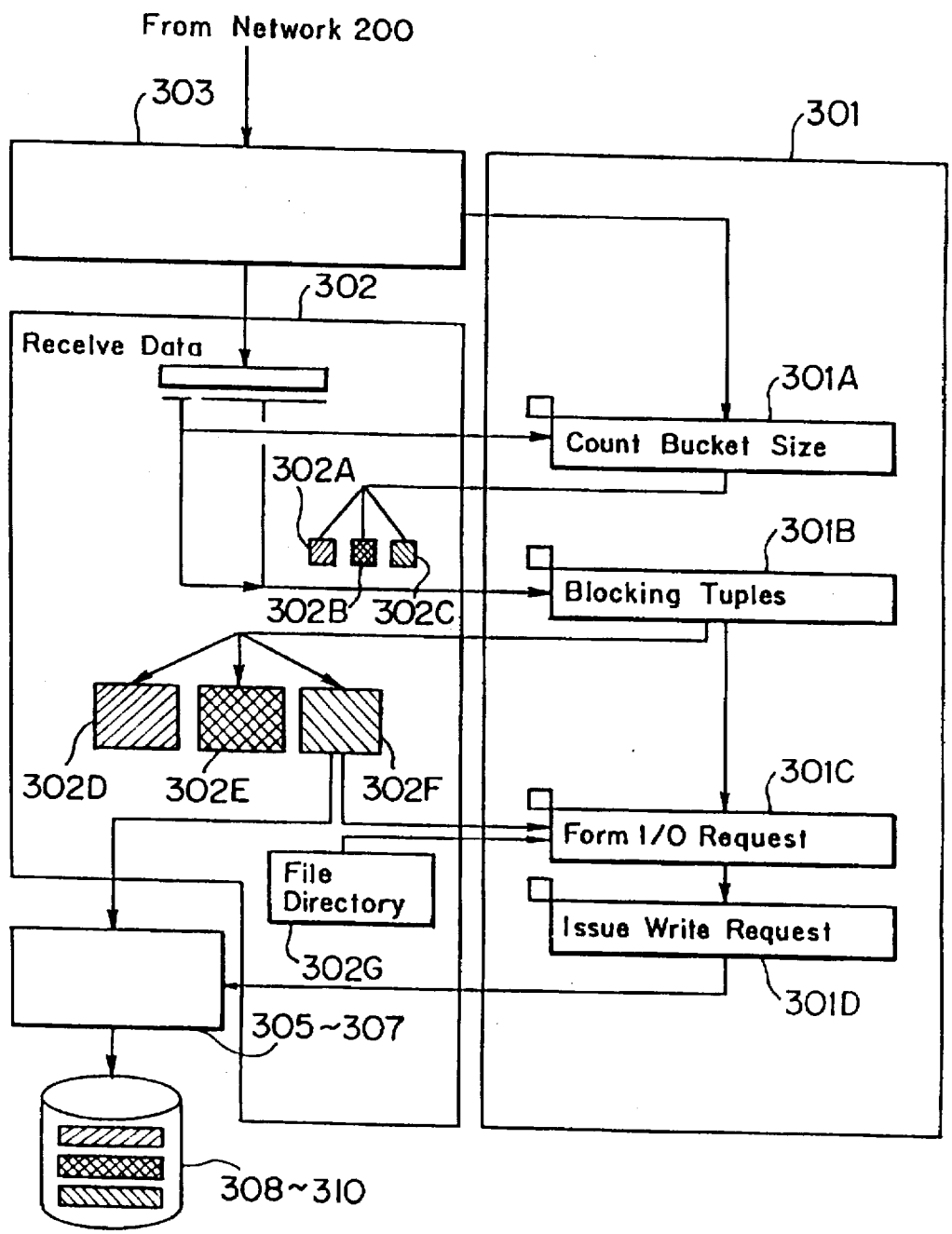
FIG. 44 is a block diagram showing the operational algorithm of a T-DPr in a general parallel processor unit.
Figure 45:
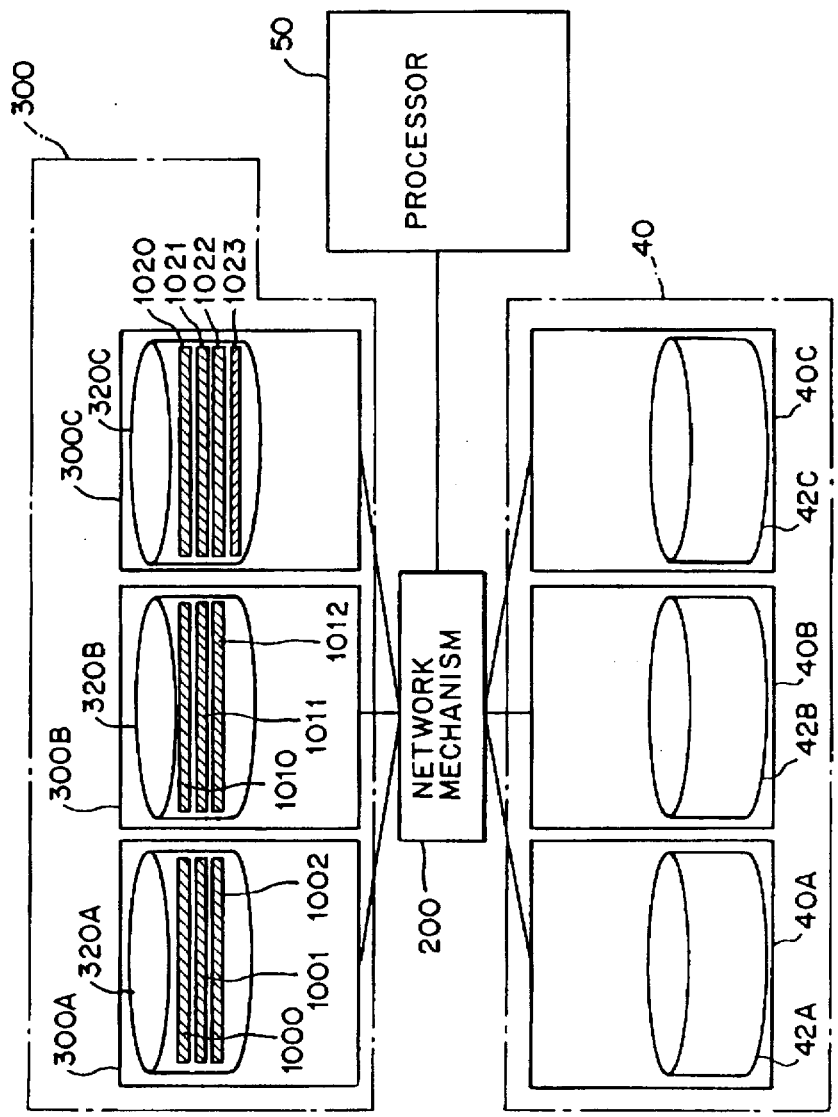
FIG. 45 is a block diagram showing the entire configuration of another example of a general parallel processor system.

In FIG. 8, the constituent elements respectively attached with the numerals 702A to 702G correspond exactly to the constituent elements respectively attached with the numerals 302A to 302G shown in FIG. 44. The process including the steps 701A to 701D shown in FIG. 8 corresponds exactly to the process including the steps 301A to 301D shown in FIG. 44.

The following effects can be obtained by the parallel processor system according to the first embodiment of the present invention.

The main effect is that the amount of hardware can be reduced in the portion of the network mechanism 600. In the existing technology, the above-mentioned multi-network configuration is essential and the switching unit requires a considerable high intelligence. Hence the amount of hardware increases as a matter of course. However, as described above, in the parallel processor system according to the first embodiment, even if the network mechanism 600 is the multistage network or the common bus, the network mechanism 600 does not require any special mechanism and function.

Particularly, the problem is the amount of the logical circuits except memories acting as necessary work memories. As to the memory capacity, in the existing technology, the total capacity of register regions within the switching unit is of the order of $n^2 \log n$ where n is the number of processors. On the other hand, the total capacity of the transfer destination processor decision table 420 being an alternative of the present embodiment is of the order of $n^3$. The difference in memory capacity expands rather. However, the cost to the capacity of the current memory is sufficiently low. On the other hand, the cost of the logical circuit, if the developmental cost is also taken into account, becomes incomparatively high to that of the memory, in use of the number of transistors with the same amount.

For example, the existing technology may allow the microprocessor being of the same kind as the S-DPr and T-DPr in the switching unit to be used. In this case, the entire cost (system cost) becomes at least (1+log n) times as high as the processor cost. Where n is of the order of several hundreds, this value suggests that the system cost may become more than six to seven times as high as the processor cost.

On the other hand, even if n is in the order of several hundreds, the capacity of the transfer destination processor decision table 420 is of the order of at most several MB in one processor. This does not correspond to a sole high-performance processor chip in cost. That is, according to the present embodiment, the system cost added does not reach the original cost on the processor side. Hence it is clear that there is an advantage in cost.

(b) Explanation of Second Embodiment:

(b1) Constituent Requirements needed in Second Embodiment:

The second embodiment relates to the art regarding the parallel processor system according to the second aspect of the present invention. The essential constituent elements in the second embodiment are shown in the following items (1) to (9).

(1) Like the first embodiment, the counter table (transfer destination processor decision table) by which the factor (count value) is determined by the identifier and bucket ID of the T-DPr is arranged in the relating task unit within the S-DPr.

(2) The queue mechanisms (transfer queues) each including transfer data as an entry corresponding to each of the transfer T-DPrs in a task are individually prepared in the S-DPr. As to the management algorithm of each transfer queue, it is unnecessary to adopt particularly a FIFO memory. However, as to the stationary expected value of a queue length with no halfway secession, the control algorithm must be adopted as a rule to have the same value as that of each transfer queue managed by the FIFO memory.

(3) The mechanism that reports "the number of tuples not yet transferred" to "transfer destination processor deciding process" executed for the same S-DPr process (storage number detecting means for detecting the number of entities (tuples) to be transferred stored in each transfer queue) is prepared for each transfer queue.

(4) When the Hash value (bucket ID) of one tuple is decided, the "transfer destination processor deciding process" searches for a factor with the smallest current value among accessible factors (corresponding to each T-DPr) using the bucket ID in the transfer destination processor decision table and then decides the corresponding T-DPr as a destination processor to which the tuple is transferred.

(5) Thereafter, the S-DPr adds a factor to (a value multiplied by a positive integer except 0), where the factor corresponds to the bucket ID and the transfer destination T-DPr in the transfer destination processor decision table, and the value is the number obtained by adding one (by the tuple of which the transfer destination is decided at the time) to "number of tuples not yet transferred" currently stored in the transfer queue corresponding to the task and the T-DPr.

(6) The T-DPr side triggers actually the data transfer from a S-DPr to a T-DPr. Each T-DPr can issue a trigger signal aiming at "transmit one unit (one tuple in the second embodiment)" to each S-DPr. If data to be transferred (data for the task and the T-DPr which exists in the transfer queue, but not yet transferred) exists, the S-DPr which accepts the trigger signal transfers data in one unit to the T-DPr according to the instruction from the T-DPr. After transmission, the S-DPr reduces "the number of data not yet transferred" existing in the corresponding transfer queue by one tuple transferred.

(7) When the trigger signal is transferred, if not including data not yet transferred to the T-DPr, the S-DPr responds to the T-DPr that "there are no data to be currently transferred", thus performing no data transmission.

(8) In the process in which a T-DPr (accurately, a physical processor which is instructed to operate as a T-DPr in a task) operates as a T-DPr in a task, a transmission process trigger signal with an equal frequency is transferred to each S-DPr belonging to the S-DPr group regarding the task.

(9) When new data inputting becomes possible in the progress of the T-DPr process, the trigger signal is issued from a T-DPr to the S-DPr group. That is, the process speed of the T-DPr is proportional to the trigger signal issuing frequency, judging from the relatively long period of time.

(b2) Explanation of Legitimacy of Second Embodiment:

In the second embodiment having the above-mentioned constituent elements, each T-DPr transfers evenly the trigger signal to each S-DPr. If the frequency is proportional to the operational speed (the process speed of the task and the T-DPr) of the T-DPr, judging from a relatively long period of time, the trigger signal arrival frequency viewed from a S-DPr is proportional to the operational speed of each T-DPr or the operation performance of the T-DPr in the task.

The length of the queue mechanism (transfer queue) corresponding to each task and T-DPr prepared by the S-DPr can be approximated to nearly $\rho/(1-\rho)$, where $\rho$ is (the tuple entry frequency to each transfer queue)/(the frequency that the trigger signal for the task is transferred from the corresponding T-DPr).

If the destination decision algorithm on the S-DPr side corresponds to "control the queue length to be equal to any T-DPr in terms of a single task", $\rho_0/(_1-\rho 0)=\rho 1/(1-\rho 1)$ is held. Since $0 \leq \rho_0 \leq 1$ and $0 \leq \rho_1 \leq 1$, $\rho_0 = \rho_1$ is held. This means that "the tuple entry frequency to the transfer queue is proportional to the process performance of the T-DPr corresponding to the transfer queue".

However, an instantaneous value of the queue length is not always proportional to the operation performance of the T-DPr, because, when a time lag between the run timing in the process on the S-DPr side and the run timing of the process on the T-DPr side in a task occurs, each queue length extends easily due to only the time lag. Averaging the queue length on the time axis is necessary to evaluate the queue length. The evaluation of the queue length can be established by controlling the value, which is made by adding the queue length to the factor in the transfer destination processor decision table, to be equal.

The tuple entry frequency to the transfer queue is a transfer frequency from the S-DPr to T-DPr. That the tuple entry frequency is proportional to the process performance on the T-DPr means that the transmission amount from the S-DPr to each T-DPr is proportionally distributed to the process performance of the T-DPr side. Since the process performance of the T-DPr side is evaluated with the total performance which takes the MIMD skew and the generation rate skew of the T-DPr into consideration, one of the objects of the present invention, or "making it possible to deal with the generation rate skew and the MIMD skew of the T-DPr side", can be realized.

Figure 9:
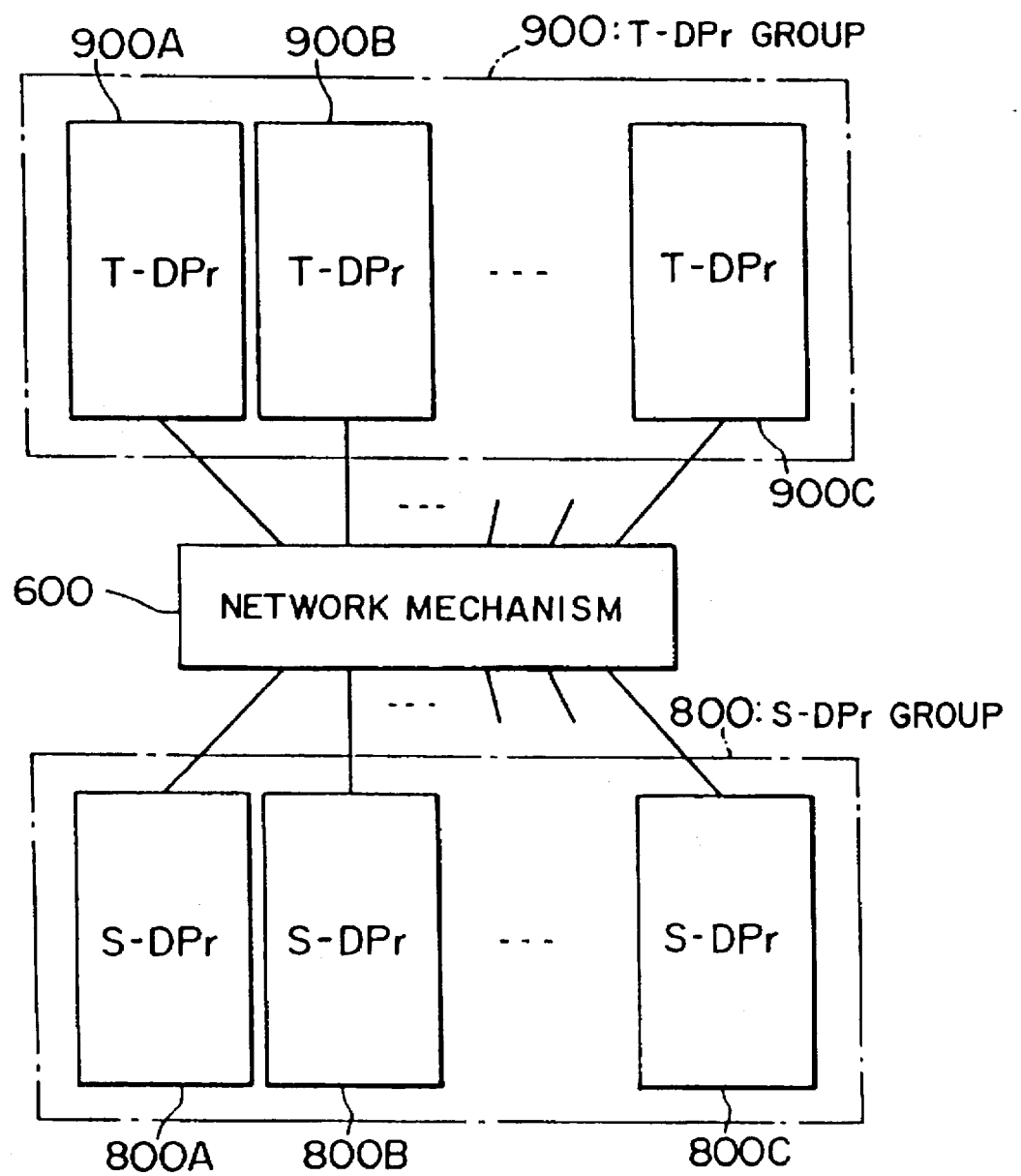
FIG. 9 is a block diagram showing the entire configuration of the parallel processor system according to the second embodiment of the present invention.

(b3) Explanation of Assembling Aspect of Second Embodiment:

FIG. 9 is a block diagram showing the entire configuration of the parallel processor system according to the second embodiment of the present invention. Referring to FIG. 9, numeral 800 represents a S-DPr group including plural S-DPrs 800A, 800B, . . . , 800C; 600 represents a network mechanism, with the same configuration as that in the first embodiment, which can transfer data from any one of the S-DPrs 800A to 800C belonging to the S-DPr group 800 to an arbitrary T-DPr (to be described later); and 900 represents a T-DPr group including plural T-DPrs 900A, 900B, . . . , 900C.

Figure 10:
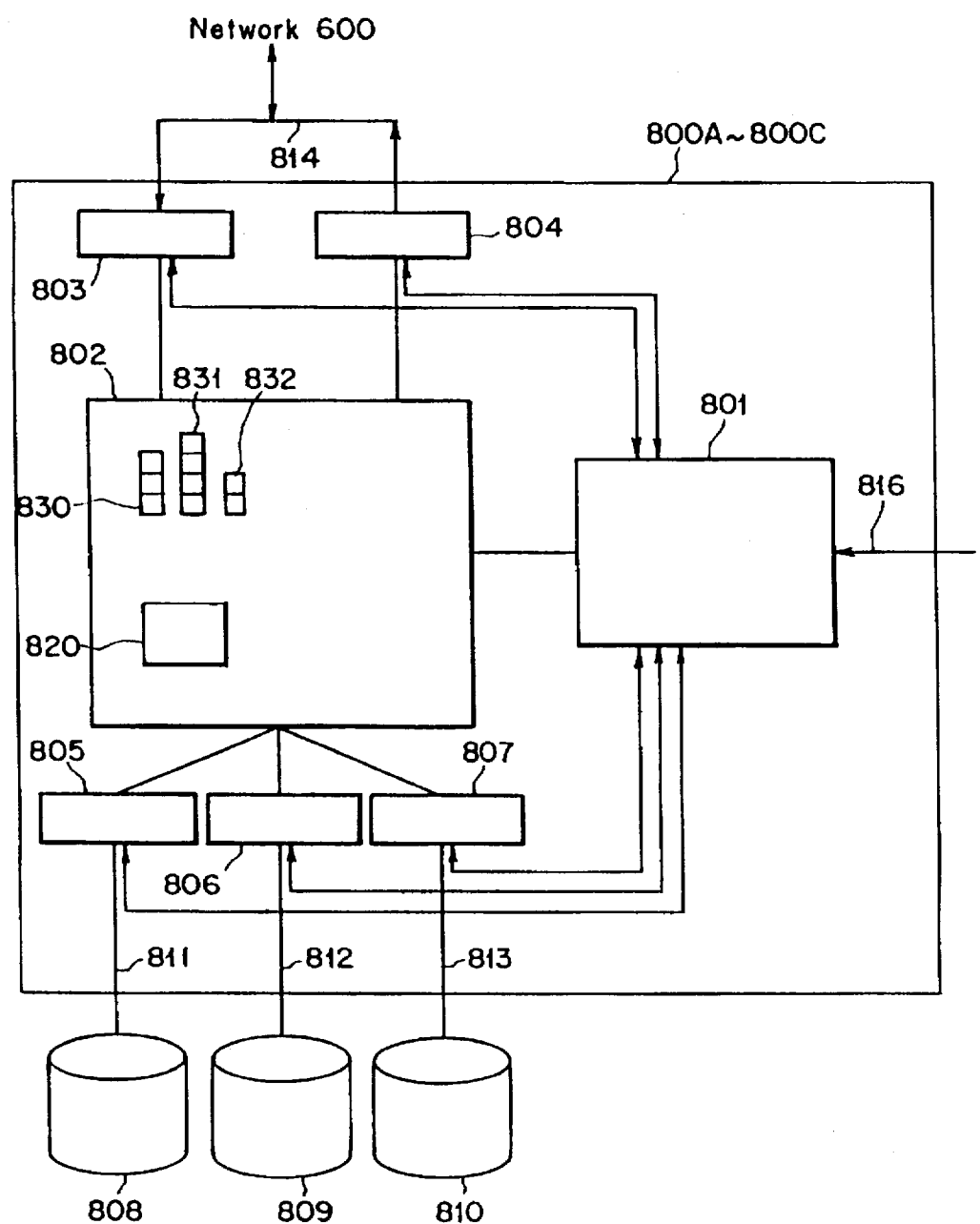
FIG. 10 is a block diagram schematically showing the internal hardware configuration of a S-DPr according to the second embodiment.

FIG. 10 is a block diagram showing schematically the internal hardware configuration of the S-DPr in the second embodiment. Referring to FIG. 10, the hardware configuration of each of the S-DPrs 800A to 800C is the same as that in the first embodiment shown in FIG. 2, except the elements 830 to 832. In other words, the elements with numerals 801 to 814, 816, and 820 shown in FIG. 10 correspond respectively to the elements with numerals 401 to 414, 416, and 420 shown in FIG. 2.

Explanation will be made below as to each of the S-DPrs 800A to 800C in the second embodiment, particularly only the different portions from that in the first embodiment.

In the second embodiment, the input port circuit 803 operates, viewed from the microprocessor 801. That is, when receiving the transmission trigger signals from the T-DPrs 900A to 900C, the input port circuit 803 transfers the contents to the microprocessor 801 according to the algorithm (to be described later).

The transfer destination processor decision table 820 corresponds structurally to the table 420 in the first embodiment. The conversion one-dimensional list (not shown in the second embodiment) that converts the identifier of a column in the table 820 into the processor identifier of the T-DPr corresponds structurally to the list 421 in the first embodiment. However, there is a difference (to be described later) between the first and the second embodiments in the algorithm for updating the content in the table 820.

The transfer queues (queue mechanisms) 830 to 832 are arranged on the main storage unit 802 in each of the S-DPrs 800A to 800C in the second embodiment. These queue 830 to 832 have the transmission data (tuple) as an entry corresponding to the transfer destination T-DPrs 900A to 900C respectively in a single task.

Figure 11:
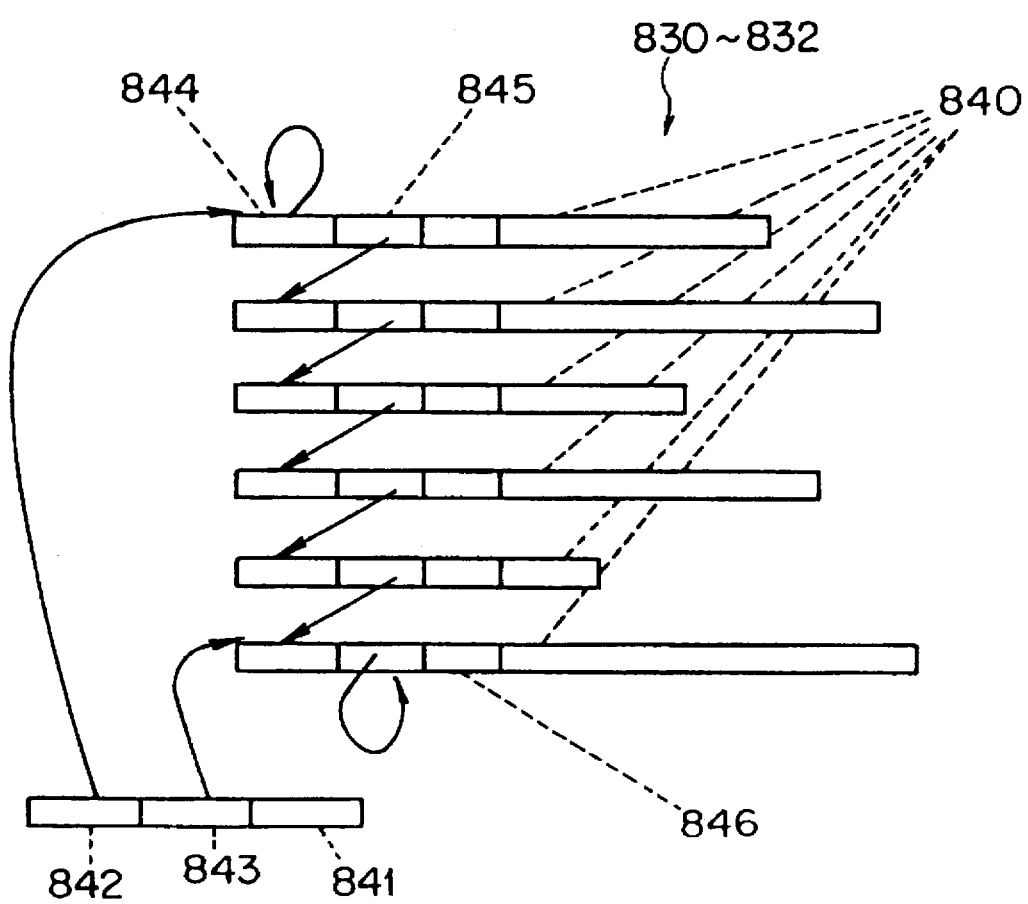
FIG. 11 is a diagram showing an example of the configuration of a transfer queue according to the second embodiment.

FIG. 11 is a diagram showing an example of the configuration of the transfer queue in the second embodiment. In the configuration of the transfer queue shown in FIG. 11, the transfer units in the second embodiment (the same transfer unit as that in the first embodiment shown in FIG. 5) are connected with bi-directional pointers. This configuration is common to each of the transfer queues 830 to 832. One transfer queue (queue mechanism) is prepared corresponding to each task and each of the T-DPrs 900A to 900C.

In this embodiment, it is assumed that the transfer data (Send Data) 840 once input into each of the transfer queues 830 to 832 is not dequeued on the way of the transfer queues 830 to 832 without being transferred.

When the transfer data 840 is newly enqueued into each of the transfer queues 830 to 832, it is connected to the tail of the list structure and then added to the content of the queue length field 841 (shown in FIG. 11) by one. When the transfer data 840 is newly dequeued from each of the transfer queues 830 to 832, it is dequeued from the leading portion of the list structure and then subtracted from the content of the queue length field 841 (shown in FIG. 11) by one.

"The number of non-transferred data" (the amount of data not transferred, the number of non-transferred tuples) is a value held in the queue length field 841. In the process (microprocessor 801) executed by each of S-DPrs 800A to 800C, the number of data which is not transferred to the task and each of the T-DPrs 900A to 900C can be recognized by reading the value of the field 841.

Hence, the storage number detecting means (for detecting the number of entities (tuples) to be stored into each of the transfer queues 830 to 832) can be formed by preparing the queue length field 840 readable from the above-mentioned process (microprocessor 801).

Referring to FIG. 11, numeral 842 represents a pointer (Top of Queue Pointer) showing the leading position of each of the transfer queues 830 to 832; 843 represents a pointer (Bottom of Queue Pointer) showing the tail position of each of the transfer queues 830 to 832; 844 represents a pointer (Previous Entry Pointer) attached to each of the transfer data 840 and showing the previous entry position; 845 represents a pointer (Next Entry Pointer) showing the next entry position attached to each of the transfer data 840; and 846 represents a field attached to each of the transfer data 840 and holding the byte number (Byte Count of Sent Data) of the transfer data 840.

Figure 12:
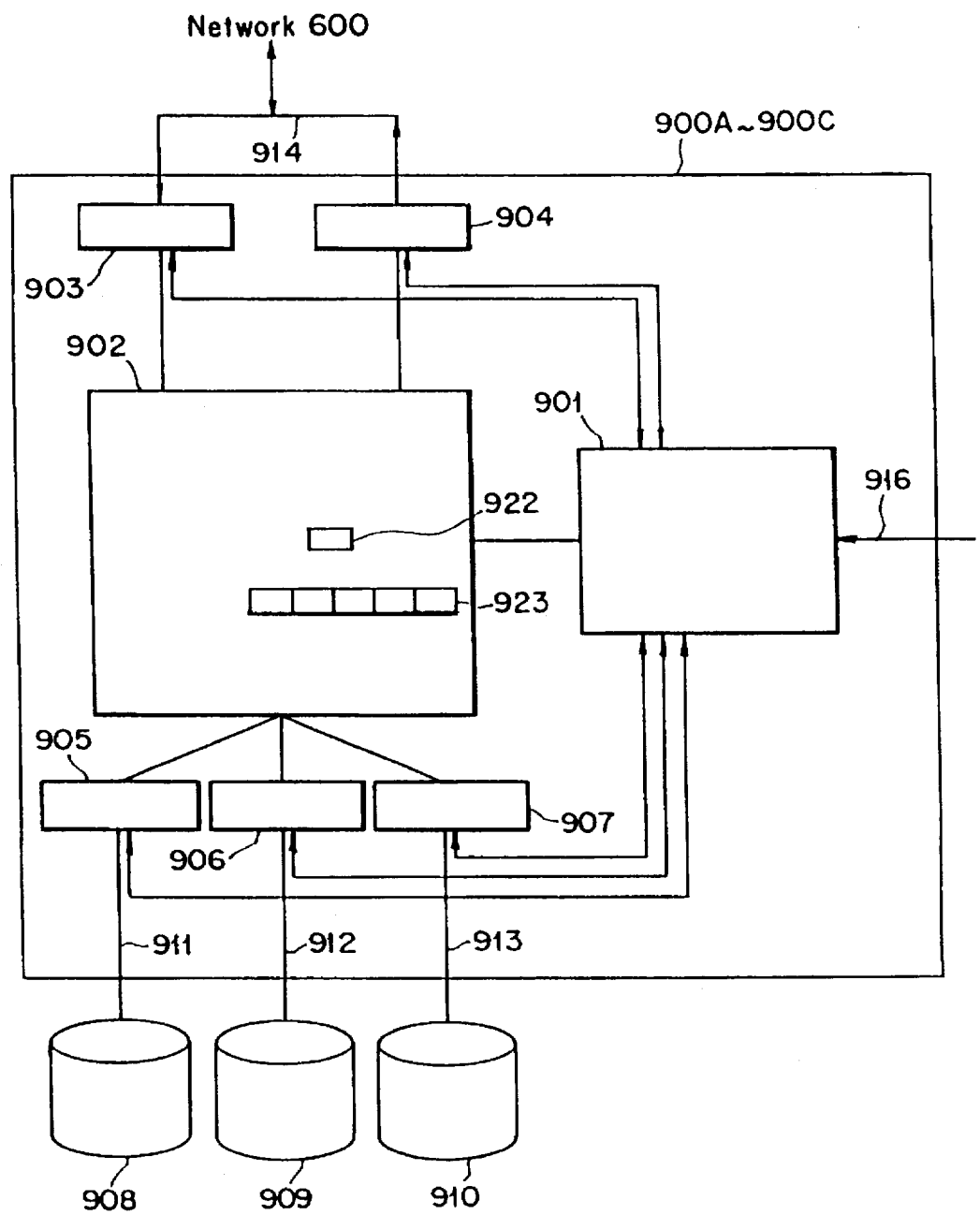
FIG. 12 is a block diagram schematically showing the internal hardware configuration of a T-DPr according to the second embodiment.

FIG. 12 is a block diagram showing schematically the internal hardware configuration of the T-DPr in the second embodiment. As shown in FIG. 12, the hardware configuration of each of the T-DPrs 900A to 900C corresponds to that of the first embodiment shown in FIG. 6, except the constituent elements with numerals 922 to 923. The constituent elements with numerals 901 to 914, and 916 in FIG. 12 correspond respectively to the constituent elements with numerals 701 to 714, and 716 in FIG. 6. Hence in the second embodiment as well, a sole processor can work as the S-DPr And the T-DPr.

As to the configuration of each of the T-DPrs 900A to 900C in the second embodiment, only the different point from the first embodiment will be described below.

The output port circuit 904 operates according to the designation from the microprocessor 901 to send the transfer trigger signal to each of the S-DPrs 800A to 800C.

In the second embodiment, in order to transfer the transfer trigger signal to All the S-DPrs 800A to 800C at an equal frequency, the object (one of the S-DPrs 800A to 800C), to which the transfer trigger signal is transferred, is decided by the round-robin method is decided.

In order to realize the round-robin method, the one-dimensional table 923 used to convert the round robin pointer 922 and the relative machine number in the S-DPr into the absolute identifier of a physical processor is prepared on the main storage unit 902 of each of the T-DPrs 900A to 900C in the second embodiment. The round robin pointer 922 indicates sequentially positions on the one-dimensional table 923. The transfer trigger signal is transferred to the S-DPrs 900A to 900C corresponding to the relative machine number of the position indicated by the round robin pointer 922.

Figure 13:
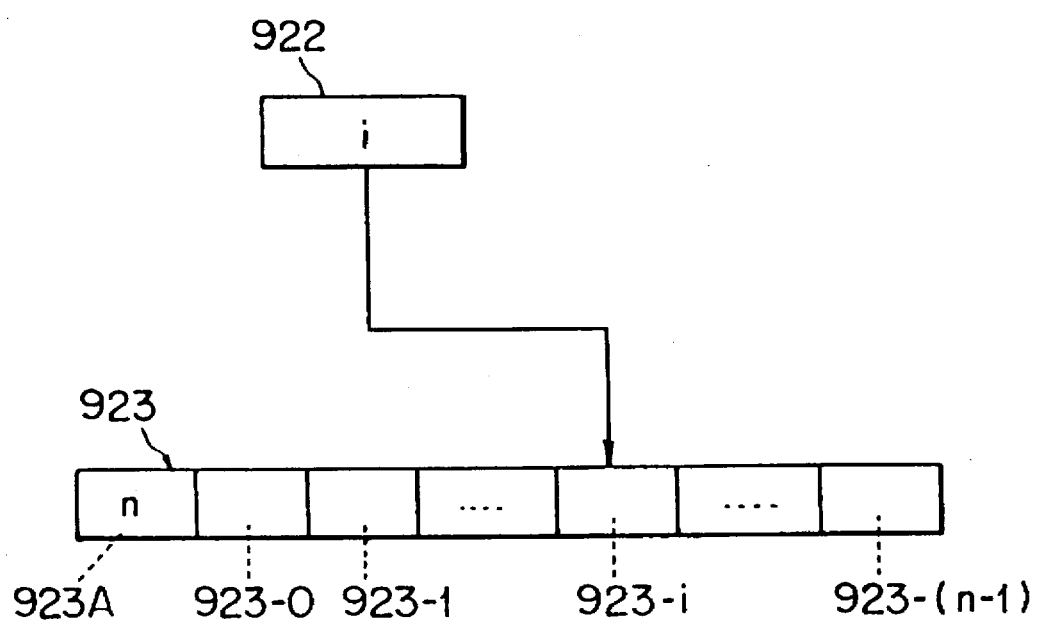
FIG. 13 is a diagram showing an example of the detailed configuration of the one-dimensional table and the pointer to realize a transmission trigger signal sent by a round robin method in a T-DPr according to the second embodiment.

The detail structure of each of the roared robin pointer 922 and the one dimensional table 923 will be shown in FIG. 13. As shown in FIG. 13, in the second embodiment, the one-dimensional table 923 is accessed according to the content of the round robin pointer 922 to convert the relational number in the S-DPr into the identifier of the physical processor.

In the one-dimensional table 923, the identifiers of the number of S-DPrs 800A to 800C participating in the task, for example, n physical processors, are respectively held in the identifier fields 923-0 to 923-(n−1). The information regarding the number of S-DPrs is held in the machine number information field 923A.

The value shown by the round robin pointer 922 is incremented by 1 every time the transfer trigger signal is transferred to the S-DPr and returns again to "0" when it increases from "0" to "n−1" according to the value n held in the machine number information field 923A.

Next, in the system according to the second embodiment constituted above, the operational algorithm of each of S-DPrs 800A to 800C will be explained with reference to FIGS. 14 and 15.

Figure 14:
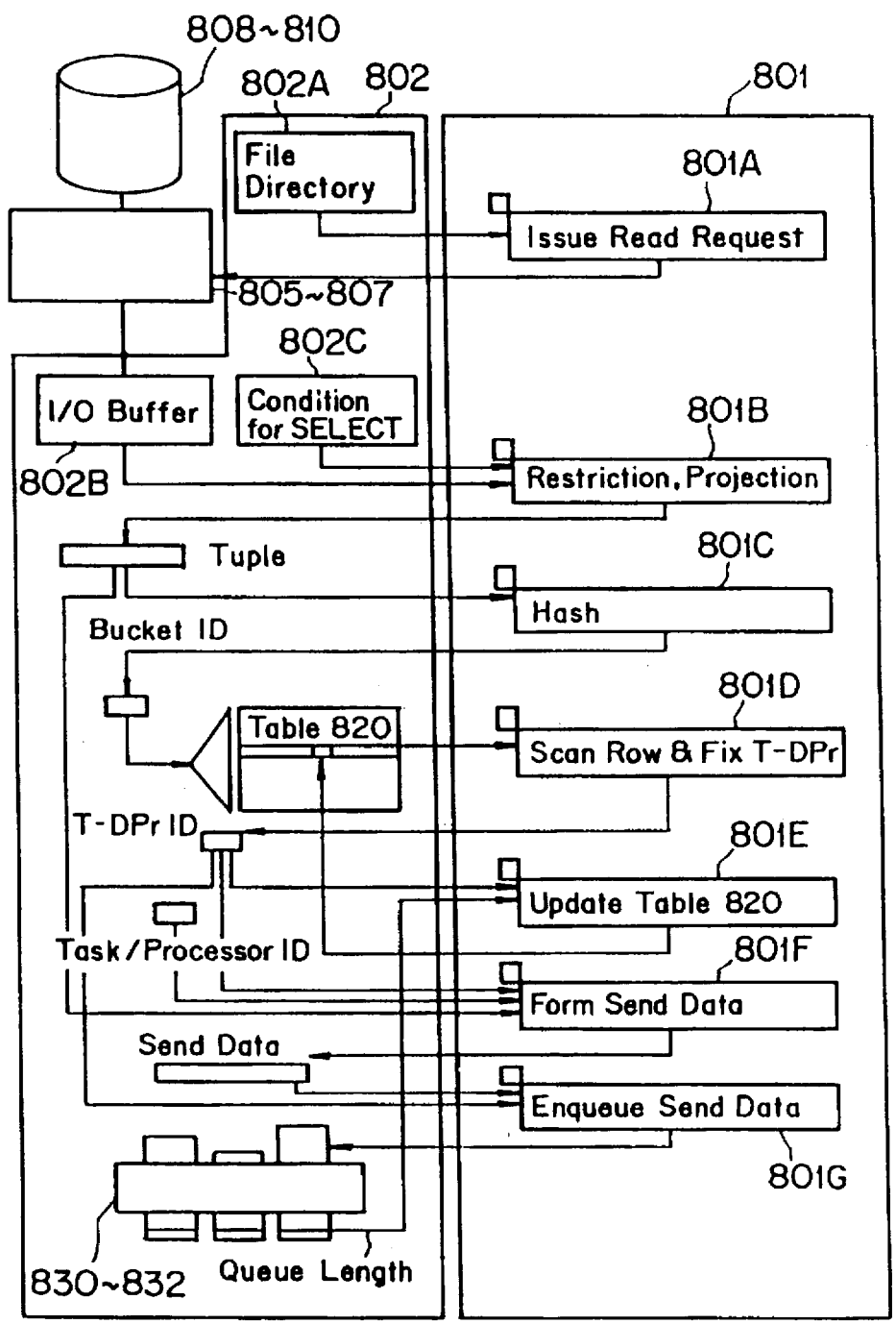
FIG. 14 is a diagram used for explaining the operational algorithm of a S-DPr according to the second embodiment.

(1) FIG. 14 shows the process flow in which each of the S-DPrs 800A to 800C reads tuple data out of the I/O units 808 to 810 under the serf processor and then enters it to any of the transfer queues 830 to 832 to transfer it. In the second embodiment, this process and the actual transfer process are performed asynchronously and independently.

(2) In the operation of each of the S-DPrs 800A to 800C, the step ranging from the Hash process to the bucket ID establishing process is performed similarly to that in the existing technology.

(3) Moreover, the logic which decides the destination processor (T-DPr) using the transfer destination processor decision table 820 is similar to that in the first embodiment. That is, the constituent elements 802A to 802C shown in FIG. 14 are exactly the same as the constituent elements 402A to 402C in FIG. 7, respectively. The steps 801A to 801D in FIG. 14 are exactly the some as the steps 801A to 801D in FIG. 7, respectively.

(4) The microprocessor 801 updates by adding the value of a specific factor in the table 820 specified by the above-mentioned process and "1+the value of the queue length field 841 of a transfer queue (here, with numeral 830) corresponding to the destination T-DPr decided by the above-mentioned process" (the reason why one is added is that one tuple to be subjected directly to the destination decision process is enqueued in the post process) (step 801F; "Update Table 820").

As described above, in the updating process, the value of each element in the transfer destination processor decision table 820 is weighted proportionally to the operation performance of the corresponding one of the T-DPrs 900A to 900C and the weighted value becomes on index showing roughly that how large load regarding what bucket ID is added to each of the T-DPrs 900A to 900C. In the present embodiment, the value of each element in the transfer destination processor decision table 820 is controlled so as to be equalized as much as possible to every T-DPr in a bucket ID.

(5) The transfer data format is the same as that of the first embodiment shown in FIG. 5 and the data format formation work is the same as that of the first embodiment (step 801G; "Form Send Data").

(6) The microprocessor 801 enqueues the transfer data to the transfer queue 830 corresponding to a specific destination T-DPr (step 801H; "Enqueue Send Data"). Thereafter, the operation by which the transfer data is actually transferred to each of the T-DPrs 900A to 900C is not performed until the transfer trigger signal is transferred from each of the T-DPrs 900A to 900C.

Figure 15:
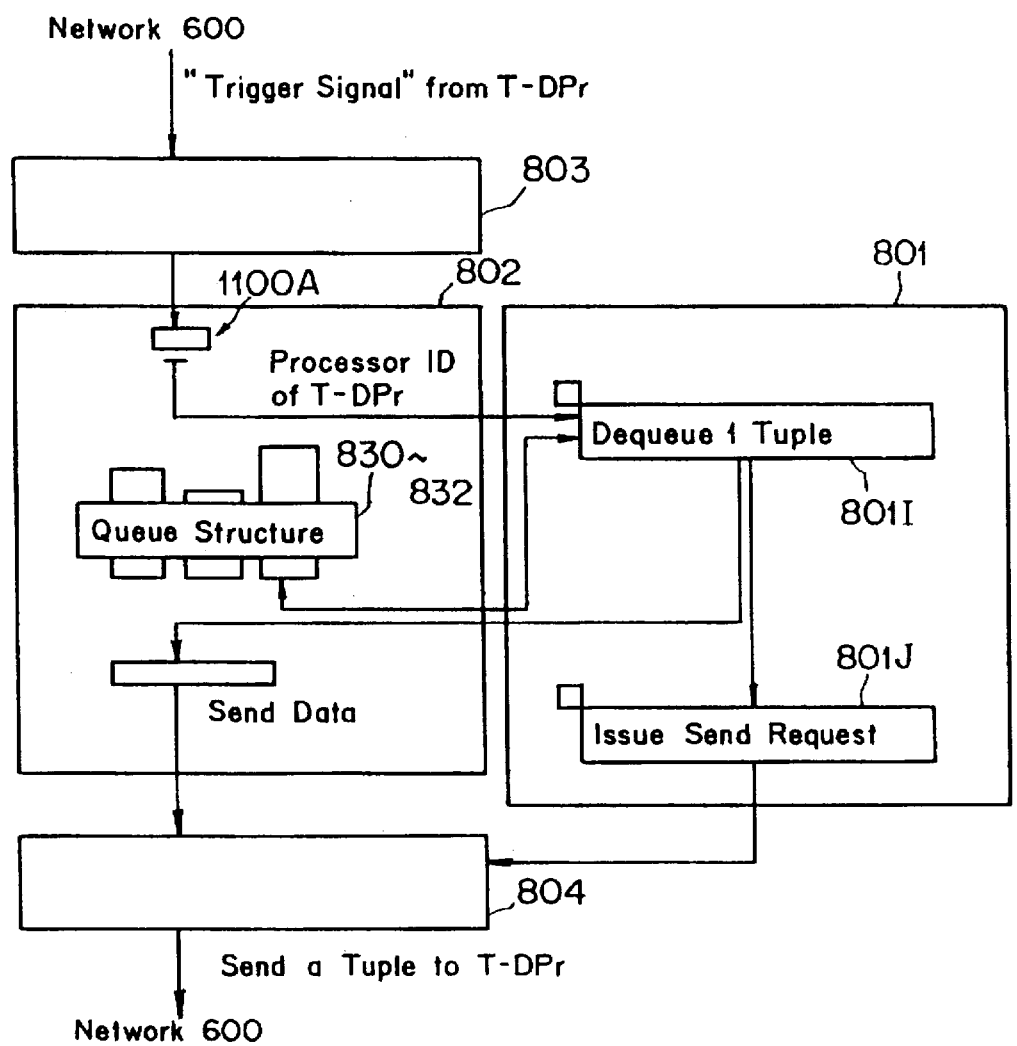
FIG. 15 is a diagram used for explaining the operational algorithm of a S-DPr according to the second embodiment.
Figure 16:
FIG. 16 is a diagram used for explaining the operational algorithm of a S-DPr according to the second embodiment.

(7) The process procedure for actually transferring from the side of the S-DPrs 800A to 800C to the side of the T-DPrs 900A to 900C is shown in FIG. 15. When the trigger signal indicating the beginning of a transmission process is transferred from the side of the T-DPrs 900A to 900C, the input port circuit 803 reports the arrival of the trigger signal to the microprocessor 801 by the interruption. In response to the capture permission from the microprocessor 801, the input port circuit 803 stores the telegram 1100A as a trigger signal into address on the main storage unit 802 designated by the microprocessor 801. FIG. 16 shows an example of the format of the telegram 1100A for the trigger signal.

(8) In FIG. 16, numeral 1100 is a control information field being the same as those attached with numerals 290 and 500. That the transfer data has the following format is marked to the control information field 1100. Numeral 1101 represents a field holding the physical processor identifier of a destination S-DPr (that is, a processor of interest); 1102 represents a field holding the physical processor identifier of each of the originating T-DPrs 900A to 900C; and 1103 represents a field to which the content indicating the trigger signal is described according to a telegram described by software running on each of the T-DPrs 900A to 900C. In the second embodiment, only a fixed number (e.g. one tuple) of transmission units are transferred in response to one trigger signal. Hence in the telegram format shown in FIG. 16, there are no fields indicating the number or the length of data to be transferred.

(9) The microprocessor 801 recognizes the telegram 1100A as the transfer trigger signal by referring to the field 1103 of the telegram 1100A stored in the main storage unit 802. Similarly, the microprocessor 801 recognizes the destination T-DPr identifier to be transferred by referring to the field 1102.

(10) The microprocessor 801 judges whether the value of the queue length field 841 is "0", by referring to the transfer queue 830 (or 831, 832) corresponding to the T-DPr being the origin of the transfer trigger signal. If "0", the microprocessor 801 prepares the telegram to the effect that "instantaneously end because of no data to be transferred" and then returns it to the T-DPr originating transfer trigger signal. The telegram format is the same as that shown in FIG. 16. However, the code to which the above effect is described is described in the field 1103.

(11) If the corresponding transfer queue 830 stores non-transferred data at the transfer time of the transfer trigger signal, or the value of the queue length field 841 is not "0", the microprocessor 801 dequeues the transfer data corresponding to one tuple from the transfer queue 830 and then transfers it to the T-DPr originating transfer trigger signal.

That is, the microprocessor 801 dequeues one entry (one tuple) from the top area of the transfer queue 830 (step 8011; "Dequeue 1 Tuple"), and then designates the transmission of the dequeued transfer data by transmitting the top address and the length to the output port circuit 804 (step 801J; "Issue Send Request"). The output port circuit 804 takes the transfer data out of the main storage unit 802 and then transfers it to the T-DPr originating transfer trigger signal.

Since the dequeue process is explained with FIG. 11, the detail explanation will be omitted here. Like the first embodiment, the conversion of the T-DPr identifier into the transfer destination physical processor ID is performed according to the list structure (not shown) attached to the transfer destination processor decision table 820. Hence the detail explanation will be omitted here.

Figure 17:
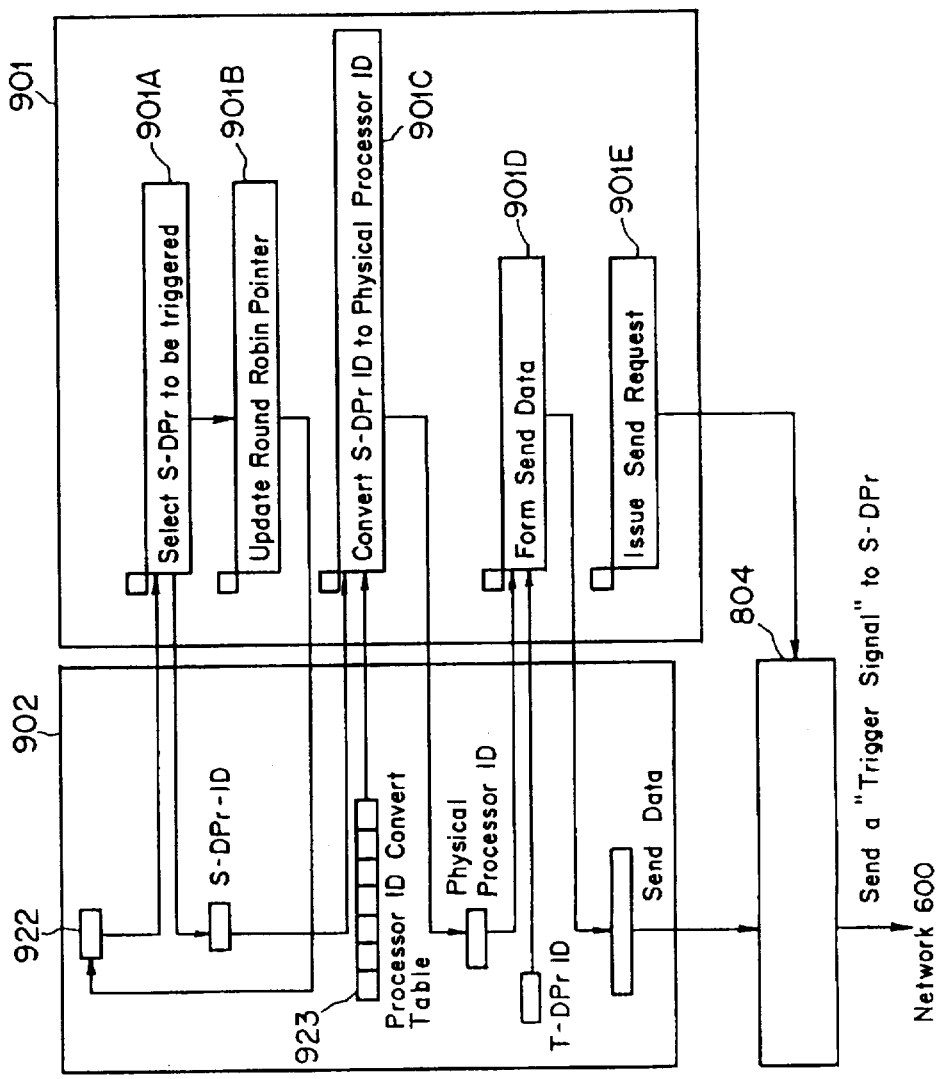
FIG. 17 is a diagram used for explaining the operational algorithm of a T-DPr according to the second embodiment.

FIG. 17 shows the operational algorithm of each of the T-DPrs 900A to 900C in the system according to the second embodiment with the above-mentioned structure.

(1) The operation of each of the T-DPrs 900A to 900C after the data transferring operation of each of the S-DPrs 800A to 800C is similar to the operation of the first embodiment described with FIG. 8 or the operation of the existing technology described with FIG. 44. Hence, the duplicate explanation will be omitted here.

(2) In the second embodiment, the microprocessor 901 (a process realizing the function of the T-DPr) in each of the T-DPrs 900A to 900C accesses to the round robin pointer 922 in the main storage unit 902 when the situation in which the serf processor can accept new data comes, recognizes the relative machine number of a S-DPr to which a trigger signal is transferred for data transmission, and then selects the S-DPr corresponding to the relative machine number as a transfer trigger signal destination (step 901A; "Select S-DPr to be triggered").

(3) Thereafter, the microprocessor 901 updates the value of the pointer 922 by incrementing by one (step 901B; "Update Round Robin Pointer"). As described above, when the value of the pointer 922 equals to (n−1), where n is the number of S-DPrs (the value of the machine number information field 923A) in the table 923, the value of the pointer 922 is reset to "0" by the microprocessor 901.

(4) When the relative machine number of the trigger signal transfer destination is selected based on the value of the roared robin pointer 922, the microprocessor 901 converts the relative machine number into the physical processor identifier of the S-DPr by accessing the table 923 (step 901C; "Convert S-DPr ID to Physical Processor ID"), prepares transfer data (telegram) with the format (shown in FIG. 16) for the trigger signal (step 901D; "Form Send Data"), and sends the telegram to a selected S-DPr (step 901E; "Issue Send Request"). Since the detail of the transfer process is the same as that in the abovementioned example, the explanation will be omitted here.

According to the parallel processor system according to the second embodiment in the present invention, the following effects will be obtained.

The main effect is that the differences in performance between the T-DPrs 900A to 900C due to arbitrary reason are adjusted so that the differences cancel out one another automatically and dynamically in spite of depending on a statistical method. Using the simulation made by the present inventors, it was confirmed that the performance improvement rate ranges from several tens % to several hundreds %, in spite of depending on the operation environment, data, and Hash function.

In the above description, the expression of "arbitrary reason" is used, but, in this embodiment, it is assumed that the MIMD skew and the generation rate skew are main objects to be removed. However, this embodiment is theoretically effective to all reasons such as the degeneracy operation occurrence on the side of the T-DPrs 900A to 900C due to a fault occurrence, and a decrease in performance due to DASD fragmentation.

(c) Explanation of Third Embodiment:

(c1) Constituent Requirements needed in Third Embodiment:

In the third embodiment, the transfer unit transferred from the S-DPr to the T-DPr is an aggregate formed of plural tuple data in the parallel processor system having the same configuration as that in the second embodiment. The essential constituent requirements in the third embodiment include the following items (1) to (3).

(1) In the second embodiment, plural tuples are transferred from the S-DPrs 800A to 800C to the T-DPrs 900A to 900C in a batch transfer process. The member of tuples must be equalized to all the T-DPrs 900A to 900C at least, viewed from a S-DPr.

(2) If the number of tuples transferred in the batch transfer process is m, the tuple group with m tuples corresponds to m pieces of tuple data from the top area in each of the transfer queues 830 to 832 prepared corresponding to each of the T-DPrs 900A to 900C which are the transfer destinations shown in the second embodiment.

(3) In a S-DPr, when the number of tuples stored in the transfer queue corresponding to a T-DPr does not reach m (the number of tuples to be transferred at one time according to the third embodiment), if the trigger signal is transferred from the T-DPr, the S-DPr sends back the response to the effect that "the amount of transfer data stored is not sufficient to transfer" to the T-DPr, thus not performing the data transfer.

Figure 36:
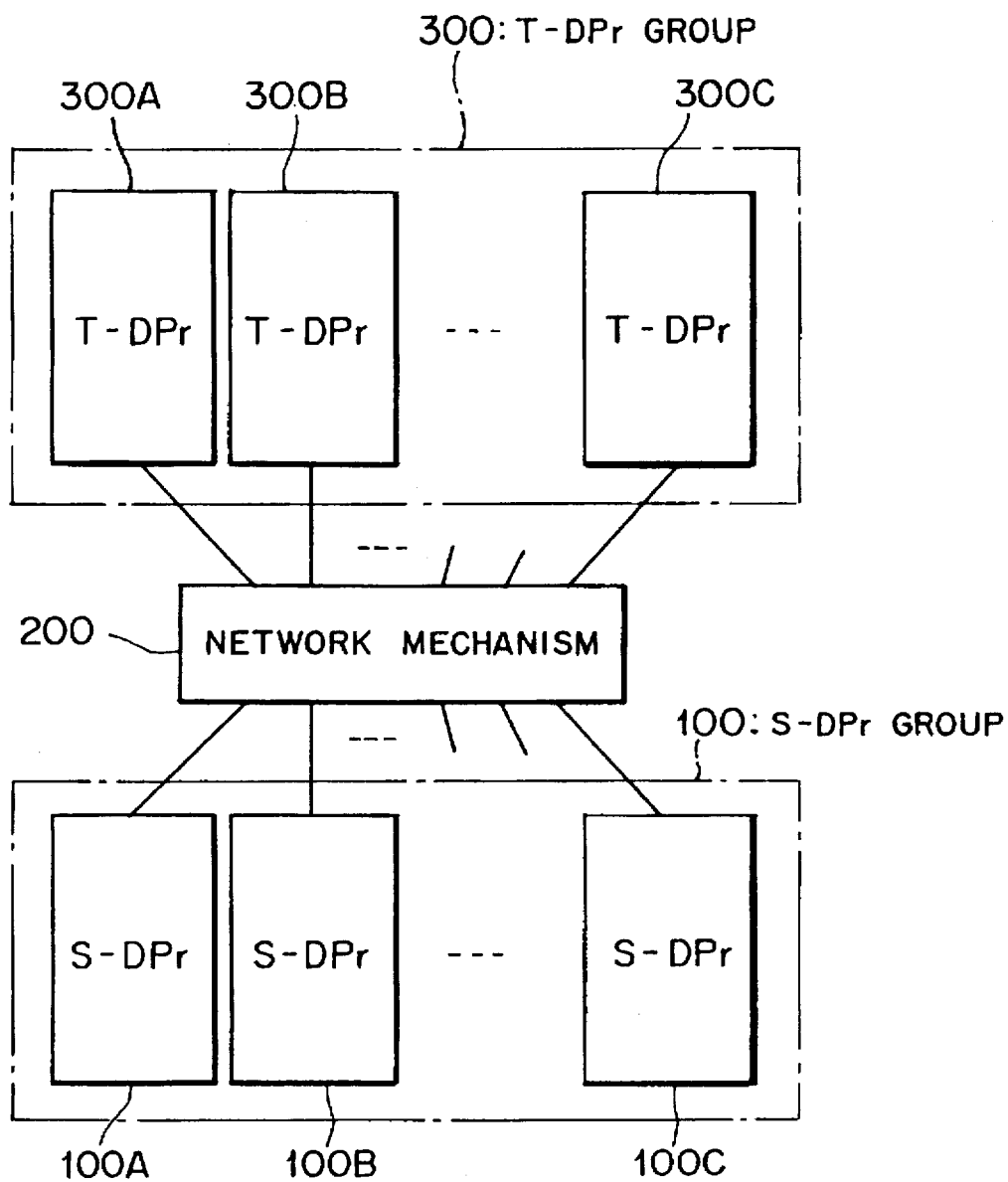
FIG. 36 is a block diagram showing the entire configuration of a general parallel processor system.

(c2) Explanation of Legitimacy of Third Embodiment:

The unit of the leveling process in the existing technology is one tuple unit. The reason is that because the network mechanism (refer to numeral 200 in FIG. 36) refers to each bucket ID and determines dynamically the switching direction, at least all the bucket IDs must be equalized in transfer unit, And blocking and transferring plural tuples of the same bucket IDs causes the following disadvantages.

(1) The number of tuples which must be read to collect plural tuples with the same bucket IDs is uneven, though only the average expected value can be determined. Therefore, it is necessary to prepare the main storage buffer for blocking.

(2) Moreover, if a fixed number of tuples must be collected for data transfer in the event with variations, the period during which transfer is disabled may be largely increased because the fixed number of tuples are not collected to any one of the bucket IDs. When transfer begins, the continuous transfer may be possible. Hence, the factor, that the load on the network varies greatly with respect to time, increases.

Figure 37:
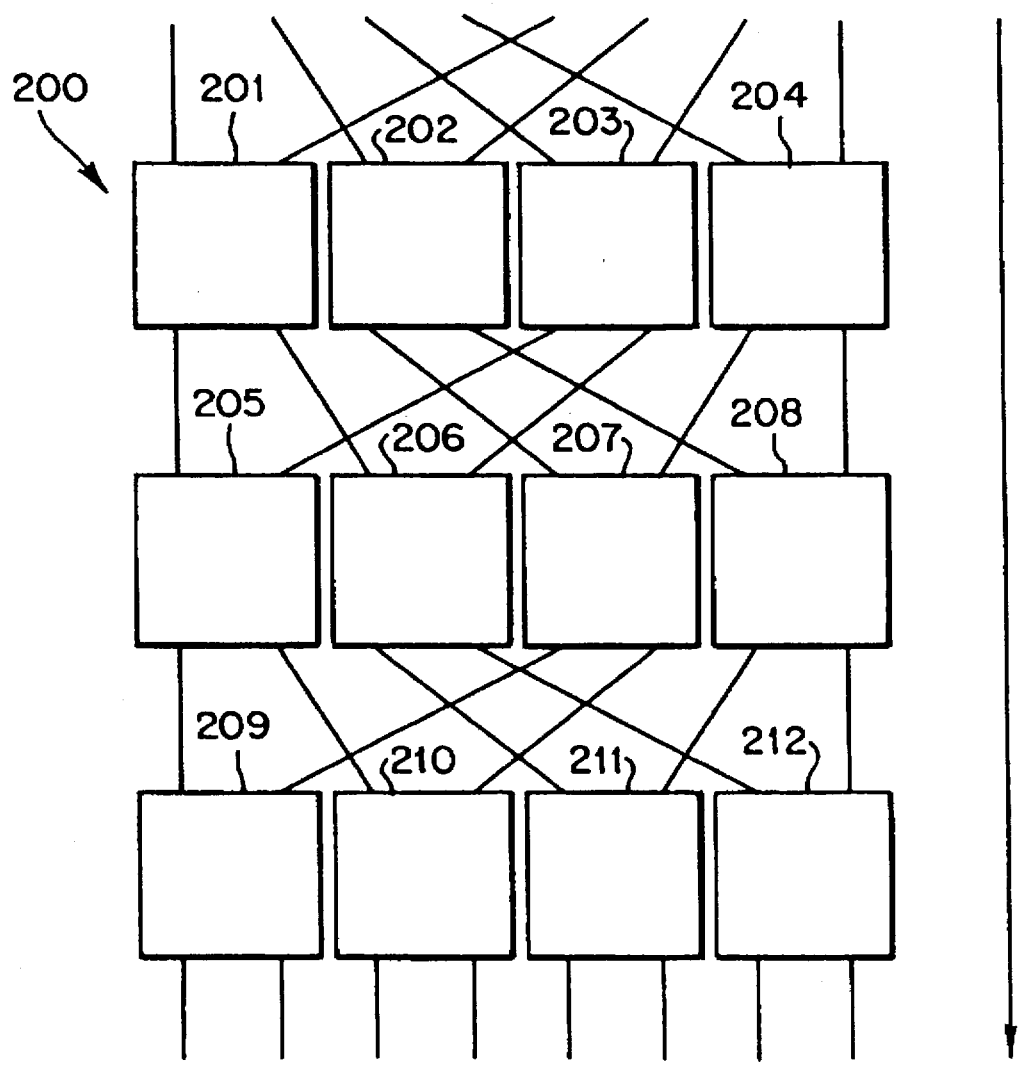
FIG. 37 is a block diagram showing the internal configuration of the network mechanism in a general parallel processor system.
Figure 38:
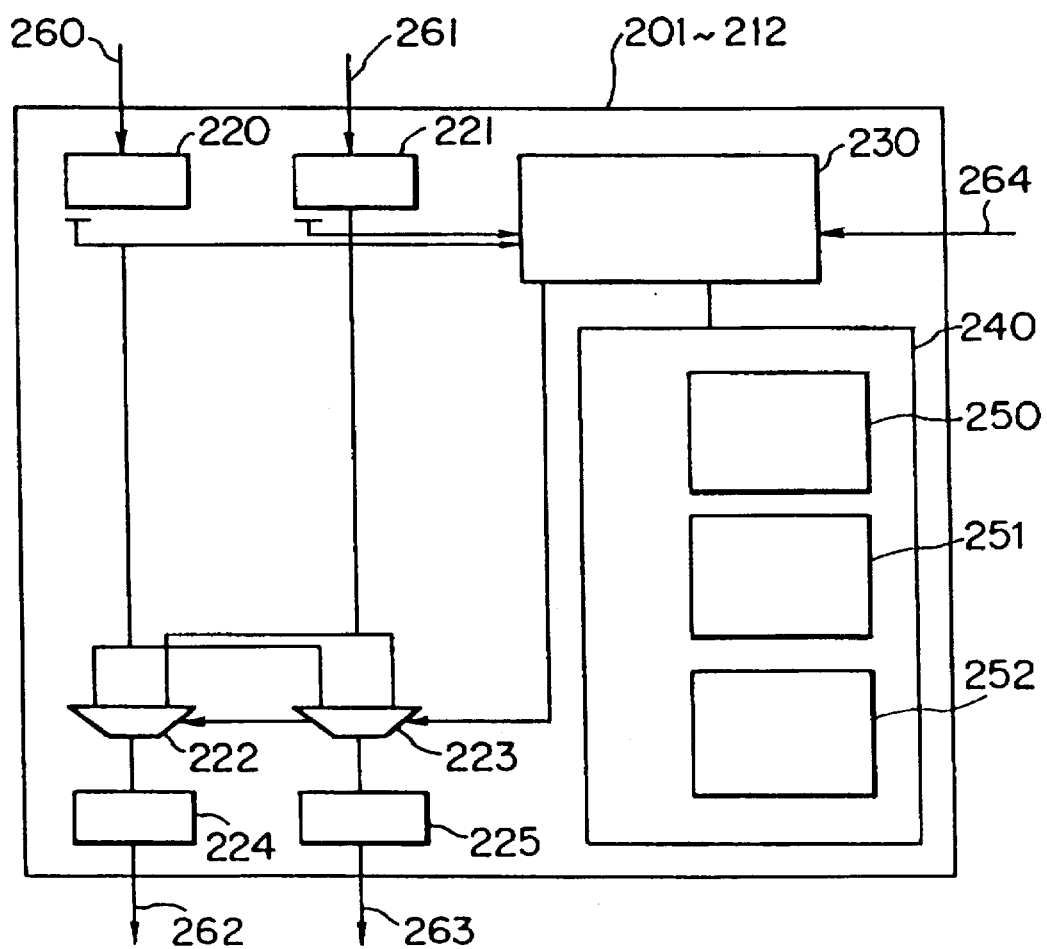
FIG. 38 is a block diagram showing the internal structure of each switching unit constructing the network mechanism shown in FIG. 37.
Figure 39:
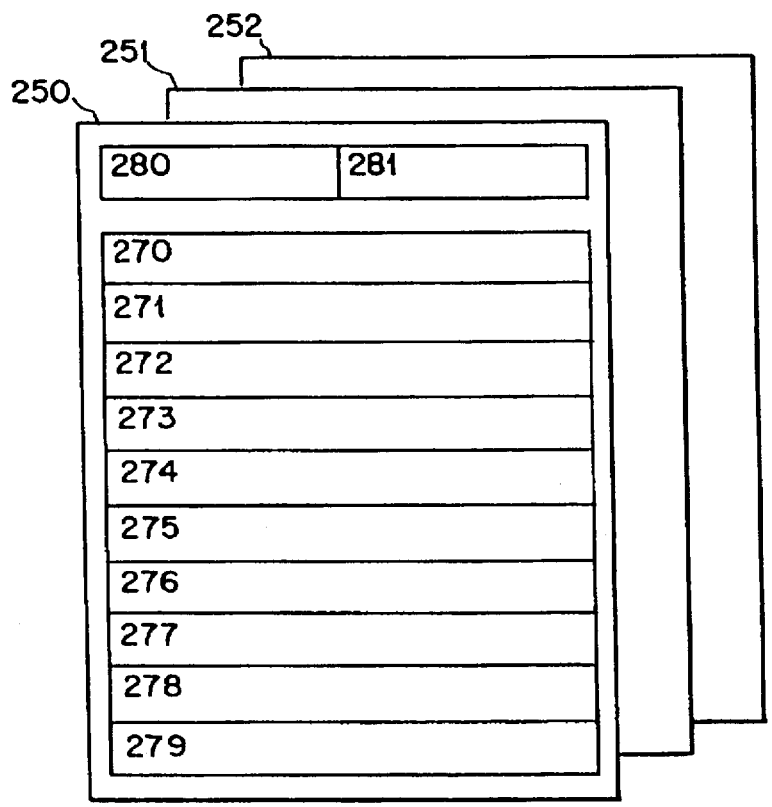
FIG. 39 is a diagram showing the content of the work table in each switching unit.
Figure 40:
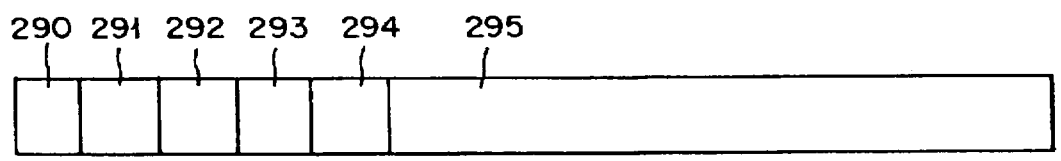
FIG. 40 is a diagram showing the logical format of input/output data for each switching unit.

(3) Since the input/output register must have such a sufficient capacity that all the transfer units can be stored, blocking and transferring as described above means that hardware amount increases in all the switching units (refer to numerals 201 to 212 in FIGS. 37 and 38).

Hence in the existing technology, even if the overhead for transfer is somewhat large, transferring in one tuple unit is needed.

In the second embodiment, the tuple groups with different bucket IDs can be arranged in arbitrary order in the transfer queues 830 to 832 corresponding respectively to the transfer destination T-DPrs 900A to 900C. Even if the tuple groups are transferred by one operation, since a bucket ID has already been attached to each tuple, the process to be added in each of the T-DPrs 900A to 900C which has accepted the tuple groups is, at most, only the process to disassemble the tuples blocked. Therefore, the amount of the process in each of the T-DPrs 900A to 900C handly increases, and the transfer between processors is not adversely affected. Additional blocking buffers are unnecessary. However, the decision of "no data to be transferred" to the trigger signal from each of the T-DPrs 900A to 900C is merely changed from the decision including "the presence or absence of a tuple" into "a fixed number of tuples are in storage".

An increase in amount, of course, occurs in the average capacity of the transfer queues 830 to 832, the buffer capacity of the input port circuit 803 and output port circuit 804 in the processors 800A to 800C, and the buffer capacity of the input port circuit 903 and output port circuit 904 in the processors 900A to 900C. However, the increase in amount is less than at least 1/log n, compared with that in the existing technology. The adverse effect due to the fluctuations in the load to the network mechanism 600 is small. Hence it is possible to reduce the transfer process overhead.

Figure 18:
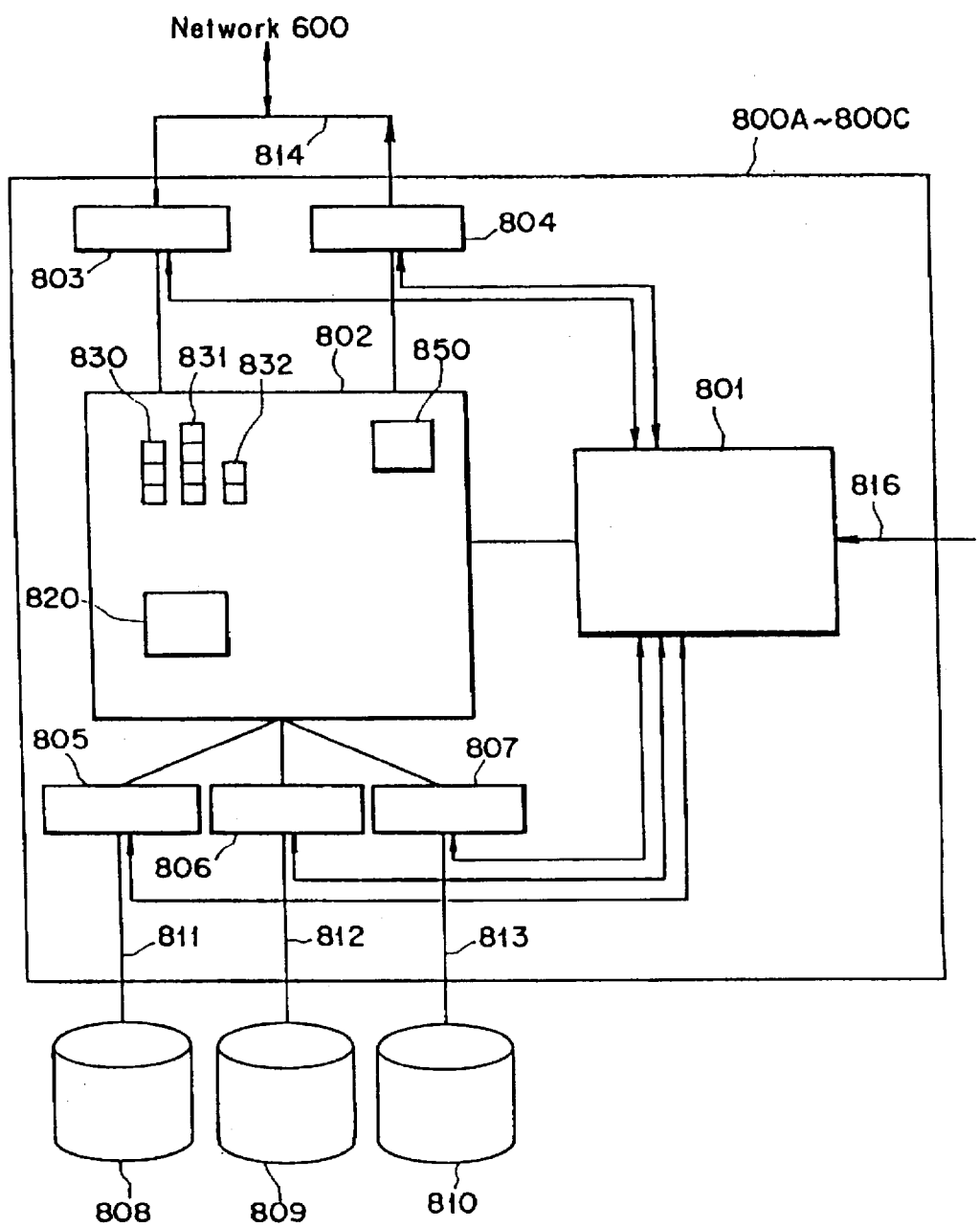
FIG. 18 is a block diagram schematically showing the internal hardware configuration of a S-DPr in a parallel processor system according to the third embodiment of the present invention.
Figure 19:
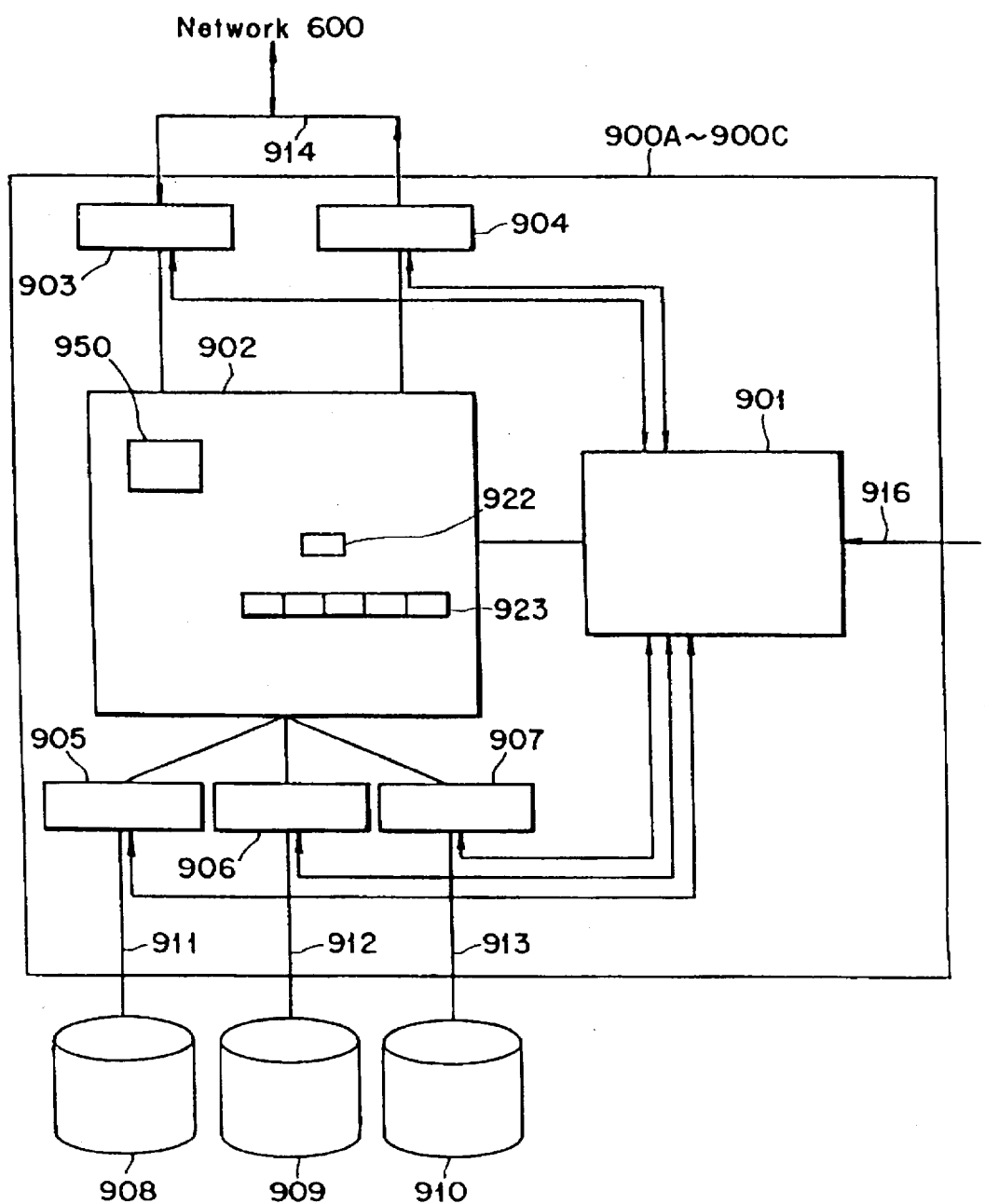
FIG. 19 is a block diagram schematically showing the internal hardware configuration of a T-DPr in a parallel processor system according to the third embodiment of the present invention.

(c3) Explanation of Assembling Mode of Third Embodiment:

The entire configuration of the parallel processor system according to the third embodiment is exactly the same as that in the second embodiment shown in FIG. 9. Hence the duplicate explanation will be omitted here. The third embodiment differs from the second embodiment in the internal configuration of each of the S-DPrs 800A to 800C and T-DPrs 900A to 900C. With reference to FIGS. 18 and 19, the internal configuration of each of the S-DPrs 800A to 800C and the T-DPrs 900A to 900C will be described below.

FIG. 18 is a block diagram showing schematically the internal hardware configuration of the S-DPr in the parallel processor system according to the third embodiment of the present invention. Each of the S-DPrs 800A to 800C in the third embodiment has nearly the same configuration as that in the second embodiment shown in FIG. 10. However, in the third embodiment, the transfer buffer 850 is newly added to the main storage unit 802. In FIG. 18, the same numerals as those used in FIG. 10 represent the same elements. Hence the duplicate explanation will be omitted here.

The transfer buffer 850 prepares and stores transfer data (tuple group) formed of plural tuples to be transferred to the T-DPr by one operation.

When the transfer trigger signal is transferred from each the T-DPrs 900A to 900C to the S-DPr and the data transfer is determined by the S-DPr in response to this, the microprocessor 801 captures the region of the transfer buffer 850 into the main storage unit 802.

The microprocessor 801 dequeues a previously determined number of tuples sequentially from the transfer queues 830 to 832 corresponding to the transfer destination T-DPr, and then stores it into the transfer buffer 850, whereby transfer data can be prepared.

When the transfer data (tuple group) prepared in the transfer buffer 850 is transferred, the microprocessor 801 also transfers the top address and the capacity of the transfer buffer 850 to the output port circuit 804.

FIG. 19 is a block diagram showing schematically the internal hardware configuration of the T-DPr in the parallel processor system according to the third embodiment of the invention. The T-DPrs 900A to 900C in the third embodiment are nearly the same as those in the second embodiment shown in FIG. 12. In the third embodiment, the receiving buffer 950 is newly added to the main storage unit 902. In FIG. 19, the same numerals as those used in FIG. 12 represent the same elements. Hence the duplicate explanation will be omitted here.

The receiving buffer 950 stores plural tuples (tuple group) transferred from each of the S-DPrs 800A to 800C by one transfer operation.

When the transfer trigger signal which designates the transfer from each of the T-DPrs 900A to 900C to each of the S-DPrs 800A to 800C is transferred, the microprocessor 901 captures and prepares the region of the receiving buffer 950 in the main storage unit 902.

When the transfer data transferred from the S-DPr side arrives at the corresponding T-DPr, the microprocessor 901 designates the address to the input port circuit 903 and then stores the transfer data including plural tuples.

FIG. 20 is a diagram used for explaining an example of the transfer data format according to the third embodiment. The transfer buffer 850 on the side of each of the S-DPrs 800A to 800C and the receiving buffer 950 on the side of each of the T-DPrs 900A to 900C are prepared in the same format as that in FIG. 20.

In FIG. 20, numeral 2100 represents a control information field for communication. Like the field attached with numerals 290, 500, and 1100 described before, the format of the transfer data is entered to the field 2100.

Numeral 2101 represents a field holding the processor identifier of a S-DPr being a transfer data originating source; 2102 represents a field holding the processor identifier of a T-DPr being a transfer data destination; 2103 represents a field holding the task identifier showing that the transfer data is to be transferred for which task; and 2104 represents a field holding the capacity value of the following data body to be transferred. The capacity value held in field 2104 corresponds to the number of bytes of all data following data immediately after the field 2104.

Moreover, fields 2110 to 2130 are fields each holding data corresponding to a tuple. As for the format of data corresponding to each tuple in each of the fields 2110 to 2130, let us explain the field 2110 as an example. The field 2110 includes the field 2111 holding the bucket ID, the field 2112 holding the length of the tuple data portion, and the field 2113 holding actual tuple data.

Next, the operational algorithm of each of the S-DPrs 800A to 800C in the system according to the third embodiment having the above configuration will be explained. Each of the S-DPrs 800A to 800C in the third embodiment is partially different in the control of the transmission portion. Hence, the detail illustration will be omitted. Only the portion different from the second embodiment will be explained here.

If a predetermined number of tuples are stored into a specific one of the transfer queues 830 to 832 corresponding to the transfer requesting T-DPr, the S-DPr transfers data in response to the trigger signal transferred from a specific one of the T-DPrs 900A to 900C. If not stored, the S-DPr transfers the response to the effect that "a sufficient amount of the transfer data is not stored to transfer" to the T-DPr, thus not performing the data transfer.

At the time of the data transfer, the microprocessor 801 in the S-DPr prepares the transfer buffer 850 on the main storage unit 802, dequeues a predetermined number of tuple groups from the transfer queues 830 to 832 corresponding to the transfer request originating T-DPr, And then prepares the transfer data of the format shown in FIG. 20 in the transfer buffer 850.

When the task which prepares transfer data in the transfer buffer 850 has been completed, the microprocessor 801 reports and transfers the top address and the capacity of the transfer buffer 850 to the output port circuit 804.

At the time of the transfer completion, the microprocessor 801 releases the transfer buffer 850 in the main storage unit 802.

Furthermore, the operational algorithm of each of the T-DPrs 900A to 900C in the system according to the third embodiment constituted above will be explained below. In each of the T-DPrs 900A to 900C in the third embodiment, only the control of the receiving portion is partially different. Hence, the illustration will be omitted here. Only the portion different from the second embodiment will be explained below.

Each of the T-DPrs 900A to 900C prepares the receiving buffer 950 in the main storage unit 902 when the transfer trigger signal is transferred. At this time, the receiving buffer 950 is captured in consideration of the capacity of (the maximum length of the transfer data corresponding to an expected tuple×a predetermined number of tuples). Thereafter, the microprocessor 901 designates the output port circuit 904 to transfer the trigger signal.

When data is transferred from each of the S-DPrs 800A to 800C in response to the transfer trigger signal, the microprocessor 901 specifies the top address of the receiving buffer 950 to the input port circuit 903 to instruct the input port circuit 903 to store data.

As data corresponding to respective tuples are transferred in the first and second embodiments, the microprocessor 901 subjects data corresponding to the respective tuples included in the receiving buffer 950 to counting, sorting, and storing tasks.

As described above, according to the parallel processor system in the third embodiment, the following effect is obtained.

The main effect is to reduce the operation overhead of the processor associated with the data transmission between the processors 800A to 800C, and 900A to 900C while performing bucket leveling process. As described above, this advantage cannot be established by the existing technology.

(d) Explanation of Fourth Embodiment:

(d1) Constituent Requirements needed in Fourth Embodiment:

The fourth embodiment relates to an art regarding the parallel processor system according to the third embodiment. The essential constituent requirements in the fourth embodiment are the following items (1) to (4).

(1) In the system with the same configuration as that in the second embodiment, the amount of data transferred from the S-DPr to the T-DR by one transfer operation corresponds to the amount of the data including tuples as much as possible, with the upper limit of a fixed capacity value A and the lower limit of a fixed capacity value B. Each of the capacity values A and B must be at least equalized to every T-DPrs, viewed from a S-DPr.

(2) The tuple groups to be transferred by the batch transferring operation are extracted from the top area of the transfer queues prepared corresponding to a transfer destination T-DPr in the second embodiment, in the transfer order shown in the second embodiment in the range satisfying the above-mentioned capacity requirement.

(3) In a S-DPr, when the number of tuples stored in the transfer queue corresponding to a T-DPr does not reach a transfer amount exceeding the capacity value B, if a transfer trigger signal is transferred from the T-DPr, the S-DPr transfers the response to the effect that "the amount of transfer data stored is not sufficient to transfer" to the T-DPr, thus not performing the data transferring.

(4) In the second embodiment, the added value of the respective factors of the transfer destination processor decision table is (the total capacity of a tuple (or the transfer data corresponding to the tuple) currently stored in the transfer queue corresponding to a transfer destination T-DPr)+(the length of a tuple whose transfer destination is to be currently decided (or the length of the transfer data corresponding to the tuple)).

(d2) Explanation of Legitimacy of Fourth Embodiment:

In the fourth embodiment having the above-mentioned constituent requirements, in the process of treating a large mount of data such as the equivalent join, the process load is not decided simply with the number of tuples to be processed but may be decided by the same of the amount of data of tuples. Which is a more dominant factor depends on assembling software operating on the processor.

If the sum of the amount of data of tuples is a more dominant factor to the process load than the number of tuples in a system, the load index of the load adjustment work performed in the S-DPr should be "the amount of data transferred", instead of "the number of tuples transferred".

The buffer capture and management on the implementation becomes easier in the case that the transfer amount itself is a fixed length, compared with the case that "number of tuples is fixed" described in the third embodiment. In the third embodiment, at least the transfer buffer (refer to numeral 850 in FIG. 18) of the T-DPr requires a capacity of "the maximum length of a tuple multiplied by the number of transfer tuples" Because the capacity determined by the maximum length of a tuple usually may be several ten times as much as the capacity determined by the average length, it is generally difficult to use effectively the captured transfer buffer. On the contrary, if it is guaranteed that the transferred data amount is within a range, the use efficiency of the transfer buffer is guaranteed all the time.

In order to realize "leveling on the base of the data amount" with many advantages, the following two items must be changed compared to the third embodiment:

(1) The data transfer is performed by using as one unit "a capacity within a fixed range" of which the upper limit and the lower limit are determined. (2) The load evaluation index or a value accumulated in the transfer destination processor decision table is changed from "the number of tuples in a transfer queue+1" in the third embodiment into "the tuple capacity in a transfer queue+the capacity of a tuple being currently processed" or "the tuple capacity in a transfer queue+the capacity of the transfer data corresponding to a tuple processed".

(d3) Explanation of Assembling Aspect of Fourth Embodiment:

The entire configuration of the parallel processor system in the fourth embodiment is exactly the same as that in the second embodiment shown in FIG. 9. Hence the duplicate explanation will be omitted here.

Figure 21:
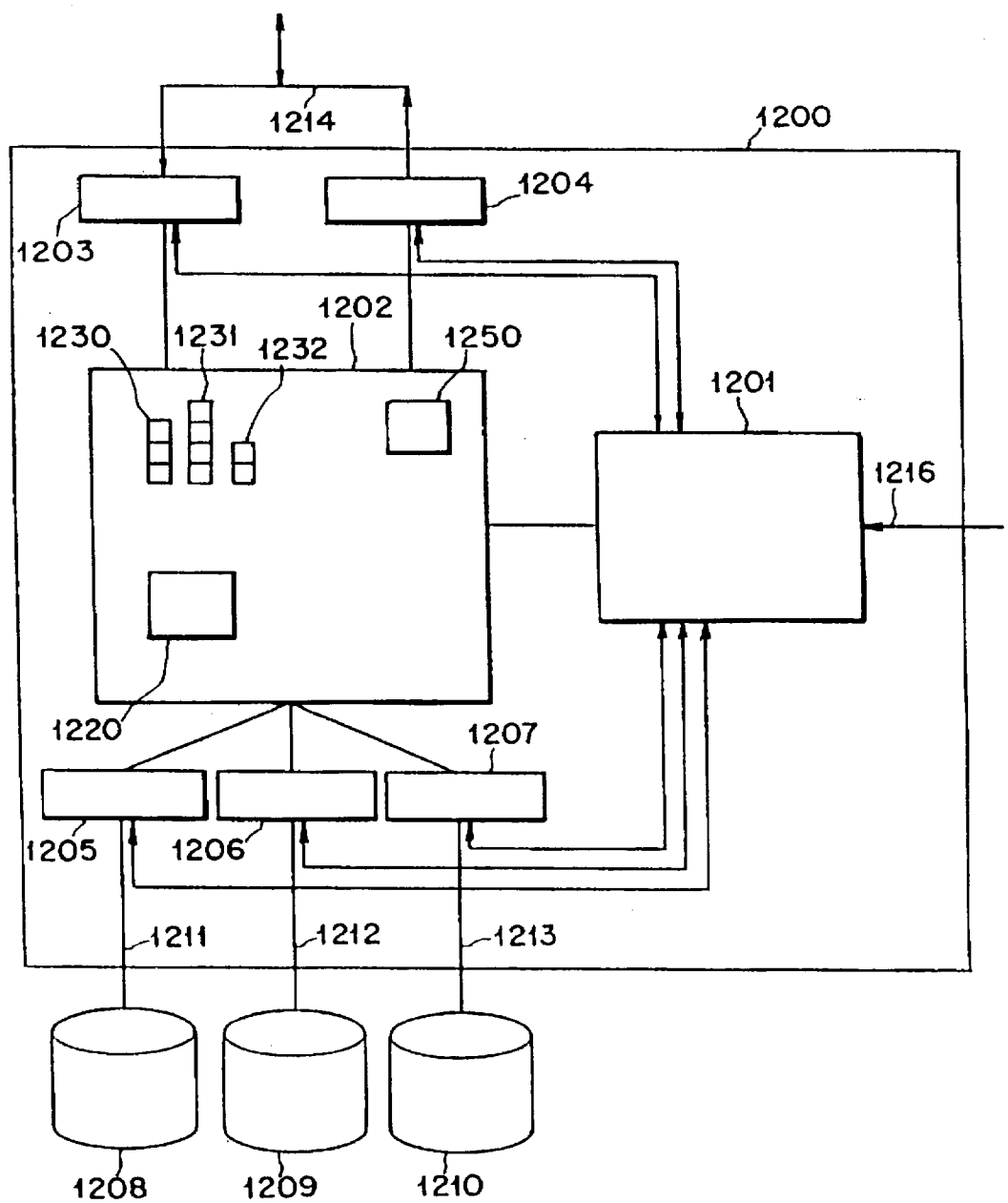
FIG. 21 is a block diagram schematically showing the internal hardware configuration of a S-DPr in a parallel processor system according to the fourth embodiment of the present invention.

In the fourth embodiment, the S-DPr shown in FIG. 21 corresponds nearly to the S-DPr in the third embodiment shown in FIG. 18. The T-DPr shown in FIG. 23 corresponds nearly to the T-DPr in the third embodiment shown in FIG. 19.

FIG. 21 is a block diagram showing schematically the internal hardware configuration of the S-DPr in the parallel processor system according to the fourth embodiment of the invention. As shown in FIG. 21, the S-DPr 1200 in the fourth embodiment has nearly the some configuration as each of the S-DPrs 800A to 800C in the third embodiment shown in FIG. 18, except the content to be described later.

Referring to FIG. 21, constituent elements 1201 to 1214, 1216, 1220, 1230 to 1232, and 1250 correspond nearly to the constituent elements 801 to 814, 816, 820, 830 to 832, and 850, shown in FIG. 18, respectively. Hence the duplicate explanation will be omitted here.

In the S-DPr 1200 in the fourth embodiment, the capture timing of the transfer buffer 1250 is the same as the timing of the transfer buffer 850 in the third embodiment. However, the microprocessor 1201 dequeues tuples of number satisfying the upper limit capacity value And the lower limit capacity value regarding the transfer buffer 1250 (or the transfer data corresponding to the tuples), stores them into the transfer buffer 1250, and then prepares the transfer data. In this case, the transfer data format is the same as that in the third embodiment. In the fourth embodiment, the capacity (the capacity of the transfer buffer 1250 captured in the main storage unit 1202) is surely between the lower limit capacity value And the upper limit capacity value.

Figure 22:
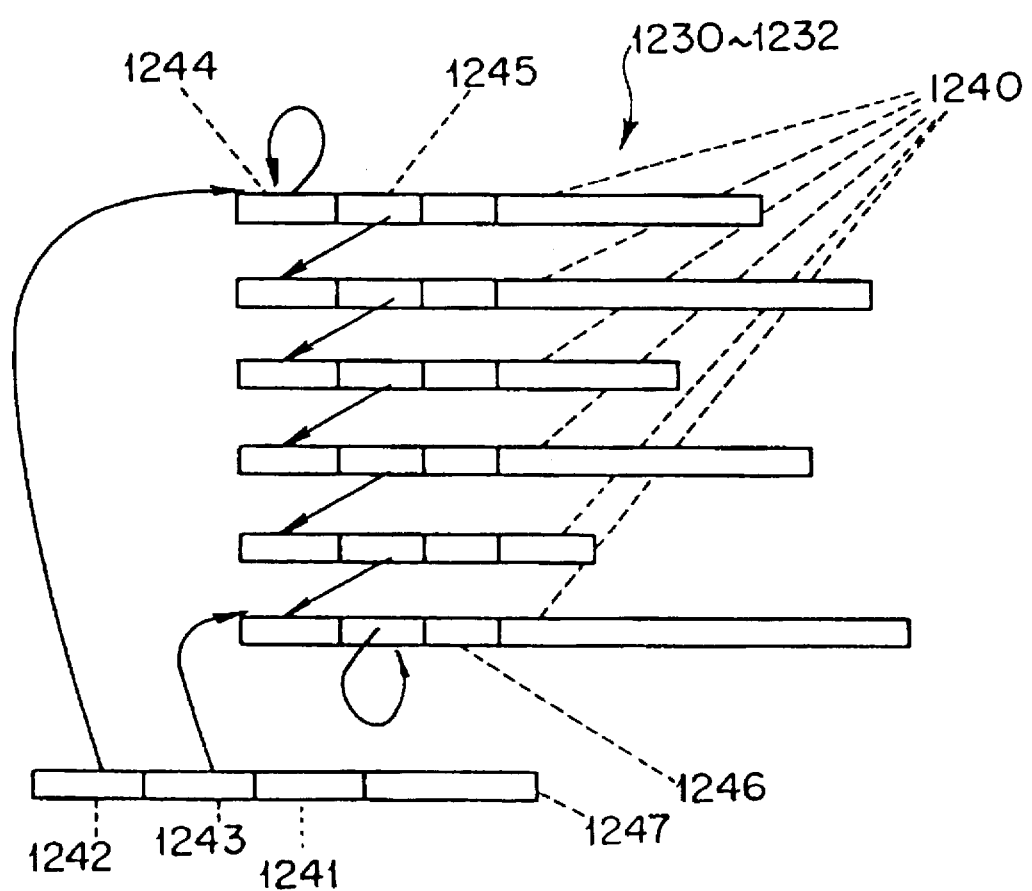
FIG. 22 is a diagram showing an example of the transfer queue structure according to the fourth embodiment.

FIG. 22 is a diagram showing an example of the configuration of each of the transfer queues 1230 to 1232 in the fourth embodiment. The structure of the transfer queues 1230 to 1232 (queue structure), one of main differences between the third grid fourth embodiments, will be explained in concrete with reference to FIG. 22.

The difference between the structure of the transfer queue shown in the second and third embodiments and the transfer queue structure in the fourth embodiment is that the transfer data amount field 1247 that holds the total byte count of respective transfer data (Sum of Byte Count of Send Data) is added to the anchor information regarding each of the transfer queues 1230 to 1232.

The field 1247 is increased by the length of the transfer data every time the respective tuples (the corresponding transfer data) are enqueued, and subtracted by the length of the transfer data every time the respective tuples (the corresponding transfer data) are dequeued.

Hence, in the fourth embodiment, the storage data amount detecting means (for detecting the data amount of a entity (tuple) to be transferred stored into each of the transfer queues 1230 to 1232) is constituted by preparing the transfer data amount field 1247 readable from the microprocessor 1201.

The constituent elements 1240 to 1246 shown in FIG. 22 correspond nearly to the constituent elements 840 to 846 shown in FIG. 11. The detail explanation will be omitted here.

Figure 23:
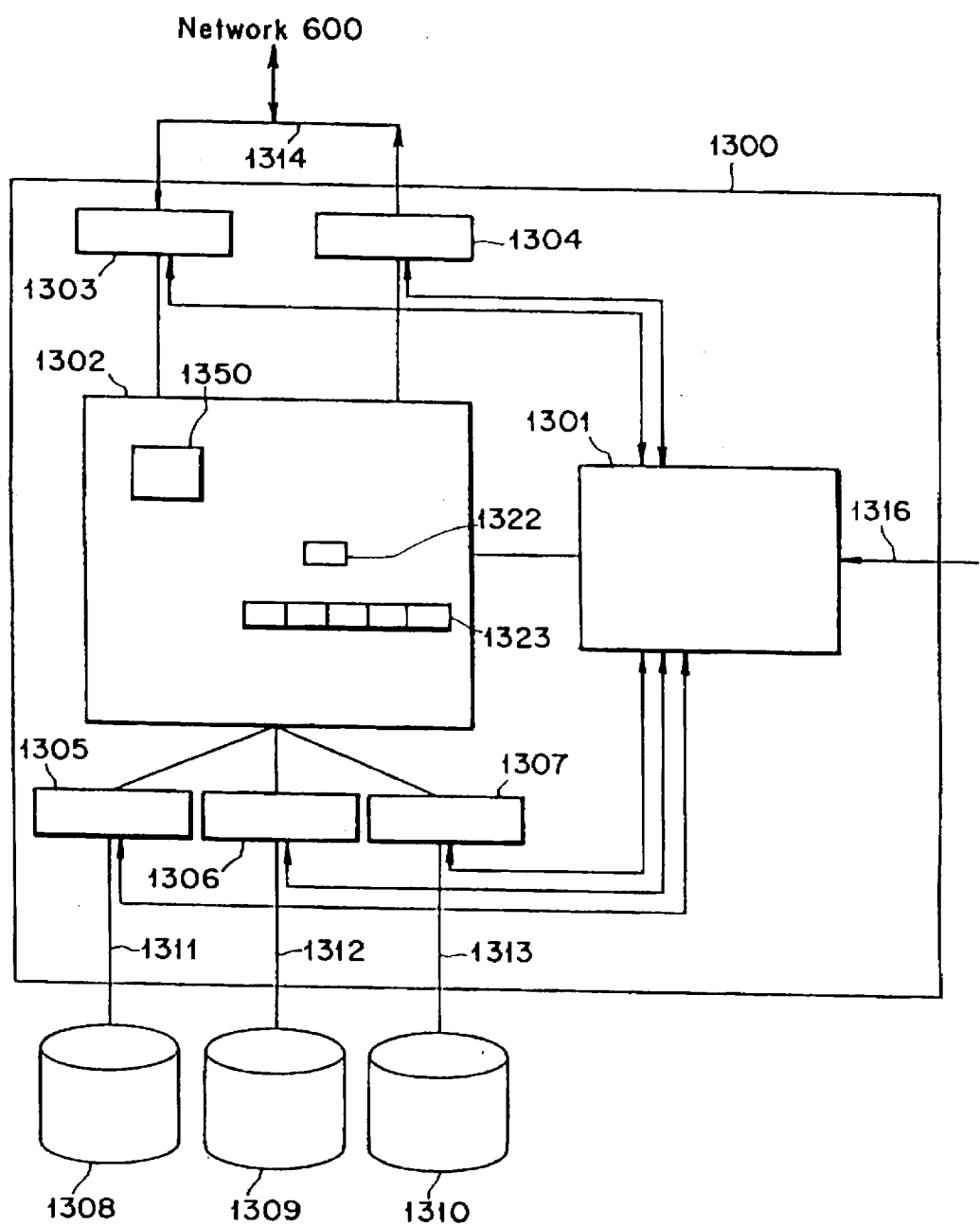
FIG. 23 is a block diagram schematically showing the internal hardware configuration of a T-DPr in a parallel processor system according to the fourth embodiment of the present invention.

FIG. 23 is a block diagram showing schematically the internal hardware configuration of the T-DPr in the parallel processor system according to the fourth embodiment of the present invention. As shown in FIG. 23, except the following matter, the T-DPr 1300 in the fourth embodiment has nearly the same configuration as each of the T-DPrs 900A to 900C in the third embodiment shown in FIG. 19.

Referring to FIG. 23, constituent elements 1301 to 1314, 1316, 1322, 1323, and 1350 correspond nearly to the constituent elements 901 to 914, 916, 922, 923, and 950 shown in FIG. 19, respectively. The detail explanation will be omitted here.

In the T-DPr 1300 in the fourth embodiment, the capture and release timing of the receiving buffer 1350 is the same as the timing of the receiving buffer 950 in the third embodiment. The capacity of the receiving buffer 1350 is set to the upper limit capacity value of the transfer data, not "the maximum length of a tuple×the number of tuples (a fixed value) to be transferred", like the receiving buffer 950 in the third embodiment.

Next, the operational algorithm of the S-DPr 1200 in the system in the fourth embodiment will be explained below in regard to only a different portion from the third embodiment.

The operation by which the destination of one tuple in the S-DPr 1200 is determined is the same as that in the third embodiment in that the bucket ID is obtained, the row and column on the transfer destination processor decision table are decided based on the bucket ID, and the T-DPr corresponding to the smallest factor in the one-dimensional arrangement is set as a tuple data transfer destination.

In the fourth embodiment, after the transfer destination T-DPr is decided, the microprocessor 1201 must add "a value of the transfer data amount field 1247 of a transfer queue (queue structure) corresponding to the T-DPr+the sum (that is, the length of the transfer data corresponding to currently processed tuples) of bytes of the fields 2112 (the length of each tuple data) shown in FIG. 20" to the factor in the transfer destination processor decision table 1220.

The microprocessor 1201 in the S-DPr 1200 to which the trigger signal is transferred from a T-DPr refers to the value of the transfer data mount field 1247 of each of the transfer queues 1230 to 1232 corresponding to the T-DPr, and transfers the response to effect that the amount of transfer data stored is not sufficient to transfer to the T-DPr when the value is lower than the lower limit value of the transfer data amount, thus not performing the data transferring.

If the value of the transfer data amount field 1247 is more than the lower limit value of the transfer data amount, the microprocessor 1201 captures the transfer buffer 1250 into the main storage unit 1250. At this time, the capacity of the transfer buffer 1250 is the upper limit value of the transfer data amount.

The microprocessor 1201 dequeues one by one tuples (or the transfer data corresponding to the tuples) from the transfer queues 1230 to 1232 corresponding to the T-DPr into the transfer buffer 1250 and then prepares the transfer data in the transfer buffer 1250.

When it is detected that adding a new tuple (or the transfer data corresponding to the tuple) causes the upper limit value of the amount of transfer data to be exceeded, the microprocessor 1201 suppresses the tuple dequeuing and recognizes the completion of the transfer data preparation.

The microprocessor 1201 subtracts the length of transfer data dequeued from the value of the transfer data amount field 1247 every time one tuple (or the corresponding transfer data) from the transfer queues 1230 to 1232 is dequeued.

Moreover, the operational algorithm of the T-DPr 1300 in the fourth embodiment will be explained regard to only the different portion from the third embodiment.

Like the third embodiment, in the T-DPr 1300 of the fourth embodiment, the receiving buffer 1350 is prepared on the main storage unit 1302 when the transfer trigger signal is transferred to the S-DPr 1200. However, the fourth embodiment differs from the third embodiment in that the capacity of the receiving buffer 1350 is set to the upper limit capacity value of the transfer data.

In such a manner, according to the parallel processor system of the fourth embodiment in the present invention, when it is considered that the load of the T-DPr 1300 is proportional to the byte capacity of tuple data mainly input, leveling the load of the T-DPr 1300 can be realized more, compared with the third embodiment.

(e) Explanation of Fifth Embodiment:

The fifth embodiment relates to the art regarding the parallel processor system according to the fourth embodiment of the present invention and is applicable to the "matching process".

Figure 24:
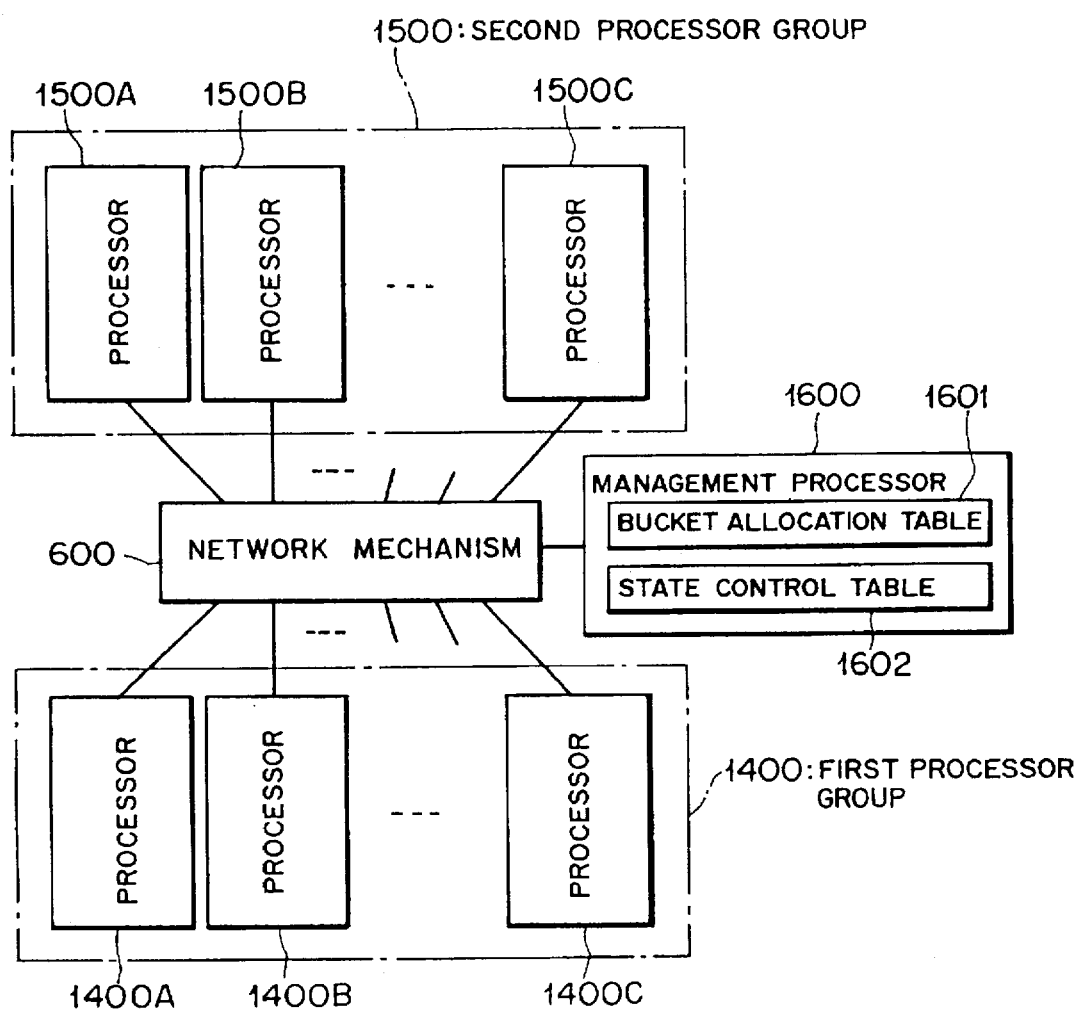
FIG. 24 is a block diagram showing the entire configuration of a parallel processor system according to the fifth embodiment of the present invention.

FIG. 24 is a block diagram showing the entire configuration of the parallel processor system according to the fifth embodiment of the present invention. Referring to FIG. 24, numeral 1400 represents a first processor group formed of plural processors 1400A, 1400B, . . . , 1400C, and 1500 represents a second processor group formed of plural processors 1500A, 1500B, . . . , 1500C.

Each of the processors 1400A to 1400C belonging to the first processor group 1400 stores distributively data (bucket) to be processed in a predetermined task. Like the first to fourth embodiments, the first processor group 1400 corresponds to a T-DPr group subjected to the bucket leveling process. That is, data to be processed are previously grouped on the first processor group 1400, according to the Hash function (predetermined regulation).

Each of the processors 1400A to 1400C has the function that reports the result grouped by the serf processor to the management processor (to be described later) 1600, and the function that transfers rill data of the corresponding bucket (data group) to each of the processors 1500A to 1500C belonging to the second processor group 1500, according to the data allocation by the management processor 1600 (to be described later).

Each of the processors 1500A to 1500C belonging to the second processor group 1500 receives a bucket stored in the first processor group 1400 and then executes the process to the bucket ("the matching process" according to the present embodiment). Each of the processors 1500A to 1500C requests a bucket allocation to the management processor 1600 when the situation able to start a new process to the bucket stored in the first processor group 1400 comes.

Referring to FIG. 24, numeral 600 represents a network mechanism exactly the same as that in the first to fourth embodiments. The network mechanism 600 is used to transfer data from an arbitrary one of the processors 1400A to 1400C belonging to the first processor group 1400 to an arbitrary one of the processors 1500A to 1500C belonging to the second processor group 1500.

Numeral 1600 represents a management processor. The management processor 1600 has the first function that stores a bucket stored in each of the processors 1400A to 1400C in response to the report from each of the processors 1400A to 1400C belonging to the first processor group 1400 and the second function that allocates a non-allocated bucket to the processor being an allocation requester when an allocation request of a bucket (data group) is received from each of the processors 1500A to 1500C belonging to the second processor group 1500.

In order to establish the first and second frictions, the bucket allocation table 1601 (Bucket-Allocation-Table; refer to FIG. 25) on which the relationship between a bucket and each of the processors 1400A to 1400C belonging to the first processor group 1400 is described, and the state control table (refer to FIG. 26) 1602 on which the state (such as a ready state, a running state, or a finished state) of each of the processors 1500A to 1500C belonging to the second processor group 1500 is described are arranged on the main storage unit of the management processor 1600.

Figure 25:
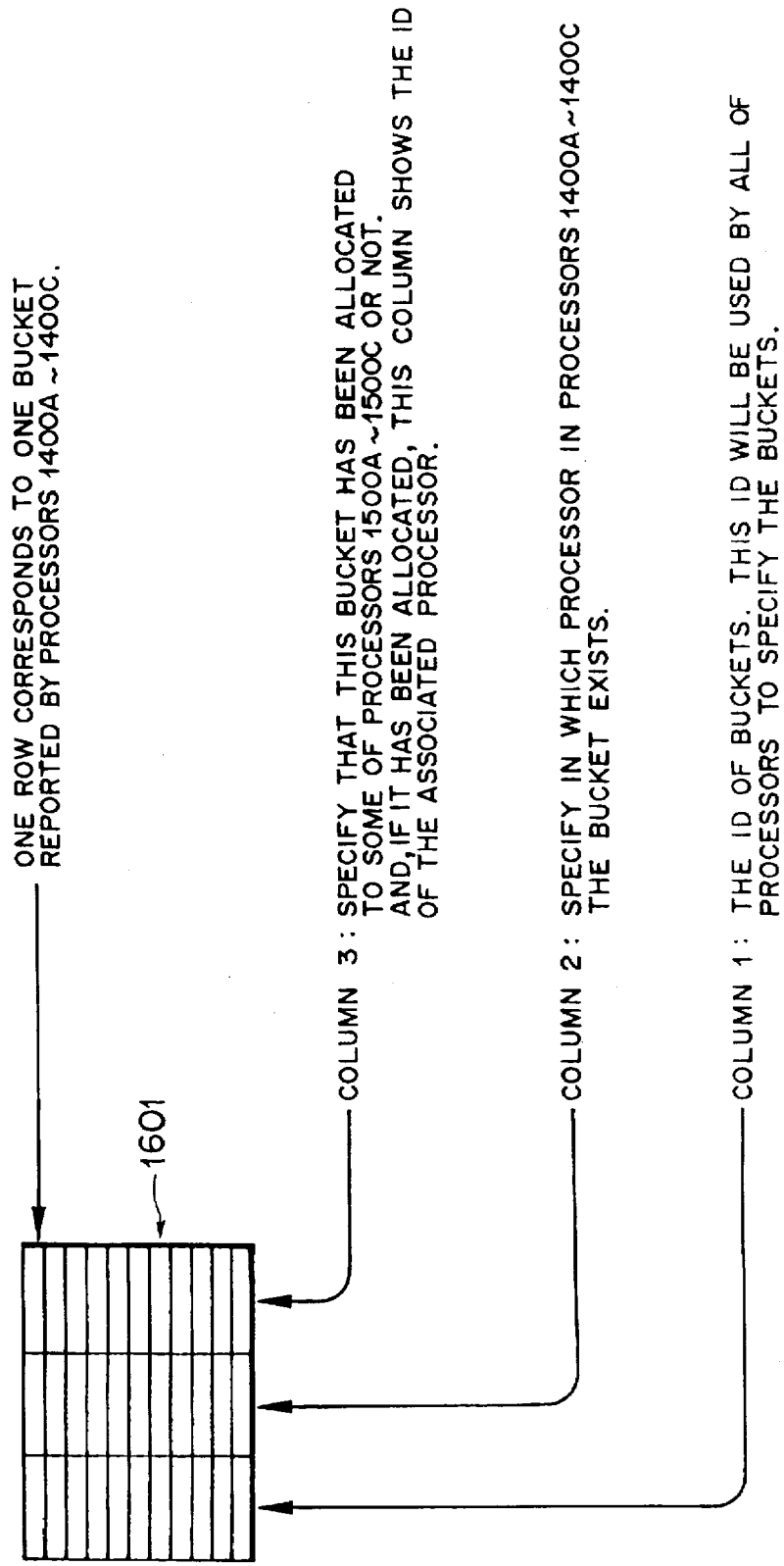
FIG. 25 is a diagram used for explaining roughly the bucket allocation table according to the fifth embodiment.

FIG. 25 is a diagram used for explaining the outline of the bucket allocation table 1601. The table 1601 shown in FIG. 25 has the structure in which one row per one bucket of which the existence is reported by each of the processors 1400A to 1400C is used.

As shown in FIG. 25, the bucket identifier of a bucket corresponding to each row is stored into the first column of each row. In order to specify each bucket, the bucket identifier is used in all the processors 1400A to 1400C, 1500A to 1500C, and 1600.

In which of the processors 1400A to 1400C the subbucket being the subset of the bucket exists is marked in the second column of each row. The second column covers the processor group which has reported the existence of the bucket. A bit map on which one bit, for example, is allocated for each of the processors 1400A to 1400C is used as the second column.

Figure 46:
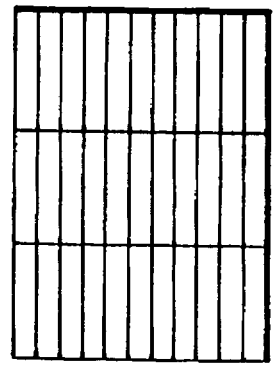
FIG. 46 is a diagram showing a rough format example of the bucket allocation table in another example of a general parallel processor system.
Figure 47:
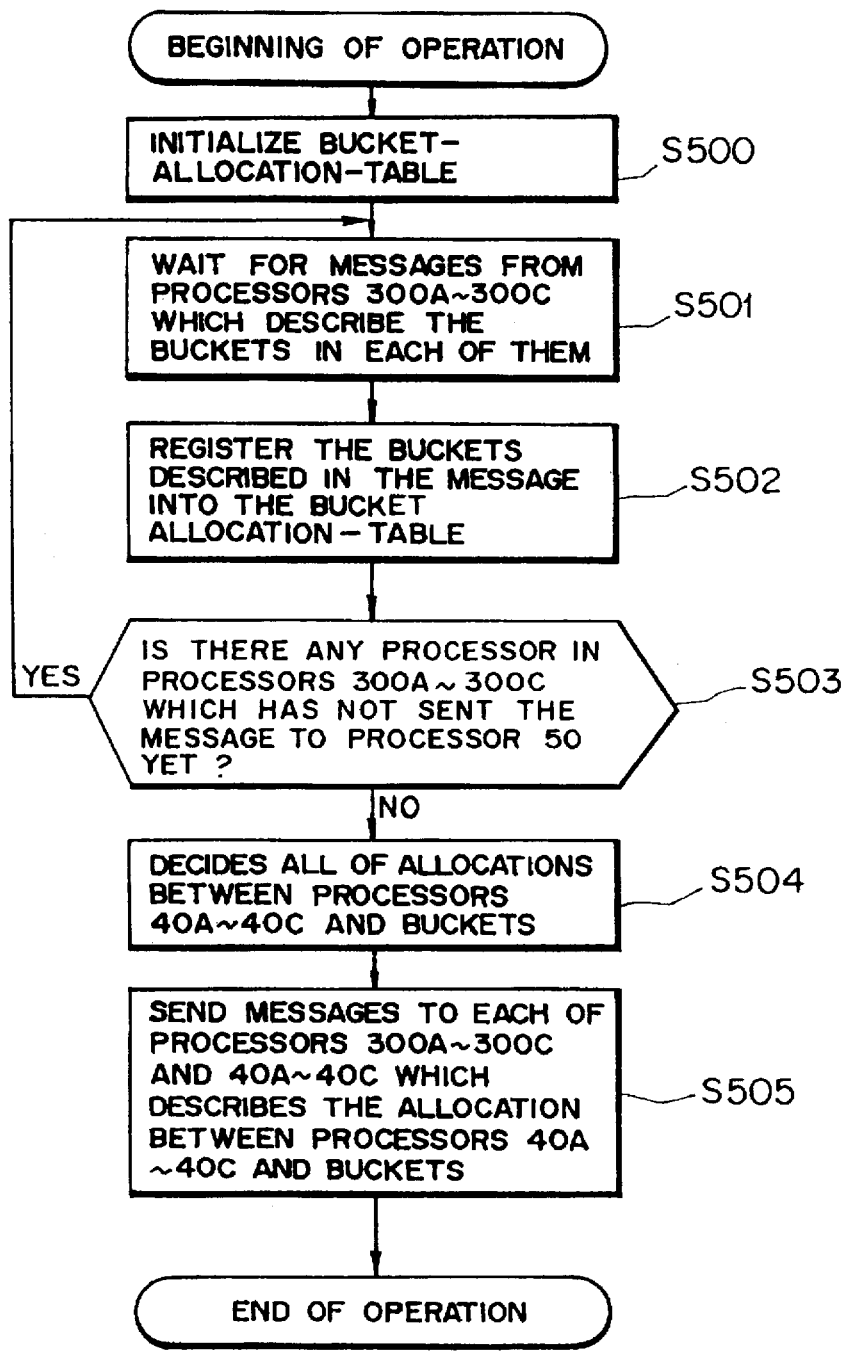
FIG. 47 is a flowchart used for explaining roughly the operation of another example of a general parallel processor system.
Figure 48:
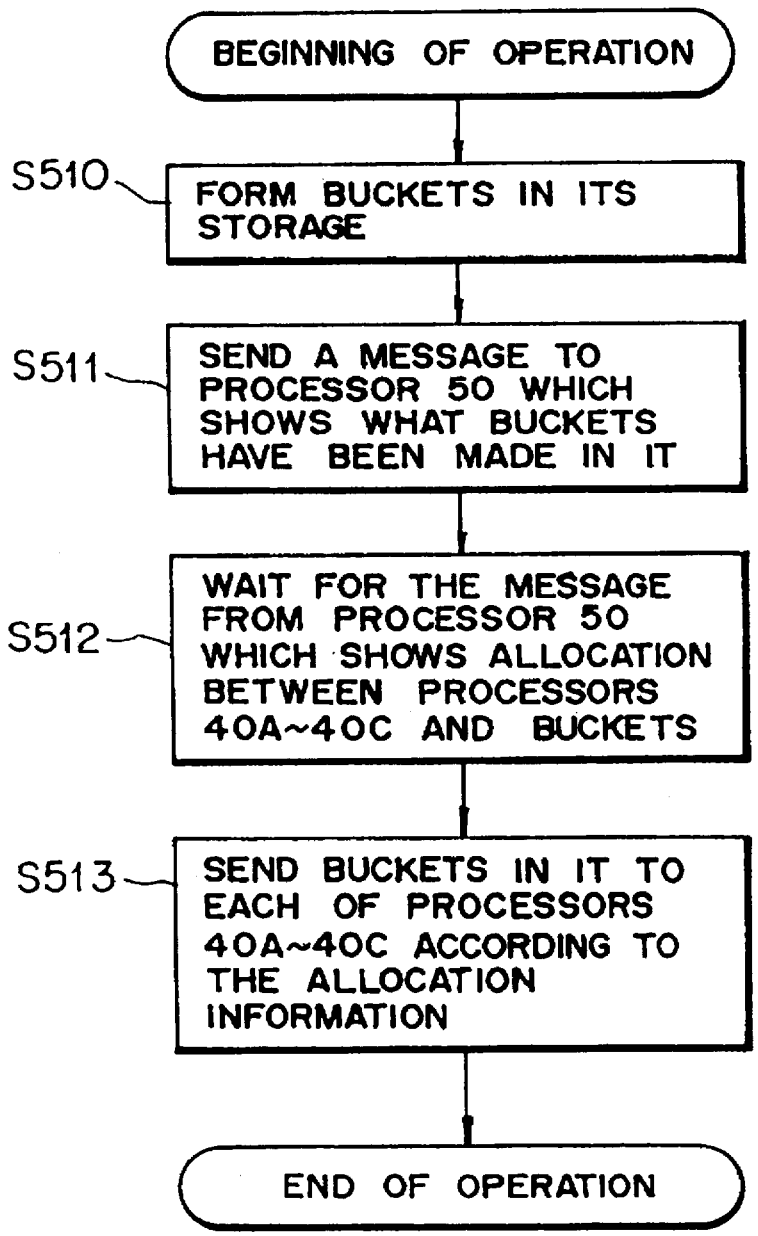
FIG. 48 is flowchart used for explaining roughly the operation of another example of a general parallel processor system.
Figure 49:
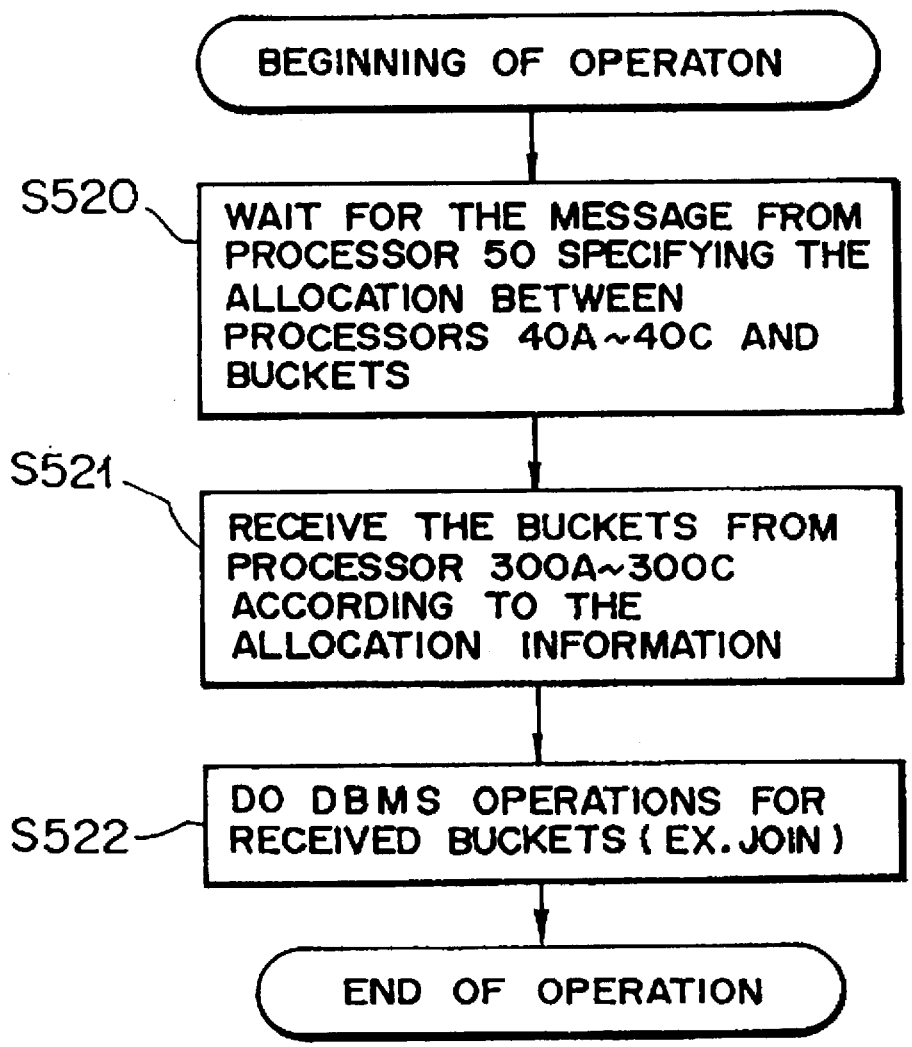
FIG. 49 is a flowchart used for explaining roughly the operation of another example of a general parallel processor system.

Moreover, a value showing "no allocation to any processor" immediately after the initialization should be described in the third column of each row. A processor identifier is described of any one of the processors 1500A to 1500C to which the bucket is allocated after the allocation process. In the table according to the existing technology shown in FIG. 46, the processor identifiers are described preceding an actual bucket movement at one time. However, in this embodiment, the processor identifier is described dynamically on the table 1601 in parallel to the process progress of each of the processors 1500A to 1500C.

Figure 26:
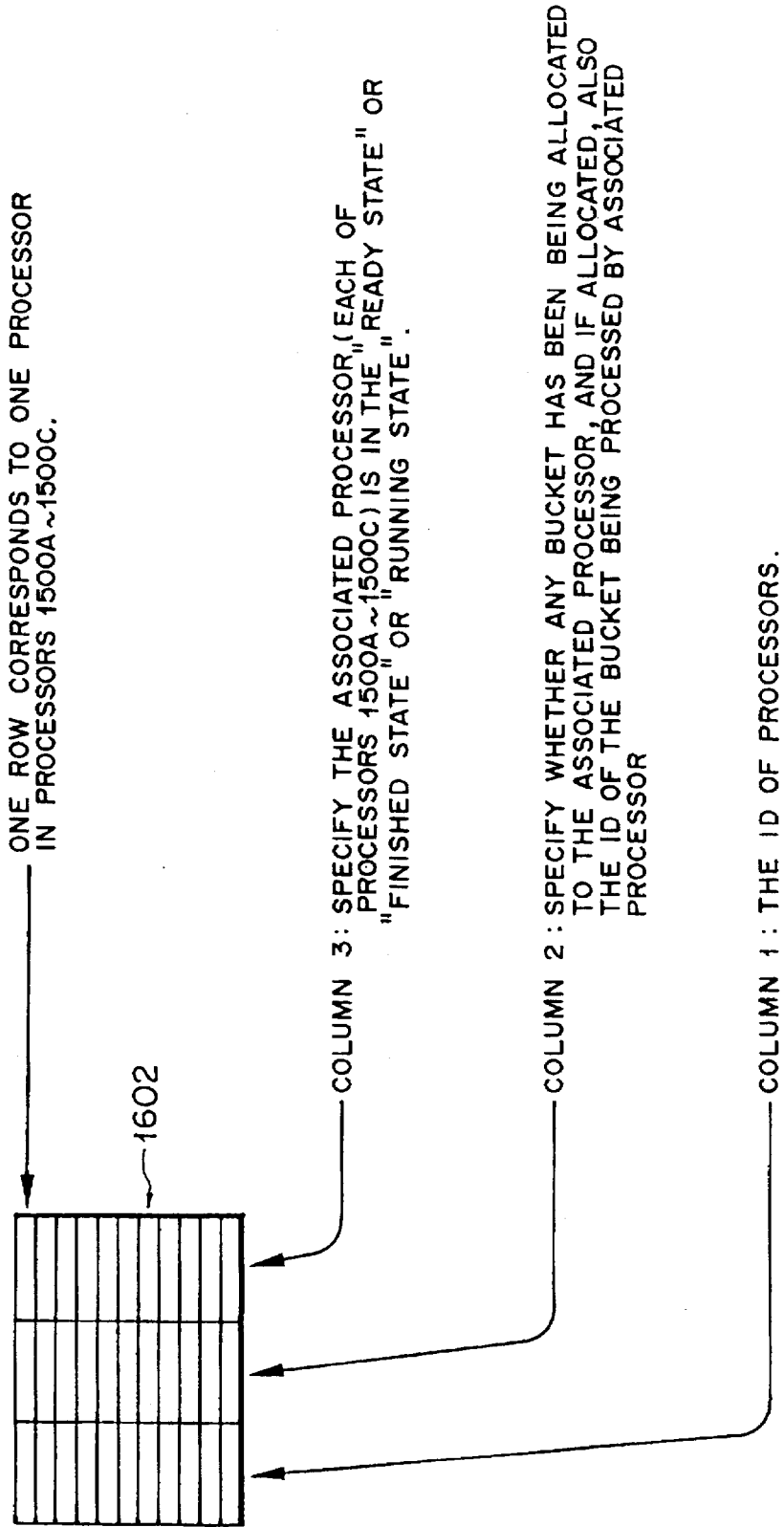
FIG. 26 is diagram used for explaining a state control table according to the fifth embodiment.

FIG. 26 is a diagram used for explaining the outline of the state control table 1602: The table 1602 shown in FIG. 26 has the structure in which one row is used corresponding to each of the processors 1500A to 1500C.

As shown in FIG. 26, the identifier of one of the processors 1500A to 1500C corresponding to each row is stored into the first column of each row.

Whether any bucket has been being currently allocated to each of the processors 1500A to 1500C is specified in the second column of each row. And if Allocated, the bucket identifier also is specified in the second column of each row. In the case of no allocation bucket, an invalid identifier is described.

Furthermore, whether each of the processors 1500A to 1500C corresponding to each row is currently in "Ready State", "Finished State", or "Running State" is described in the third column of each row.

The hardware configuration of each of the processors 1400A to 1400C, 1500A to 1500C, and 1600 is the same as that of each of the S-DPrs and the T-DPrs in the first to fourth embodiment. The physically same processor may serve as at least two of the following processors in the same task or the other task at the same time: the first processor group 1400; the second processor group 1500; and the management processor 1600.

Next, the operation of the entire system in the fifth embodiment of the above-mentioned configuration will be explained below. Like the existing technology explained with FIGS. 45 to 49, in the fifth embodiment as well, each of the processors 1400A to 1400C belonging in the first processor group 1400 transfers the bucket ID of a subbucket group existing in the secondary storage unit of the self processor to the management processor 1600. At this time, the management processor 1600 does not decide the relationship between the bucket and each of the processors 1500A to 1500C belonging to the second processor group 1500.

When the situation (that is, the previously-started join operation process of bucket has been completed in the self-processor, or information regarding the subbucket has been transferred to the management processor 1600) in which it is possible to start a new bucket process comes, each of the processors 1500A to 1500C belonging to the second processor group 1500 requests the management processor 1600 for "bucket allocation" as a message A.

When information regarding subbuckets has been completely accepted from all the processors 1400A to 1400C in the first processor group 1400, the management processor 1600 begins a bucket allocation in response to a request from the second processor group 1500.

The bucket allocation means that one of bucket IDs whose existence is reported to the management processor 1600 and the process of the bucket is entrusted to the processors 1500A to 1500C belonging to the second processor group 1500 which transfers the "bucket allocation" request. A bucket to which an entrusted processor has been once decided is not be allocated hereinafter.

In the fifth embodiment, the allocation is completed by establishing an allocation from the management processor 1600 to the processors 1500A to 1500C belonging to the second processor group 1500, and then transferring the message B including the allocated bucket ID via the network mechanism 600.

Thereafter, each of the processors 1500A to 1500C belonging to the second processor group 1500 which accepts the message B for allocation broadcasts by itself the designation message C for transferring all data belonging to the subbucket with the bucket ID to the serf processor, to all the processors 1400A to 1400C constituting the first processor group 1400.

Each of the processors 1400A to 1400C belonging to the first processor group 1400 which has received the designation message C transfers oil the corresponding data stored in the secondary storage unit under the serf processor, to the designation message originating processor belonging to the second processor group 1500.

When All the bucket data is transferred, each of the processors 1400A to 1400C belonging to the first processor group 1400 transfers the transfer completion report message D to the designation message originating processor.

When receiving the message D from all the processors 1400A to 1400C belonging to the first processor group 1400, the designation message originating processor subjects the sum of the received data (or buckets) to the DBMS process such as the Hash join process in the processor.

After the completion of the internal process of the processor, the designation message originating processor becomes again in the "situation in which it is possible to start a new bucket process" and then transfers a message A for requesting a new bucket allocation to the management processor 1600.

Where there are no buckets to be allocated by the management processor 1600, the process completion designating message E as a response to the message A is transferred from the management processor 1600 to the message A originating processor belonging to the second processor group 1500.

When issuing the process completion message E to all the processors 1500A to 1500C belonging to the second processor group 1500, the management processor 1600 recognizes the completion of all the processes, and then broadcasts the process completion message E to all the processors 1400A to 1400C belonging to the first processor group 1400.

Next, the outline of the operation of each of the processors 1600, 1400A to 1400C, and 1500A to 1500C in the fifth embodiment will be explained in more detail according to the flowchart shown in FIGS. 27 to 29.

Figure 27:
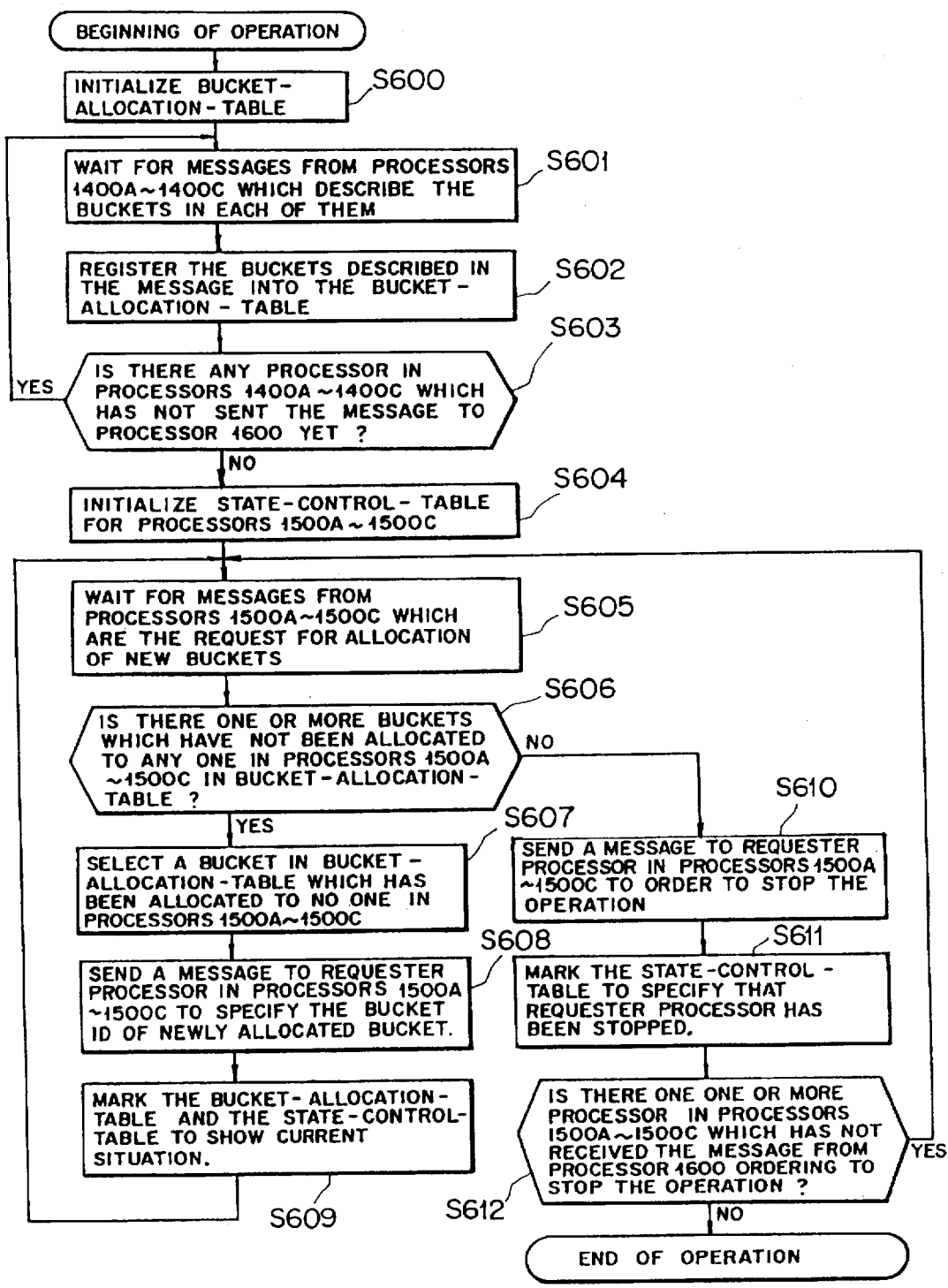
FIG. 27 is flowchart for explaining the operation of a management processor according to the fifth embodiment of the present invention.

FIG. 27 is a flowchart (steps S600 to S612) used for explaining the operation of the management processor 1600 in the fifth embodiment. As shown in FIG. 27, at the beginning of the operation, the management processor 1600 first initializes the content of the bucket allocation table 1601 (step S600). The content of the initialization process includes capturing the table region with a capacity sufficient for marking a predicted number of buckets on the main storage unit, and invalidating all the rows (corresponding to each of the buckets).

After the initialization of the bucket allocation table 1601, the management processor 1600 waits for the report regarding what bucket has been created from each of the processors 1400A to 1400C (step S601), and stores the content to the bucket allocation table 1601 in response to the report (step S602).

The process operation in the steps S601 and S602 is repeated till reporting is made from all the processors 1400A to 1400C (step S603).

When all the processors 1400A to 1400C have reported on each bucket creation, the management processor 1600 initializes the content of the state control table 1602 for each of the processors 1500A to 1500C (step S604).

The initialization process includes capturing a table region with a capacity sufficient for storing the information from each of the processors 1500A to 1500C on the main storage unit, entering the processor identifier (first column) to all the rows (corresponding to each of the processors 1500A to 1500C), by referring to FIG. 26, entering the code representing "no running state (ready state)" as the processor state in the third column, and entering the code meaning that "any bucket is not allocated" in the second column.

After the initialization of the state control table 1602, the management processor 1600 waits for the arrival of a message requesting a new bucket allocation from each of the processors 1500A to 1500C (step S605), and then checks whether there is one or more buckets which have not been allocated to any one of the processors 1500A to 1500C at the arrival of the message (step S606).

If a bucket not allocated exists, the management processor 1600 searches for a bucket which have not been allocated to any one of the processors 1500A to 1500C by scanning vertically the third column of the bucket allocation table 1601 (step S607), and then transfers the bucket ID of the bucket searched in the step S607 to one (requester processor) of the processors 1500A to 1500C which has sent the allocation request in the step S605 (step S608).

Thereafter, the management processor 1600 enters that the bucket selected in the step S607 is allocated to one of the processors 1500A to 1500C which has sent the allocation request in the step S605, in the bucket allocation table 1601, and enters that one of the processors 1500A to 1500C in "running state" has been allocated the bucket, in the state control table 1602 (step S609). Then the management processor 1600 returns to the process in the step S605.

If it is judged that all the bucket have been allocated in the step S606, the management processor 1600 transfers a message saying "end the process because of no allowable buckets left" to one of the processors 1500A to 1500C sending an allocation request in the step S605 (step S610).

The management processor 1600 enters that one of the processors 1500A to 1500C receiving the end designation is in "finished state" in the state control table 1602 (step S611), and then judges whether all the processors 1500A to 1500C are in "finished state" (step S612).

If there is a processor still in "running state" the flow returns to the step S605. If all the processors 1500A to 1500C are in "finished state" the completion of nil processes is recognized. As a result, the management processor 1600 finishes its operation.

Figure 28:
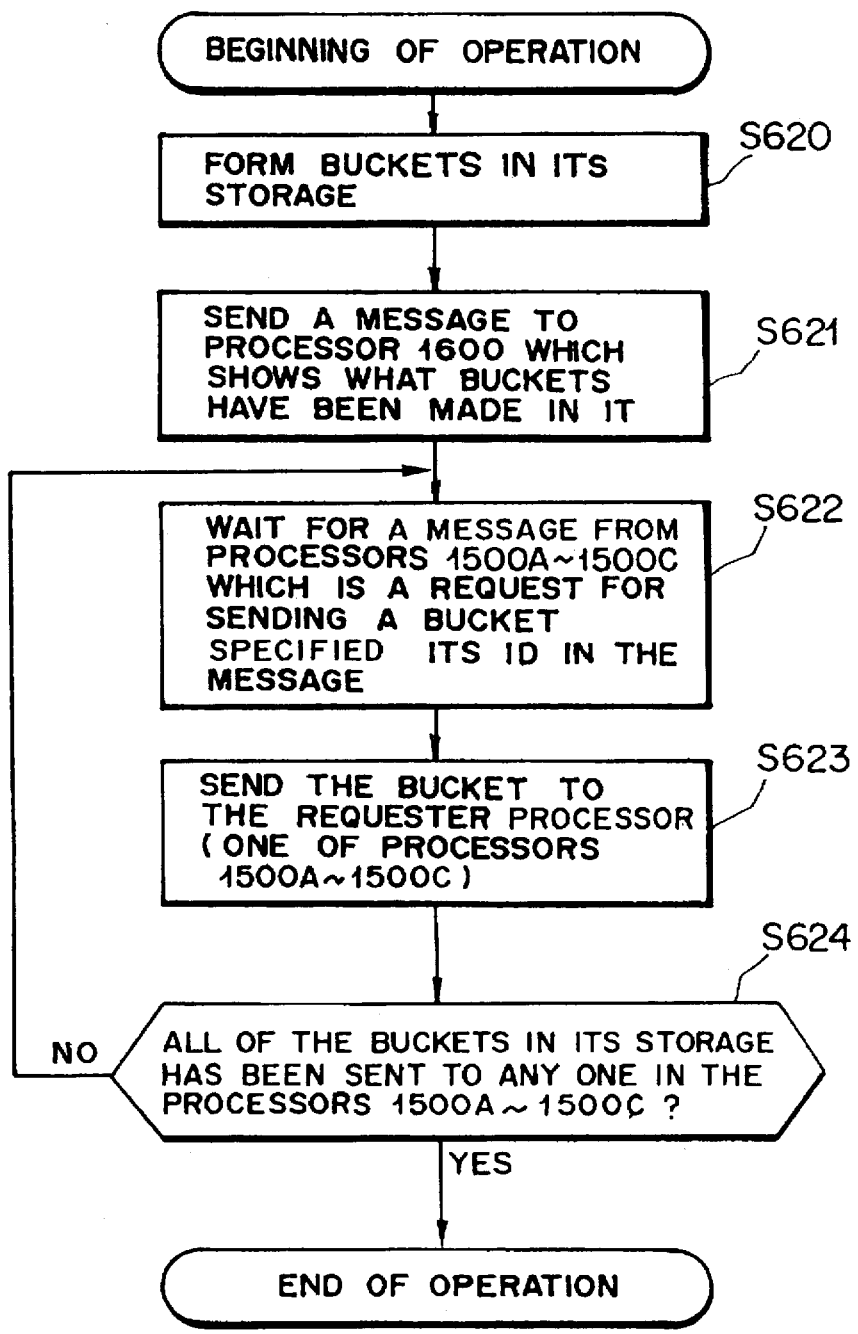
FIG. 28 is a flowchart used for explaining the operation of each processor belonging to the first processor group according to the fifth embodiment of the present invention.

FIG. 28 is a flowchart (steps S620 to S624) used for explaining the operation of each of the processors 1400A to 1400C belonging to the first processor group 1400 in the fifth embodiment. As shown in FIG. 28, at the beginning of the operation, each of the processors 1400A to 1400C recognizes the bucket ID of the subbucket stored in each of the processors 1400A to 1400C, and then confirms the sort of the bucket in the serf processor (in secondary storage unit) (step S620).

The state of each of the processors 1400A to 1400C in the step S620 is the some as that of the T-DPr, for example, which sorts and stores buckets according to the Hash function (predetermined regulation) as described in the first to fourth embodiments. In the step S620 in FIG. 28, a general description is made that "a bucket is prepared in the storage unit within each processor".

Thereafter, each of the processors 1400A to 1400C transfers information regarding the bucket obtained in the step S620 to the management processor 1600 (step S621), and waits for a transfer request message with a bucket ID transferred from each of the processors 1500A to 1500C belonging to the second processor group 1500 (step S622).

When receiving a transfer request message from each of the processors 1500A to 1500C in the step S622, each of the processors 1400A to 1400C transfers the subbucket with the bucket identifier described in the request in the serf processor to each of the processors 1500A to 1500C acting as a requester, according to the bucket transfer request (step S623).

After the subbucket transfer, each of the processors 1400A to 1400C judges whether all the subbuckets in the serf processor have been transferred (step S624). If there are yet non-transferred subbuckets, the flow goes back to the process in the step S622. If all the subbuckets have been completely transferred, the process finishes.

Figure 29:
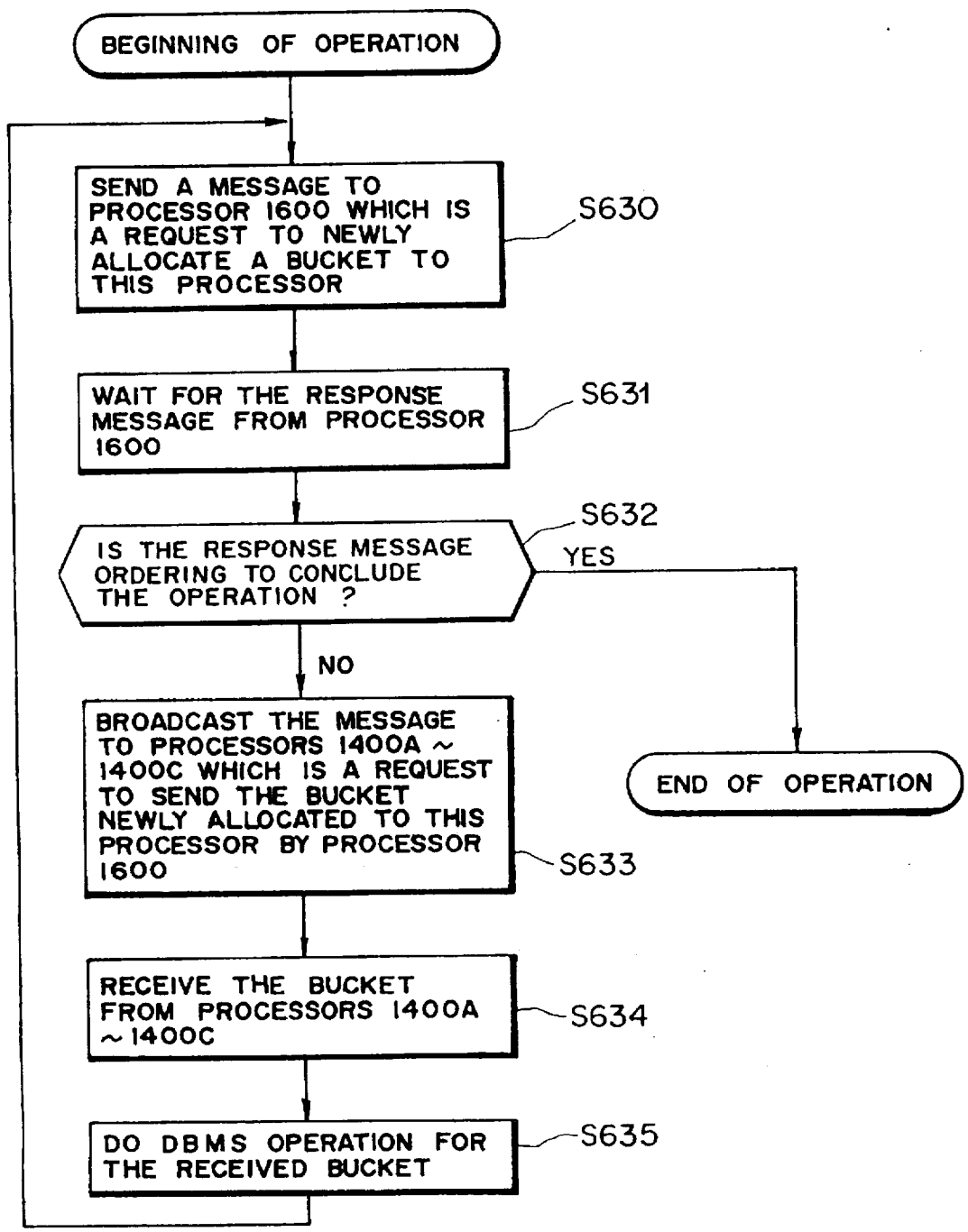
FIG. 29 is a flowchart used for explaining the operation of each processor belonging to the second processor group according to the fifth embodiment.

FIG. 29 is a flowchart used for explaining the operation of each of the processors 1500A to 1500C belonging to the second processor group in the fifth embodiment (steps S630 to S635). As shown in FIG. 29, at the beginning of the operation, each of the processors 1500A to 1500C first transfers a new bucket location request message to the management processor 1600 because a new bucket reception and process is possible in the current situation (step S630), and then waits for a response to the location request sent from the management processor 1600 (step S631).

When accepting a response from the management processor 1600 in the step S631, each of the processors 1500A to 1500C judges whether the response is "process completion designation" (step S632). If yes, the process is ended.

If not in the step S632, the content of the response (message) relates to a bucket allocation. Each of the processors 1500A to 1500C broadcasts and transfers a request message to the processors 1400A to 1400C belonging to the first processor group 1400, using the bucket ID described on the bucket allocation message from the management processor 1600 (step S633). The message includes transferring the bucket (more accurately, the subbucket group whose bucket IDs match with each other stored in the microprocessors 1400A to 1400C) to the serf processor.

Each of the processors 1500A to 1500C accepts an allocated bucket as a response to the request message from each of the processors 1400A to 1400C (step S634), and then subjects the accepted bucket data to the DBMS process (e.g. Hash join process) (step S635). Then the flow goes back to the step S630. At the return to the step S630, each of the processors 1500A to 1500C can begin a new bucket process.

As described above, according to the parallel processor system in the fifth embodiment according to the present invention, when a processor belonging to the second processor group 1500 completes very quickly the bucket process by the MIMD skew and the generation rate skew, the operation performance is immediately used for another bucket process. Hence the operation performance allocated to tasks for the entire system is not wasted.

On the other hand, even if a processor belonging to the second processor group 1500 takes very long process time beyond expectation by the MIMD skew and the generation rate skew, another processor belonging to the second processor group 1500 undertakes the rest. Hence the influence on the system performance can be suppressed low.

(f) Explanation of Sixth Embodiment:

The sixth embodiment relates to a technology regarding the parallel processor system in the fifth embodiment. Like the fifth embodiment, this art is applicable to the above-mentioned "matching process" portion.

Figure 30:
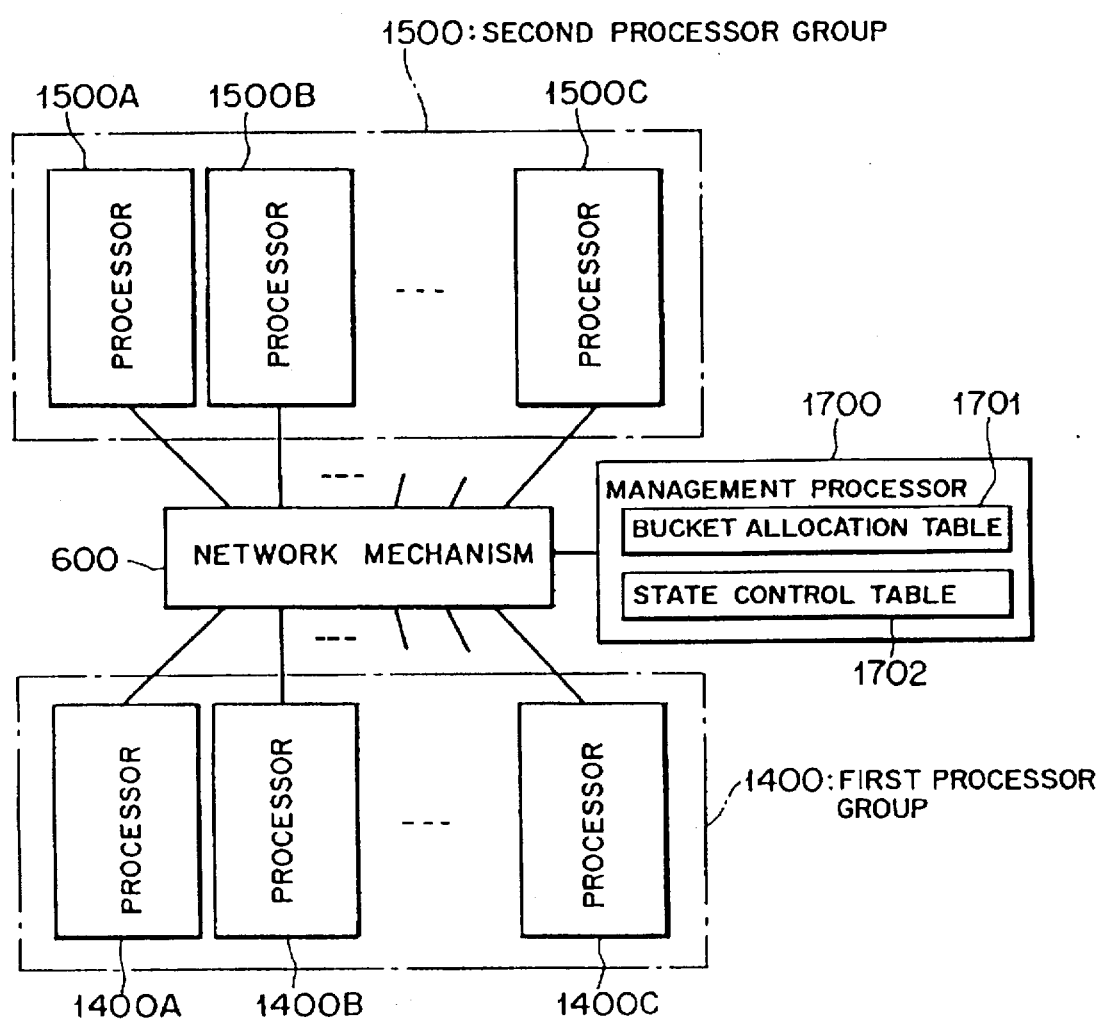
FIG. 30 is a block diagram showing the entire configuration of a parallel processor system according to the sixth embodiment of the present invention.

FIG. 30 is a block diagram showing the entire configuration of the parallel processor system in the fifth embodiment of the present invention. As shown in FIG. 30, the system in the sixth embodiment has substantially the same configuration as that in the fifth embodiment shown in FIG. 24. The sixth embodiment differs from the fifth embodiment in that the processors 1400A to 1400C belonging to the first processor group 1400 have somewhat different functions and the management processor 1700 has a different function. Other constituent elements have the some functions as the corresponding elements in the fifth embodiment. Hence the duplicate explanation will be omitted here.

Each of the processors 1400A to 1400C belonging to the first processor group 1400 in the sixth embodiment functions to report the capacity together with the bucket ID (the identifier of each data group) when the grouping result in the self processor is reported to the management processor (to be described later) 1700.

In the sixth embodiment, the management processor 1700 has the first function which accumulates the capacity included in the report every bucket when receiving a report from each of the processors 1400A to 1400C and stores the size (capacity) of each bucket in the entire first processor group 1400, together with the each bucket ID, and the second function which allocates the non-allocated buckets stored to the allocation requester processor sequentially from the bucket with the largest capacity when receiving a bucket allocation request from each of the processors 1500A to 1500C belonging to the second processor group 1500.

On the main storage unit of the management processor 1700, to execute the first and second functions, the bucket allocation table (Bucket-Allocation-Table; refer to FIG. 31) 1701 on which the relationships between buckets, and each of the processors 1400A to 1400C belonging to the first processor group 1400 are described, and the state control table (State-Control-Table: refer to FIG. 32) 1702 on which the states (a ready state, a run state, and an end state, or the like) of the processors 1500A to 1500C belonging to the second processor group 1500 are described are prepared.

Figure 31:
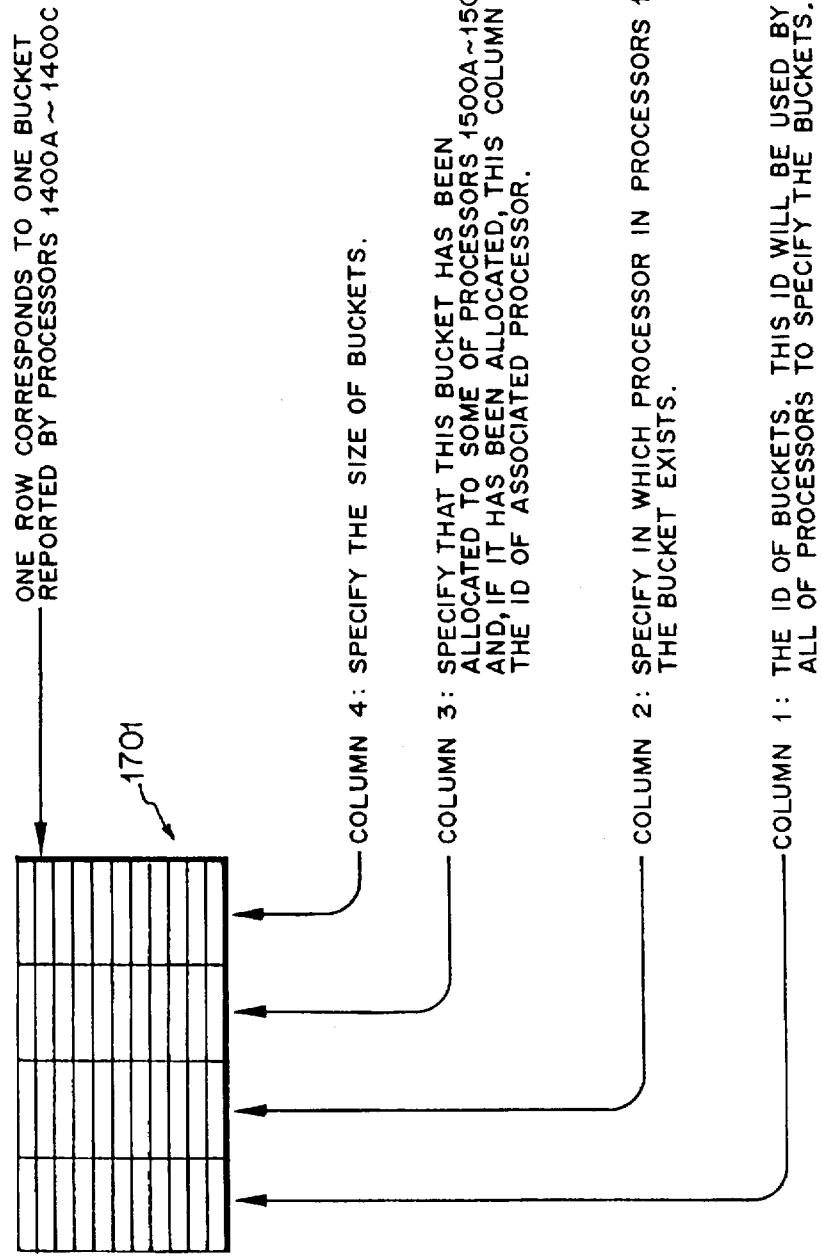
FIG. 31 is a diagram used for explaining roughly the bucket allocation table in the sixth embodiment of the present invention.

FIG. 31 is a diagram used for explaining the outline of the bucket allocation table 1701. As shown in FIG. 31, the table 1701 in the sixth embodiment has nearly the same configuration as that in the fifth embodiment shown in FIG. 25. However, the table 1701 in the sixth embodiment 1701 includes the fourth column further added to that in the fifth embodiment.

The fourth column stores the capacity of the bucket corresponding to the row. The fourth column is used to realize the second function of "the bucket with the largest capacity among the bucket groups in processor non-allocated states is subjected to the next allocation process to the processors 1500A to 1500C belonging to the second processor group 1500" in the management processor 1600. The initial value of the fourth column is set to "0".

Figure 32:
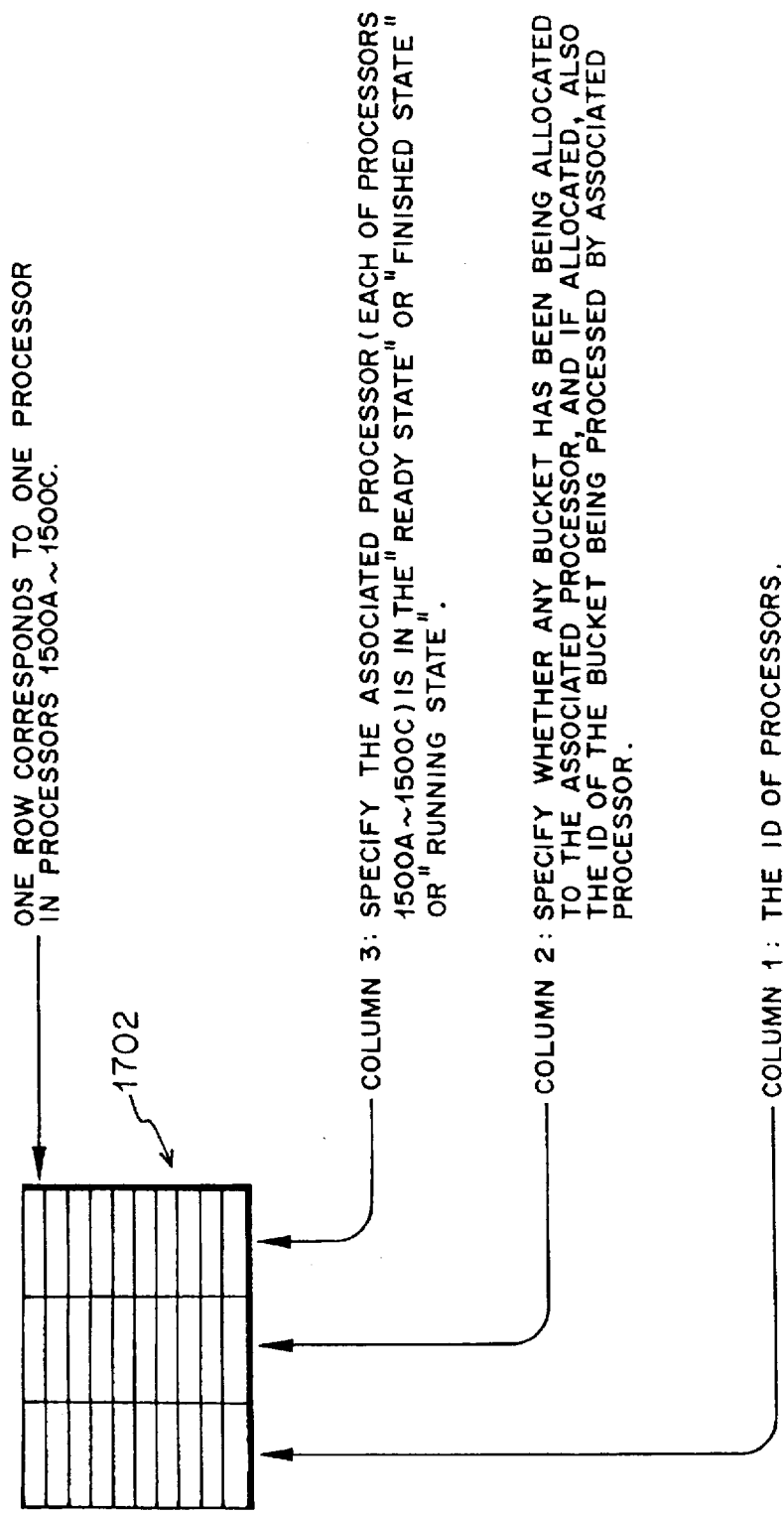
FIG. 32 is a diagram used for explaining the state management table in the sixth embodiment of the present invention.

FIG. 32 is a diagram showing the outline of the state control table 1702. As shown in FIG. 32, the table 1702 in the sixth embodiment has totally the same configuration as that in the fifth embodiment shown in FIG. 26. Hence the detail explanation will be omitted here.

Next the operational flow of the entire system according to the sixth embodiment with the above-mentioned configuration will be explained below. The system in the sixth embodiment operates similarly to that in the fifth embodiment explained with FIGS. 24 to 29. Hence, only the different points between the fifth embodiment and the sixth embodiment will be explained here.

In the sixth embodiment, each of the processors 1400A to 1400C belonging to the first processor group 1400 sends the capacity of each subbucket stored in the secondary storage unit thereof to the management processor 1600, together with the identifier (bucket ID).

Like the fifth embodiment, the management processor 1600 manages the buckets which exist in the first processor group 1400 to grasp what kind of identifier each bucket has. Besides, the management processor 1600 manages and stores the capacity of each bucket by accumulating the capacity of the subbuckets every bucket ID, the subbucket being sent from each processor 1400A to 1400C belonging to the first processor group 1400.

The management processor 1600 refers to the bucket allocation table 1701 when the "bucket allocation request" message A is sent from the second processor group 1500 and the situation in which it is possible to perform the "bucket allocation" comes (conditions that it is possible to perform the "bucket allocation" similar to those in the fifth embodiment), and then allocates the stored buckets among the buckets which have not been allocated to processors 1500A to 1500C belonging to the second processor group 1500, in the decreasing order of the capacity.

The other operation corresponds to that in the fifth embodiment.

Next, explanation will be made below in detail as to the outline of the operation of each of the processors 1700, 1400A to 1400C, and 1500A to 1500C in the sixth embodiment, with reference to the flowcharts shown in FIGS. 33 to 35.

Figure 33:
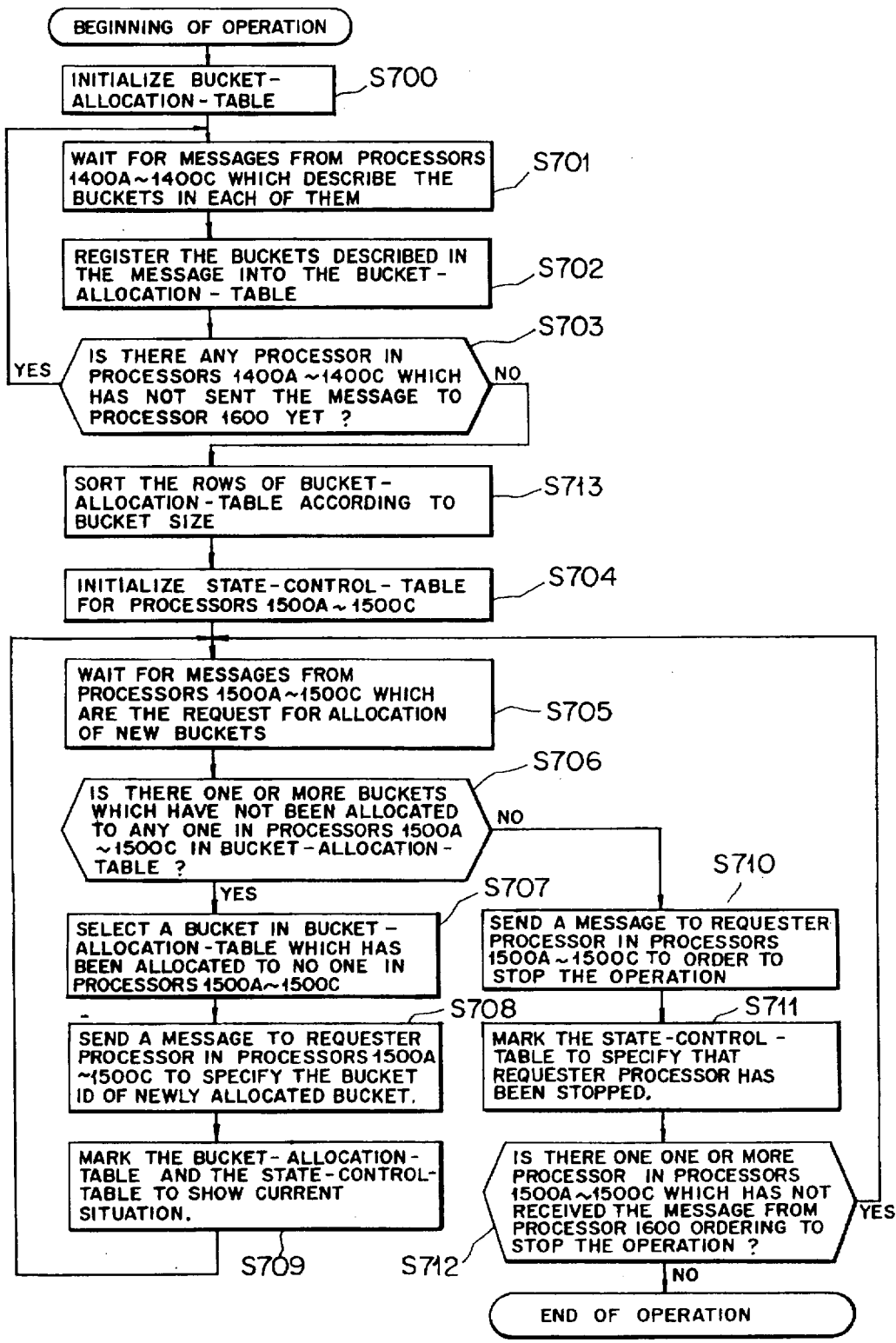
FIG. 33 is a flowchart used for explaining the operation of the management processor in the sixth embodiment of the present invention.

FIG. 33 is a flowchart (steps S700 to S713) used for explaining the operation of the management processor 1600 in the sixth embodiment. As shown in FIG. 33, the management processor 1700 operates similarly to the processor 1600 in the fifth embodiment. The processes in the steps S700 to S712 shown in FIG. 33 correspond to those in the steps S600 to S612 shown in FIG. 27, respectively. Hence only the operation different from that in the fifth embodiment will be explained here.

In the sixth embodiment, when the content of the bucket allocation table 1701 is initialized in the step S700, the management processor 1700 executes a similar operation to that in the step S600 in the fifth embodiment while it sets the initial values of the added fourth column to "0".

In the fifth embodiment, only bucket IDs are described to the messages from processors 1400A to 1400C belonging to the first processor group 1400 (to recognize only the existence of the bucket). However, in the sixth embodiment, the messages, which are sent from the processors 1400A to 1400C belonging to the first processor group 1400 and for which the management processor 1700 waits in the step S701, include the capacity of each of the subbuckets as well as the bucket ID.

In the step S702, for all the subbuckets shown in the message accepted by each of the processors 1400A to 1400C belonging to the first processor group in the step S701, the management processor 1700 describes that the data of the bucket exists in the message originating processor, into the third column of the row corresponding to the same bucket in the bucket allocation table 1701, and adds the capacity of the subbucket to the values of the fourth column.

As described above, there is a large difference between the fifth grid sixth embodiments in the process to the fourth column. Thus the accumulated capacity of the buckets in the processors 1400A to 1400C is created in the fourth column of the bucket allocation table 1701.

In the step S702, if there is no row whose the first column includes the bucket ID, the management processor 1700 captures a new row for the bucket ID, sets the information showing that "the bucket does not exist in any one of the processors 1400A to 1400C" in the third column, and sets "0" in the fourth column.

In the present embodiment, the process operations in the steps S701 and S702 are repeated till all the processors 1400A to 1400C have completely reported (step S703). However, in the sixth embodiment, when all the processors 1400A to 1400C have reported the bucket generation, the management processor 1700 executes the process in the newly added step S713 before executing the step S704 similar to the step S604 in the fifth embodiment.

In the step S713, the rows in the bucket allocation table 1701 are sorted and rearranged in the increasing or decreasing order by the bucket capacity of the fourth column. It is not required to rearrange physically the rows. For example, the rearrangement is performed in the pointer's permutation indication by adding the column storing the pointer between the rows in the bucket allocation table 1701. The sorting process in the step S713 aims at "selecting the bucket with the largest capacity among non-allocated buckets" in the step S707 (to be described later).

In the step S707, the management processor 1700, as described above, selects the bucket with the largest capacity among the buckets not yet allocated to any of the processors 1500A to 1500C belonging to the second processor group 1500. In the fifth embodiment, if all the buckets are allocated finally to a sole processor, they can be selected in arbitrary order. However, the sixth embodiment is different from the fifth embodiment in that buckets are allocated in the decreasing order of the bucket capacity.

Figure 34:
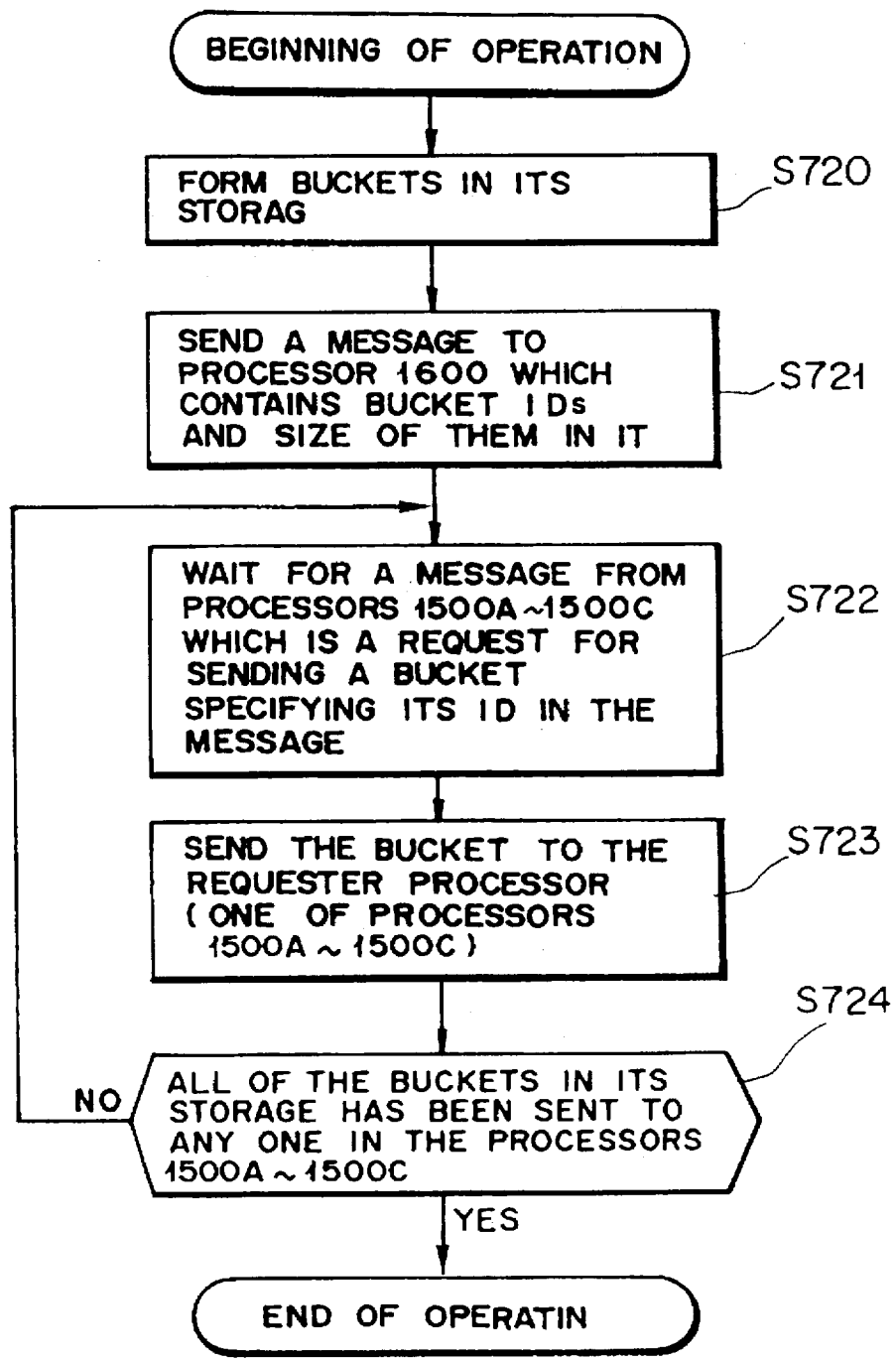
FIG. 34 is a flowchart used for explaining the operation of each processor belonging to the first processor group in the sixth embodiment of the present invention.

FIG. 34 is a flowchart (steps S720 to S724) used for explaining the operation of each of the processors 1400A to 1400C belonging to the first processor group 1400 in the sixth embodiment. As shown in FIG. 34, the processors 1400A to 1400C operate similarly to those in the fifth embodiment. The process in the steps S720 to S724 shown in FIG. 34 correspond respectively to that in the steps S620 to S624 shown in FIG. 28. Only the operation different from that in the fifth embodiment will be explained below.

As described before with FIG. 34, the sixth embodiment differs from the fifth embodiment in that when each of the processors 1400A to 1400C recognizes the existence of the subbucket stored therein, pairs of all the bucket IDs and the subbucket capacities are sent to the management processor 1700 in the step S721. On the contrary, in the fifth embodiment, only the bucket IDs are transferred.

Figure 35:
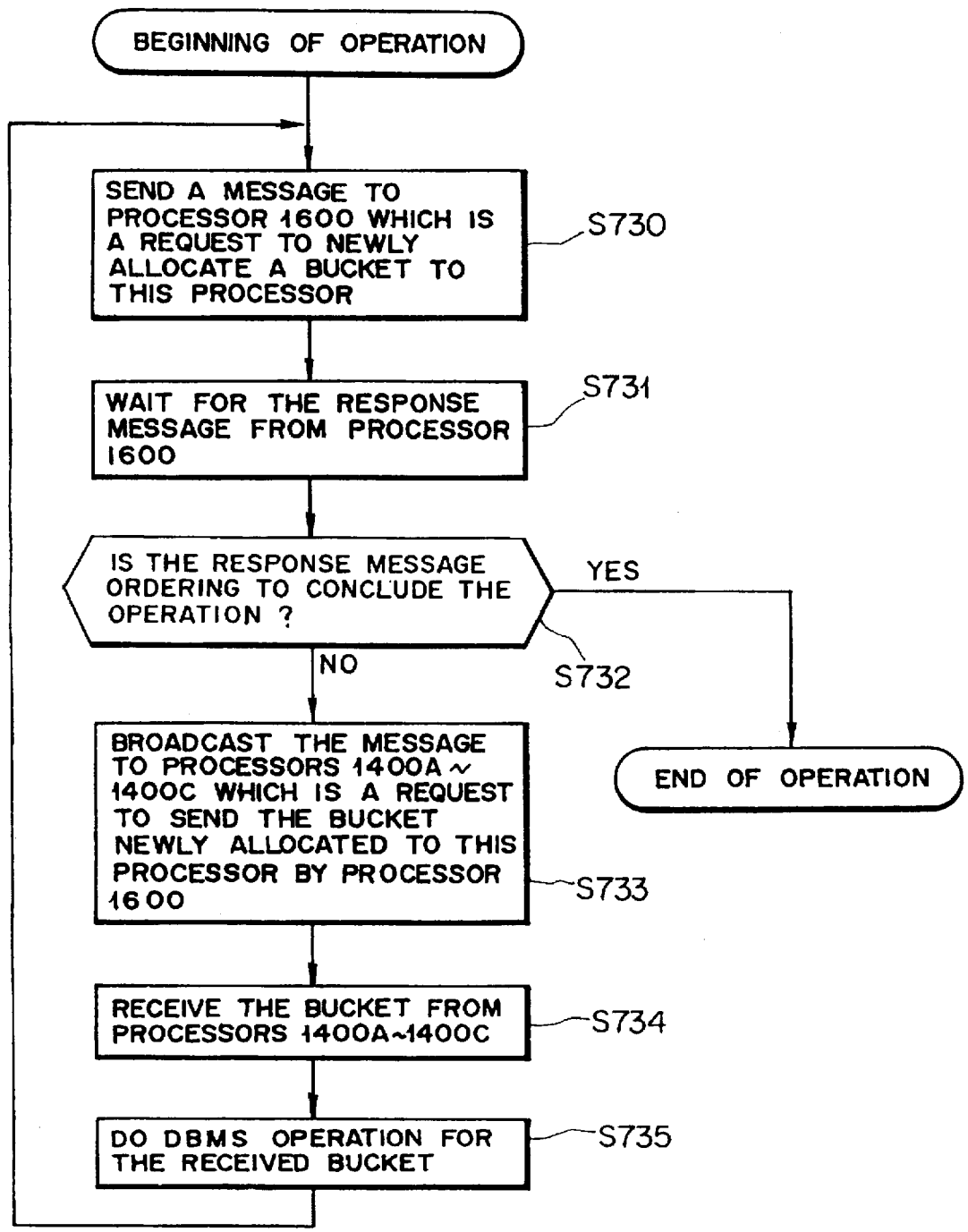
FIG. 35 is a flowchart used for explaining the operation of each processor belonging to the second processor group in the sixth embodiment of the present invention.

FIG. 35 is a flowchart steps S730 to S735 used for explaining the operation of each of the processors 1500A to 1500C belonging to the second processor group in the sixth embodiment. As shown in FIG. 35, the processors 1500A to 1500C operate exactly similarly to those in the fifth embodiment. The process in the steps S730 to S735 in FIG. 35 completely correspond to that in the steps S630 to S635, respectively. Hence the duplicate explanation will be omitted here.

The effect of the parallel processors system according to the sixth embodiment of the present invention will be explained below.

In the sixth embodiment, when the MIMD skew or the generation rate skew is particularly large in the "last bucket", the system intends to reduce the adverse effect.

It is predicted that the degree (the index is how much the bucket process prolongs from expectation) of the adverse effect on a bucket due to the MIMD skew or the generation rate skew has naturally the positive correlation with the data amount of a bucket.

If a large skew should occur in the initial process, the system in the fifth embodiment can suppress at minimum the influence to the system performance because another processor provides the operation performance corresponding to the skew. However, this feature is provided because "another processor can undertake the bucket to be originally processed by the processor degraded due to a skew".

That is, if a very large skew occurs to the last bucket, thus delaying the process time, the delay cannot be compensated.

The sixth embodiment improves the fifth embodiment further because it is utilized that even if a large skew should occur to the "last bucket", if the bucket size itself is small, the influence on the system performance becomes sufficiently small.

What is claimed is:

1. A parallel processor system comprising plural processors which operate in parallel, said plural processors including a set of processors (hereinafter referred to as a source data processor group) each storing plural subsets (hereinafter referred to as subchunks) obtained by dividing a cluster of data (hereinafter referred to as a chunk) to be subjected to a sole process, and a set of processors (hereinafter referred to as a target data processor group) to which plural data items (hereinafter referred to as entities) that form said subchunks stored into each processor belonging to said source data processor group and can be processed independently are transferred from each processor belonging to said source data processor group;

wherein each processor belonging to said source data processor group applies a predetermined evaluation friction to each entity forming independently said subchunk, obtains the output value of said predetermined evaluation function corresponding to each entity, and then transfers an entity to which said output value is added to one of said processors belonging to said target data processor group;

wherein each processor belonging to said target data processor group refers to the output value of said predetermined evaluation function added to said entity when an entity from each processor belonging to said source data processor group is accepted, classifies accepted entity by the output value added to this entity and then stores the resultant;

wherein each processor belonging to said source data processor group includes a transfer destination processor decision table which holds a count value showing how many entities with the output value of a second designation factor have been transferred to a processor with the identifier of a first designation factor, said first designation factor being the identifier of each processor belonging to said target data processor group, said second designation factor being the output value of said predetermined evaluation function;

wherein each processor belonging to said source data processor group refers to a count value corresponding to the output value in said transfer destination processor decision table when the output value of said predetermined evaluation function corresponding to an entity to be transferred is obtained, recognizes how many entities with said output value have been already transferred to each processor belonging to said target data processor group, decides the processor with the smallest count value as an entity transfer destination, and then increments said count value by one.

2. The parallel processor system according to claim 1, wherein an entity transfer unit transferred from each processor belonging to said source data processor group to each processor belonging to said target data processor group comprises an aggregate of plural entities.

3. A parallel processor system comprising plural processors which operate in parallel, said plural processors including a set of processors (hereinafter referred to as a source data processor group) each storing plural subsets (hereinafter referred to as subchunks) obtained by dividing nearly equally a cluster of data (hereinafter referred to as a chunk) to be subjected to a sole process, and a set of processors (hereinafter referred to as a target data processor group) to which plural data items (hereinafter referred to as an entity) that form said subchunks stored into each processor belonging to said source data processor group and can be processed independently are transferred from each processor belonging to said source data processor group;

wherein each processor belonging to said source data processor group applies a predetermined evaluation function to each entity forming independently said subchunk, obtains the output value of said predetermined evaluation function corresponding to each entity, and then transfers an entity to which said output value is added to one of said processors belonging to said target data processor group; each processor including a queue mechanism that stores sequentially entities to be transferred corresponding respectively to all processors belonging to said target data processor group, and storage number detecting means that detects the number of entities to be transferred which are stored to said queue mechanism;

wherein each processor belonging to said target data processor group transfers with equal frequency a transmission start instruction to all processors belonging to said source data processor group when an entity from each processor belonging to said source data processor group becomes receivable, refers to the output value of said predetermined evaluation function added to an entity when said entity from each processor belonging to said source data processor group is accepted, and stores the accepted entity sorted by the output value added to this entity;

wherein each processor belonging to said source data processor group includes a transfer destination processor decision table which holds a count value showing how many entities with the output value of a second designation factor have been transferred to a processor with the identifier of a first designation factor, said first designation factor being the identifier of each processor belonging to said target data processor group, said second designation factor being the output value of said predetermined evaluation function;

wherein each processor belonging to said source data processor group refers to a count value corresponding to the output value in said transfer destination processor decision table when the output value of said predetermined evaluation function corresponding to an entity to be transferred is obtained, recognizes how many entities with said output value have been already transferred to each processor belonging to said target data processor group, decides the processor with the smallest count value as An entity transfer destination, And then increments said count value by a value obtained by adding one to the number of entities to be transferred in said queue mechanism detected at that time by said storage number detecting means or by a value obtained by multiplying this added value by a constant except 0.

4. The parallel processor system according to claim 3, wherein An entity transfer unit transferred from each processor belonging to said source data processor group to each processor belonging to said target data processor group comprises an aggregate of plural entities.

5. A parallel processor system comprising plural processors which operate in parallel, said plural processors including a set of processors (hereinafter referred to as a source data processor group) each storing plural subsets (hereinafter referred to as subchunks) obtained by dividing nearly equally a cluster of data (hereinafter referred to as a chunk) to be subjected to a sole process, and a set of processors (hereinafter referred to as a target data processor group) to which plural data items (hereinafter referred to as an entity) that form said subchunks stored into each processor belonging to said source data processor group and can be processed independently are transferred from each processor belonging to said source data processor group;

wherein each processor belonging to said source data processor group applies a predetermined evaluation function to each entity forming independently said subchunk, obtains the output value of said predetermined evaluation function corresponding to each entity, and then transfers plural entities as one transfer unit to which said output value is added to one of said processors belonging to said target data processor group; each processor including a queue mechanism that stores sequentially entities to be transferred corresponding respectively to all processors belonging to said target data processor group, and storage data amount detecting means that detects the data amount of entities to be transferred which are stored in said queue mechanism;

wherein each processor belonging to said target data processor group transfers with equal frequency a transmission start instruction to all processors belonging to said source data processor group when an entity from each processor belonging to said source data processor group becomes receivable, refers to the output value of said predetermined evaluation function added to an entity when said entity from each processor belonging to said source data processor group is accepted, and stores the accepted entity sorted by the output value added to this entity;

wherein each processor belonging to said source data processor group includes a transfer destination processor decision table which holds data amount showing how many entities with the output value of a second designation factor have been transferred to a processor with the identifier of a first designation factor, said first designation factor being the identifier of each processor belonging to said target data processor group, said second designation factor being the output value of said predetermined evaluation function;

wherein each processor belonging to said source data processor group refers to said data amount corresponding to the output value in said transfer destination processor deciding table when the output value of said predetermined evaluation function corresponding to an entity to be transferred is obtained, recognizes how many entities with said output value have been already transferred to each processor belonging to said target data processor group, decides the processor with the smallest data amount as an entity transfer destination, and then increments said data amount by an added value of (the data amount of entities to be transferred in said queue mechanism detected at that time by said storage data amount detecting means+the data amount of an entity currently processed) or by a value obtained by multiplying said added value 0 by a constant except 0.

6. The parallel processor system comprising plural processors which operate in parallel, said plural processors participating in one task and executing said task as a whole, wherein first processor group included in said plural processors dispersively stores data to be processed in said task, and second processor group included in said plural processors receives data stored in said first processor group and executes a process regarding said data;

wherein each processor belonging to said first processor group previously groups data stored in serf processor into at least one data group according to a predetermined regulation and then reports the grouping result to a management processor included in said plural processors;

wherein said management processor receives a report from each processor belonging to said first processor group and then stores data group stored in each processor belonging to said first processor group;

wherein each processor belonging to said second processor group requests an allocation of a data group by said management processor when the situation in which it is possible to start a new process to said data group comes;

wherein said management processor allocates data groups which have not been allocated to each processor making said allocation request when an allocation request of a data group is received from each processor belonging to said second processor group;

wherein each processor belonging to said first processor group sends all data of the corresponding data group to each processor belonging to said second processor group, according to a data allocation by said management processor.

7. The parallel processor system comprising plural processors which operate in parallel, said plural processors participating in one task and executing said task as a whole, wherein first processor group included in said plural processors dispersively stores data to be processed in said task, and second processor group included in said plural processors receives data stored in said first processor group and executes a process regarding said data;

wherein each processor belonging to said first processor group previously groups data stored in serf processor into at least one data group according to a predetermined regulation rid then reports as a grouping result the identifier and capacity of each data group to a management processor included in said plural processors;

wherein said management processor receives a report from each processor belonging to said first processor group, accumulates the capacity of a data group stored in each processor belonging to said first processor group every data group, and then stores the capacity and the identifier of each data group over the entire first processor group;

wherein each processor belonging to said second processor group requests an allocation of a data group by said management processor when the situation in which it is possible to start a new process to said data group comes;

wherein said management processor allocates stored data groups in order from the data group with the largest capacity to each processor making said allocation request when an allocation request of a data group is received from each processor belonging to said second processor group;

wherein each processor belonging to said first processor group sends all data of the corresponding data group to each processor belonging to said second processor group, according to a data allocation by said management processor.

* * * * *

UNITED STATES PATENT AND TRADEMARK OFFICE
CERTIFICATE OF CORRECTION

PATENT NO. : 5,724,600

DATED : March 3, 1998

INVENTOR(S) : Ogi

It is certified that error appears in the above-identified patent and that said Letters Patent is hereby corrected as shown below:

| | |
|---|---|
| Col. 1, | line 37, after "the" (first occurrence) insert --I/O--. |
| Col. 4, | line 65, change "omits" to --units--. |
| Col. 6, | line 6, change "12" to --212--; |
| | line 37, change "Of" to --of--. |
| Col. 7, | line 17, change "fie" to --file--. |
| Col. 8, | line 28, change "if" to --If--. |
| Col. 9, | line 38, change "Sector" to --sector--; |
| | line 54, change "Among" to --among--. |
| Col. 14, | line 2, change "grid" to --and--. |
| Col. 15, | line 1, change "An" to --an--; |
| | line 13, change "The" to --"The,--. |
| Col. 16, | line 14, change "sub script" to --subscript--; |
| | line 36, change "time+the" to --time + the--; |
| | line 58, change "serf" to --self--; |
| | line 61, change "An" to --an--; |
| | line 64, after "to" insert --any--. |
| Col. 17, | line 25, after "processor" insert --A.--. |
| Col. 18, | line 45, change "Amount" to --amount--. |
| Col. 19, | line 36, change "Allocation" to --allocation--. |
| Col. 20, | line 24, change "con" to --can--. |

UNITED STATES PATENT AND TRADEMARK OFFICE
CERTIFICATE OF CORRECTION

PATENT NO. : 5,724,600
DATED : March 3, 1998
INVENTOR(S) : Ogi

It is certified that error appears in the above-identified patent and that said Letters Patent is hereby corrected as shown below:

Col. 21, delete lines 16 and 17 entirely and insert --FIG. 16 is a diagram showing an example of a telegram format for a trigger signal from a T-DPr according to the second embodiment.--.

Col. 27, line 34, after "tifier", delete rest of line;
delete lines 35-61;
line 62, delete "tifier".

Col. 28, line 4, change "grid" to --and--;
line 14, change "serf" to --self--;
line 17, change "serf" to --self--.

Col. 30, line 25, equation should read $--\rho 0/(1-\rho 0)=\rho 1/(1-\rho 1)--$;
line 26, equation should read
$--0 \leq \rho 0 \leq 1 \text{ and } 0 \leq \rho 1 \leq 1, \rho 0 = \rho 1--$.

Col. 32, line 21, change "And" to --and--;
line 29, change "All" to --all--.

Col. 33, line 1, change "serf" to --self--.

Col. 34, line 32, change "8011" to --801I--;
line 59, change "serf" to --self--.

Col. 38, line 26, change "And" to --and--.

Col. 39, line 58, change "tuples"" to --tuples".--.

UNITED STATES PATENT AND TRADEMARK OFFICE
CERTIFICATE OF CORRECTION

PATENT NO. : 5,724,600  
DATED : March 3, 1998  
INVENTOR(S) : Ogi

Page 3 of 4

It is certified that error appears in the above-identified patent and that said Letters Patent is hereby corrected as shown below:

Col. 40, line 3, begin a NEW PARAGRAPH with "(2)";
        lines 6, 7 and 9, change "queue+1" to --queue + 1--; and --queue + the--.
        line 46, change "And" to --and--.

Col. 41, line 25, change "tuplexthe" to --tuple x the--;
        line 41, change "T-DPr+the" to --T-DPr + the--;
        line 51, change "transfer" to --transfer"--.

Col. 42, line 44, change "serf" to --self--.

Col. 43, line 9, change "frictions" to --functions--;
        line 48, change ":" to --.--;
        line 56, change "Allocated" to --allocated--.

Col. 44, line 47, change "serf" to --self--;
        line 52, change "oil" to all--.

Col. 46, line 18, change "nil" to --all--;
        lines 28 and 46, change "serf" to --self--;
        line 61, change "location" to --allocation--.

Col. 47, line 12, change "serf" to --self--.

Col. 49, line 13, after "sets" insert --all--;
        line 33, change "grid" to --and--.

Col. 51, line 1, change "friction" to --function--.

UNITED STATES PATENT AND TRADEMARK OFFICE
CERTIFICATE OF CORRECTION

PATENT NO. : 5,724,600
DATED : March 3, 1998
INVENTOR(S) : Ogi

It is certified that error appears in the above-identified patent and that said Letters Patent is hereby corrected as shown below:

Col. 52, line 29, change "An" to --an--; change "And" to --and--;

line 36, change "An" to --an--.

Col. 53, line 35, change "means+the" to --means + the--.

Col. 54, line 28, change "rid" to --and--.

Signed and Sealed this

Eighth Day of September, 1998

Attest:

BRUCE LEHMAN

Attesting Officer

Commissioner of Patents and Trademarks